United States Patent
Kendall et al.

(10) Patent No.: US 9,939,193 B2
(45) Date of Patent: *Apr. 10, 2018

(54) APPARATUS, SYSTEM, AND METHOD FOR STORAGE IN A REFRIGERATED APPLIANCE

(71) Applicant: Whirlpool Corporation, Benton Harbor, MI (US)

(72) Inventors: James W. Kendall, Mt. Prospect, IL (US); Michael C. Lah, Benton Harbor, MI (US); Timothy T. Murphy, Holland, MI (US); Todd J. Tunzi, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/956,633

(22) Filed: Dec. 2, 2015

(65) Prior Publication Data

US 2016/0231047 A1 Aug. 11, 2016
US 2017/0089635 A9 Mar. 30, 2017

Related U.S. Application Data

(63) Continuation of application No. 14/207,918, filed on Mar. 13, 2014, now Pat. No. 9,212,848, which is a
(Continued)

(51) Int. Cl.
*F25D 25/00* (2006.01)
*F25D 25/02* (2006.01)
*F25D 27/00* (2006.01)
*A47B 47/00* (2006.01)
*A47B 96/02* (2006.01)
(Continued)

(52) U.S. Cl.
CPC ........ *F25D 25/025* (2013.01); *A47B 47/0091* (2013.01); *A47B 88/407* (2017.01); *A47B 96/02* (2013.01); *F16B 1/00* (2013.01); *F25D 27/00* (2013.01); *F16B 2001/0064* (2013.01); *F25D 2325/021* (2013.01); *F25D 2400/40* (2013.01)

(58) Field of Classification Search
CPC ...... F25D 25/02; F25D 25/021; F25D 25/024; F25D 25/025; F25D 27/00; F25D 2323/021; A47B 2200/0075; A47B 2200/0077

See application file for complete search history.

(56) References Cited

U.S. PATENT DOCUMENTS 3,301,610 A  1/1967  Packett et al.
4,834,557 A  5/1989  Dreinhoff
(Continued)

FOREIGN PATENT DOCUMENTS

CN  2881472 Y  3/2007
JP  3419988 B2  6/2003
(Continued)

*Primary Examiner* — Daniel J Rohrhoff
(74) *Attorney, Agent, or Firm* — Nyemaster Goode, P.C.

(57) ABSTRACT

An apparatus, system, and method for storage in a refrigerated appliance. One aspect includes glides or slides underneath and within the bottom perimeter dimensions of any bin or bin carrier relative to its supporting structure in the refrigerated appliance. This allows adjacent bins to more efficiently utilize lateral storage space in the refrigerator. It also promotes hiding of the glide or slides from view.

18 Claims, 55 Drawing Sheets

Related U.S. Application Data continuation-in-part of application No. 13/833,463, filed on Mar. 15, 2013, now abandoned.

(51) Int. Cl.
  *A47B 88/407*   (2017.01)
  *F16B 1/00*     (2006.01)

(56) References Cited

U.S. PATENT DOCUMENTS

| | | | |
|---|---|---|---|
| 4,979,262 | A | 12/1990 | Lautenschlager |
| 5,034,861 | A | 7/1991 | Sklenak et al. |
| 5,090,820 | A | 2/1992 | Lautenschlager |
| 5,287,252 | A | 2/1994 | Caruso |
| 5,299,863 | A | 4/1994 | Albright, Jr. |
| 5,558,419 | A | 9/1996 | Dasher et al. |
| 5,887,960 | A | 3/1999 | Lee |
| 6,142,596 | A | 11/2000 | Carson |
| 6,179,434 | B1 | 1/2001 | Saraiji |
| 6,227,636 | B1 | 5/2001 | Lye et al. |
| 6,394,567 | B1 | 5/2002 | Welch |
| 6,558,017 | B1 | 5/2003 | Saraiji et al. |
| 6,786,562 | B2 | 9/2004 | Obrock et al. |
| 8,152,255 | B2 | 4/2012 | Nam et al. |
| 9,212,848 | B2 * | 12/2015 | Kendall ................ F25D 27/00 |
| 2004/0264160 | A1 * | 12/2004 | Bienick ................ A47B 97/00 362/602 |
| 2008/0043436 | A1 | 2/2008 | Hung et al. |
| 2008/0043456 | A1 | 2/2008 | Bernardini et al. |
| 2009/0021927 | A1 | 1/2009 | Hall et al. |
| 2011/0164399 | A1 | 7/2011 | Driver et al. |
| 2012/0106129 | A1 | 5/2012 | Glovatsky et al. |
| 2012/0140440 | A1 | 6/2012 | Dam et al. |
| 2012/0229010 | A1 | 9/2012 | Lee et al. |
| 2013/0088136 | A1 | 4/2013 | Bassi et al. |
| 2013/0257254 | A1 | 10/2013 | Austin et al. |
| 2014/0140040 | A1 | 5/2014 | Giacomini et al. |
| 2014/0145579 | A1 | 5/2014 | Anderson et al. |
| 2014/0217879 | A1 | 8/2014 | Kerner |
| 2014/0220833 | A1 | 8/2014 | Kerner |
| 2014/0265808 | A1 | 9/2014 | Kendall et al. |
| 2015/0023000 | A1 | 1/2015 | Kendall et al. |
| 2016/0161669 | A1 * | 6/2016 | Lee ................ F25D 25/02 362/621 |
| 2016/0187055 | A1 * | 6/2016 | Alt ................ F25D 27/00 362/92 |

FOREIGN PATENT DOCUMENTS

| | | |
|---|---|---|
| JP | 2008127976 A | 6/2008 |
| KR | 2003021799 A | 3/2003 |
| KR | 2003023801 A | 3/2003 |
| KR | 100430216 B1 | 5/2004 |
| KR | 1020040064564 A | 7/2004 |
| KR | 2009106233 A | 10/2009 |
| KR | 2010018234 A | 2/2010 |
| KR | 1020100023474 A | 3/2010 |
| KR | 100998369 B1 | 12/2010 |
| KR | 101013683 A1 | 2/2011 |
| KR | 101028583 B1 | 4/2011 |

* cited by examiner

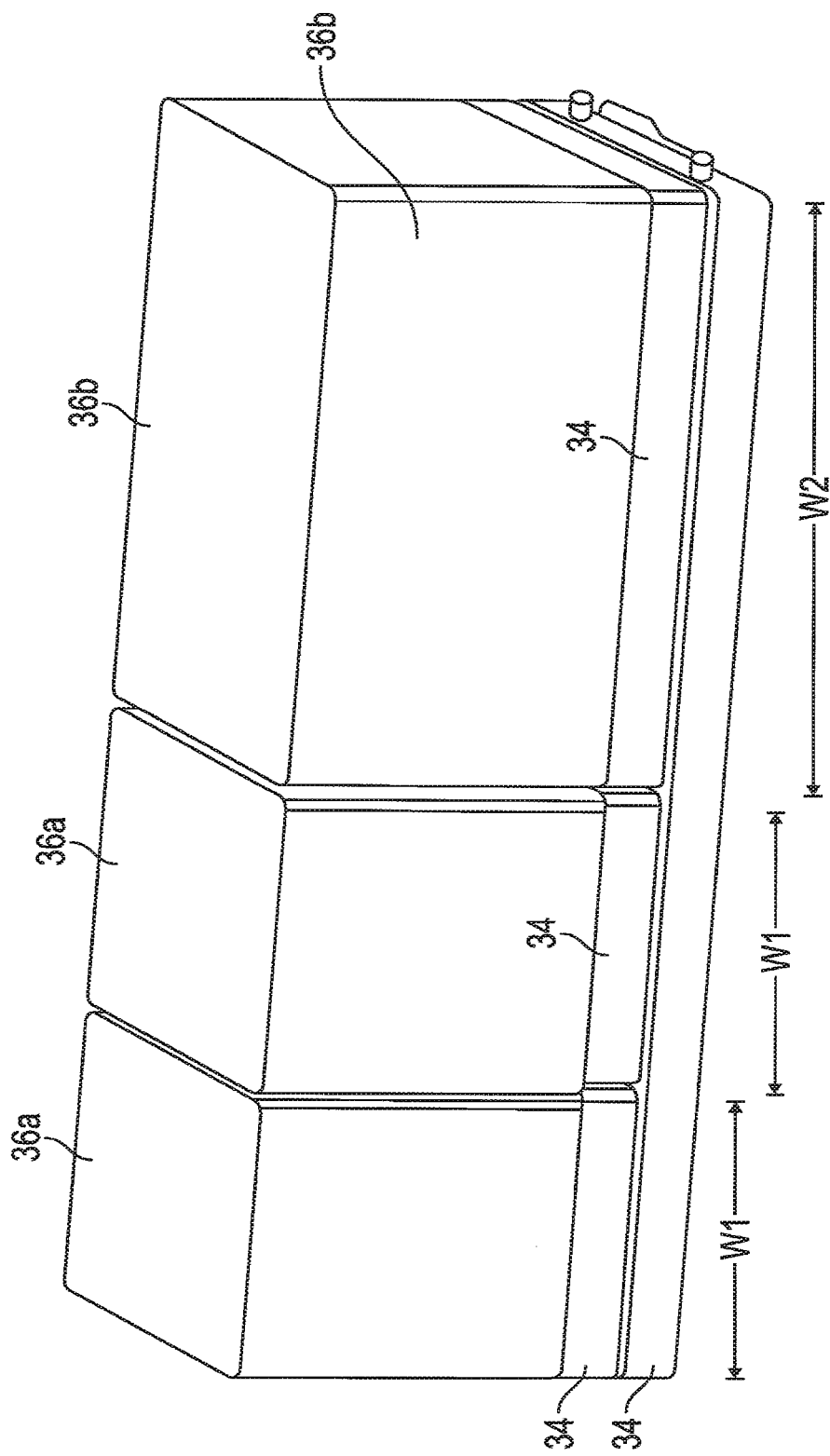

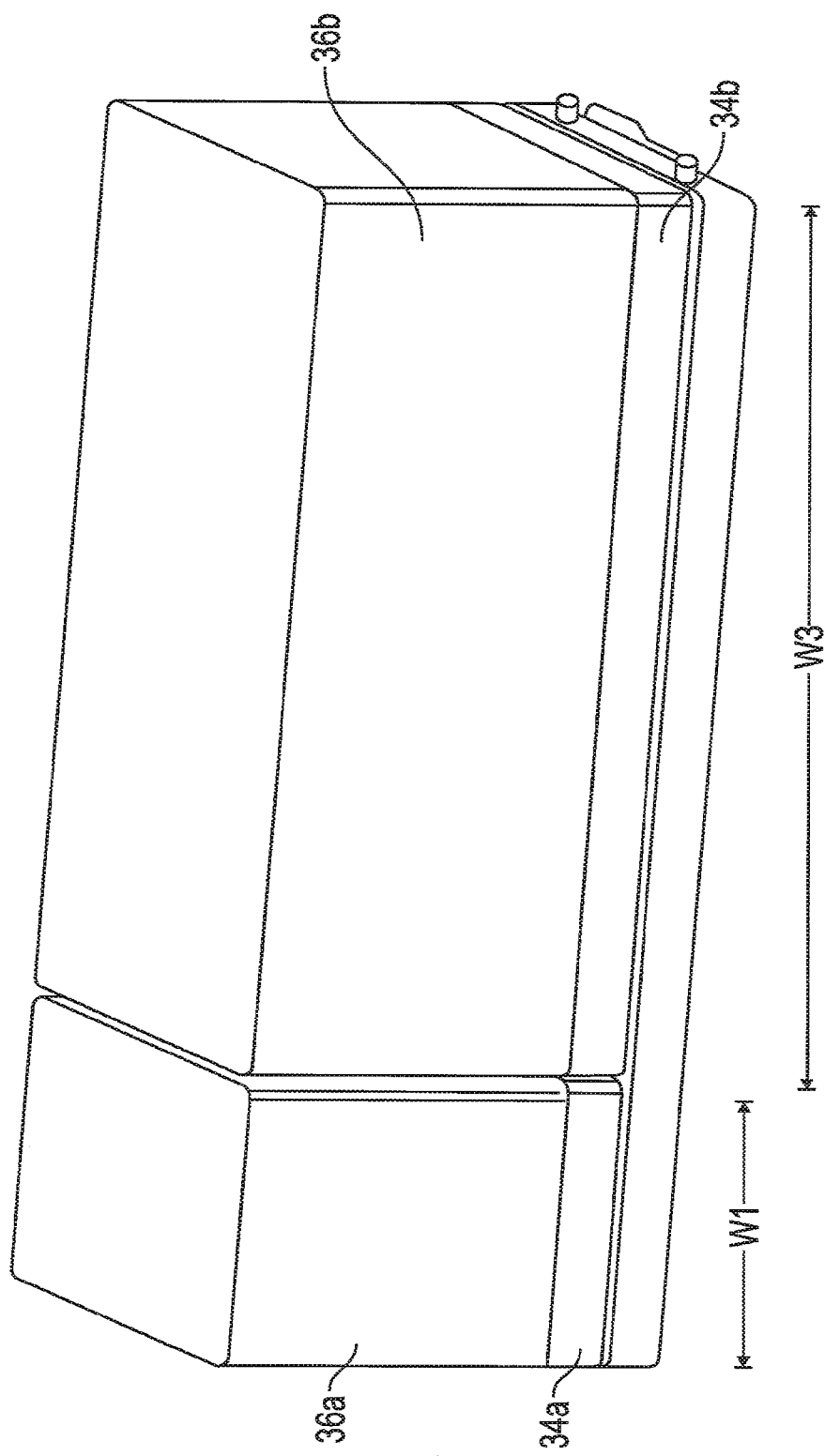

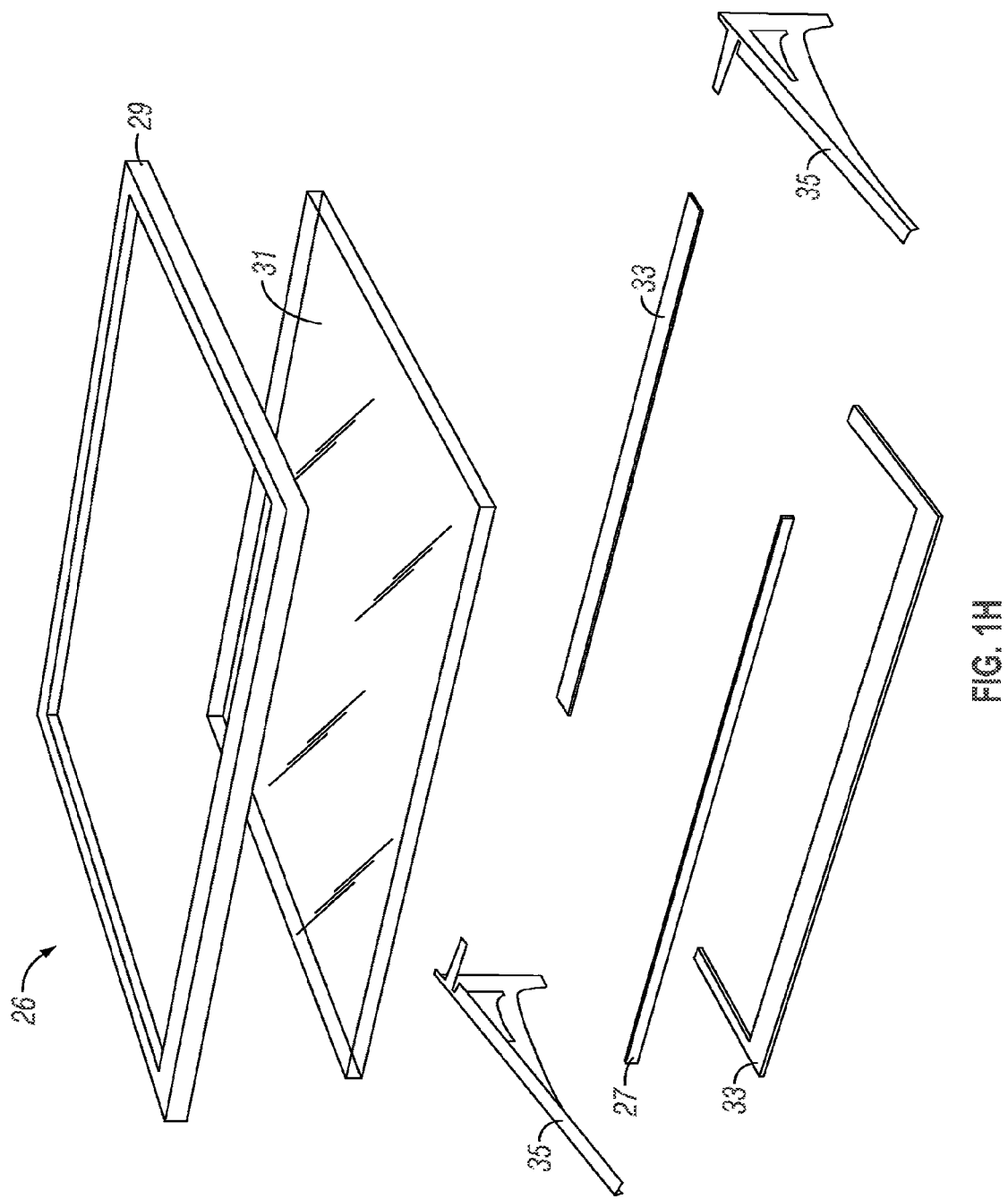

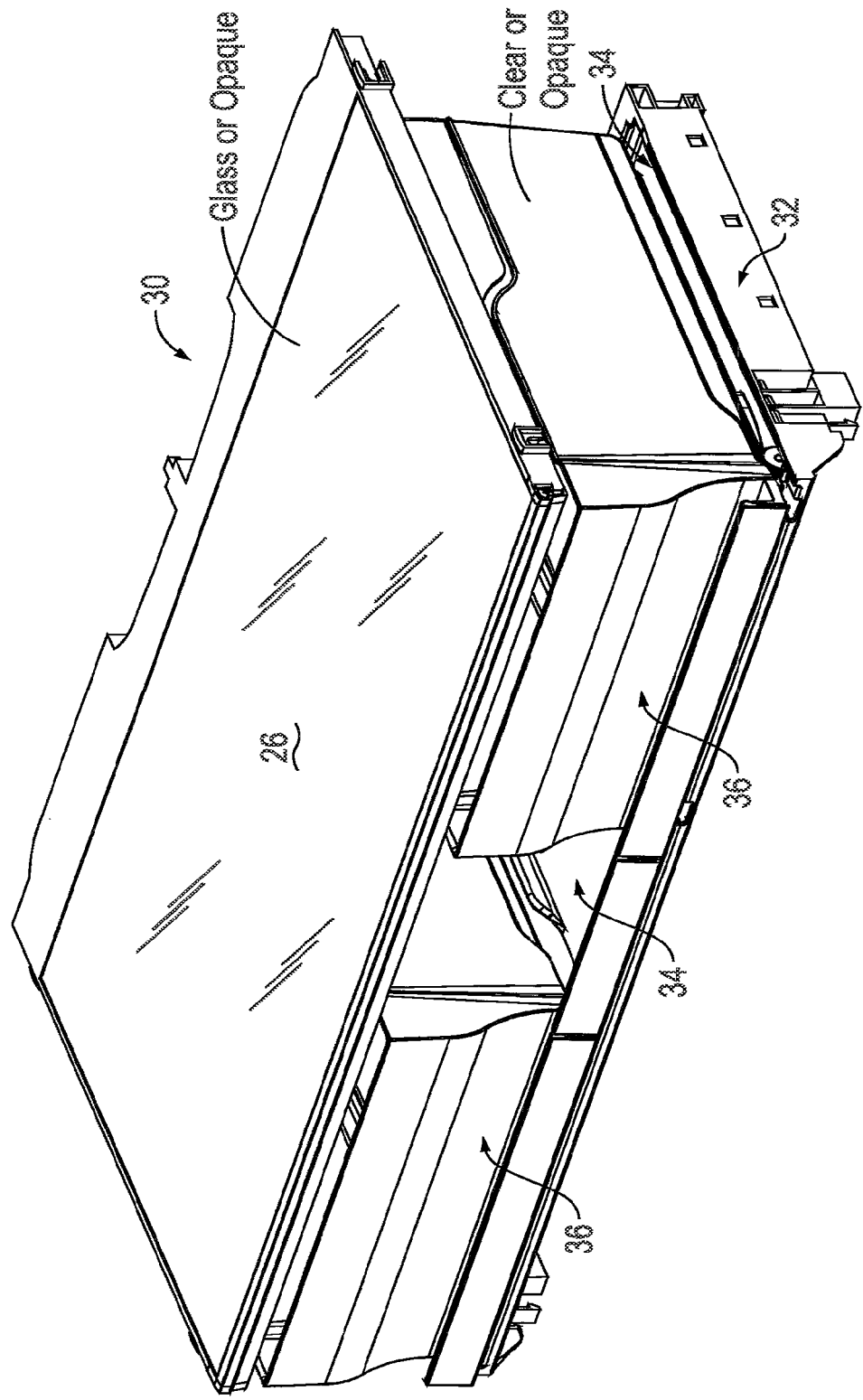

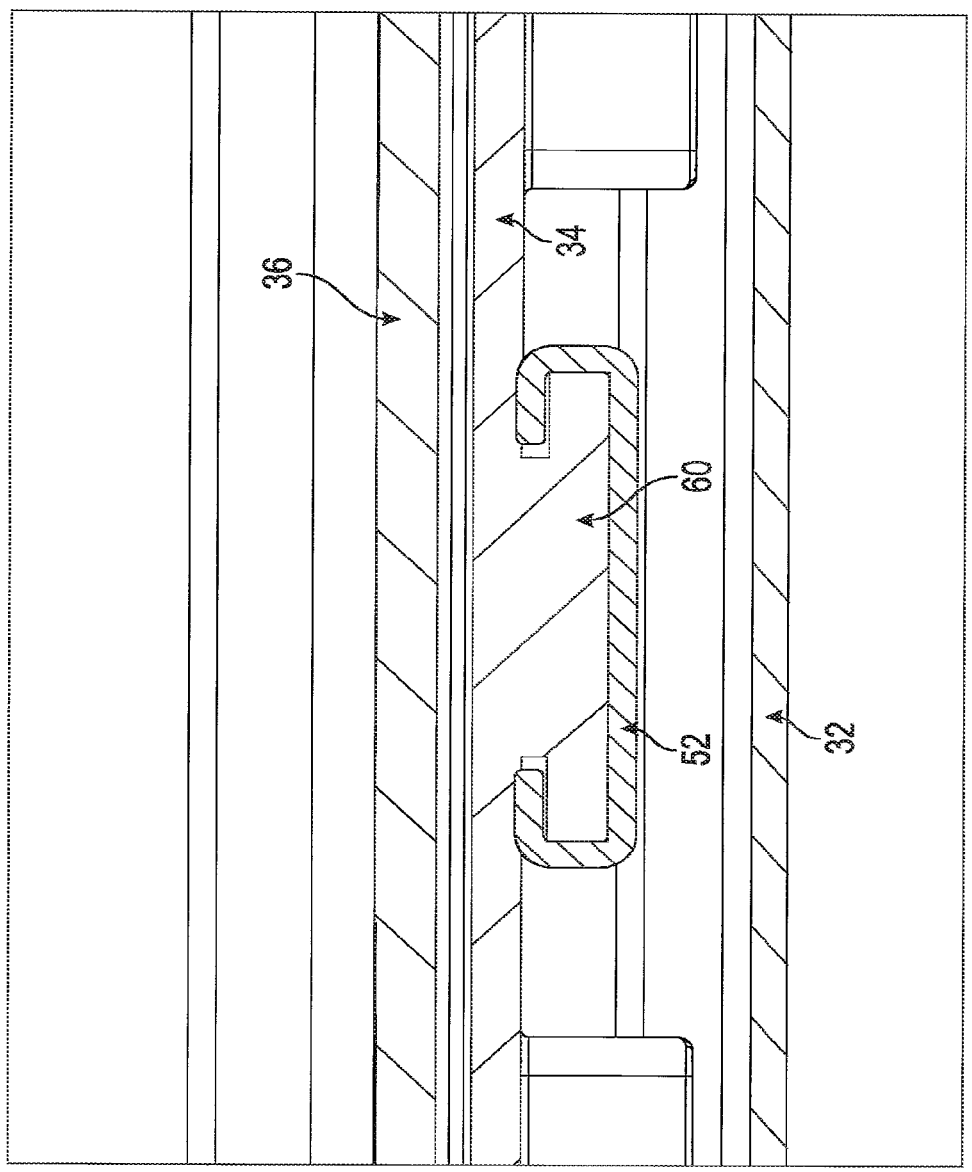

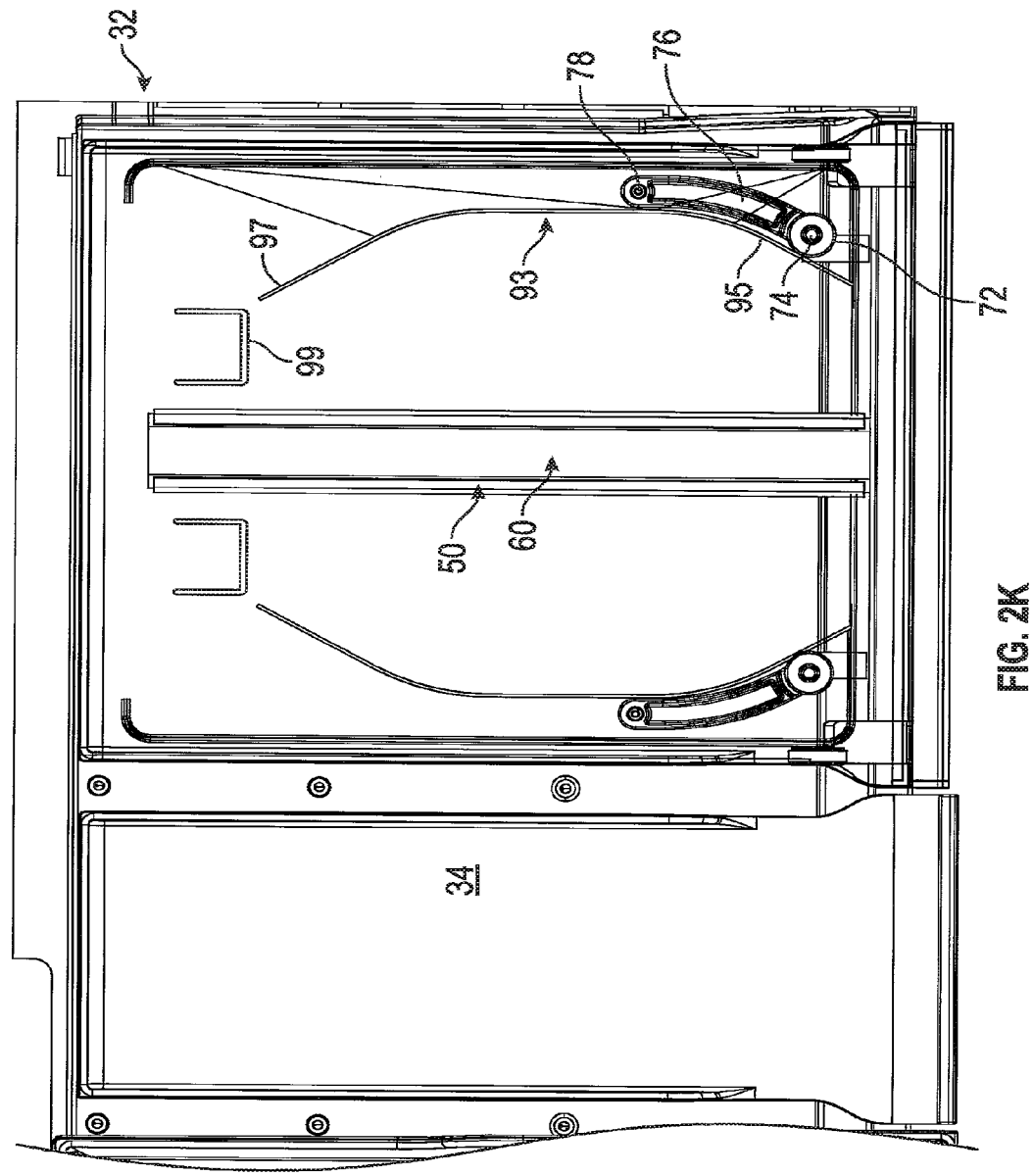

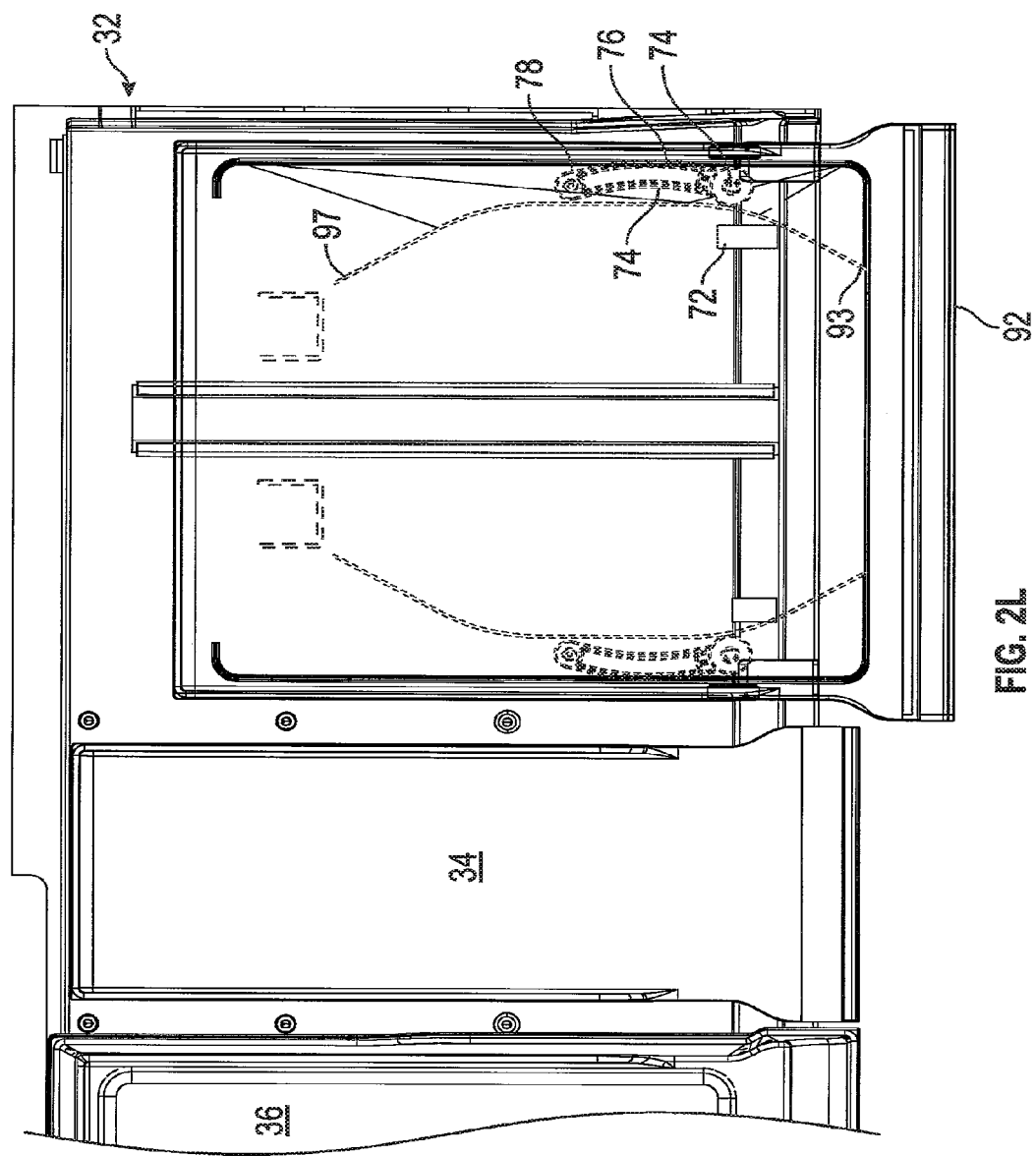

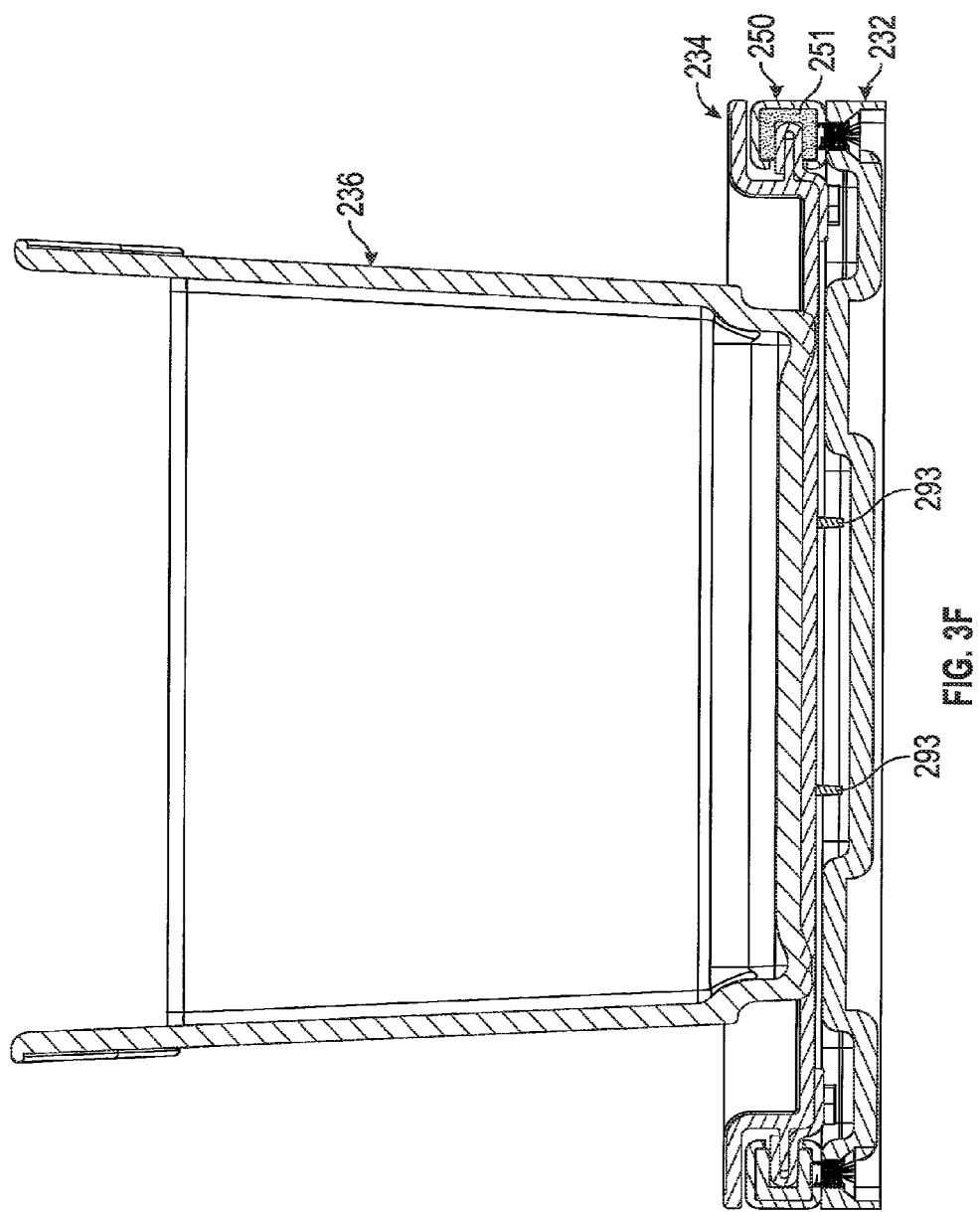

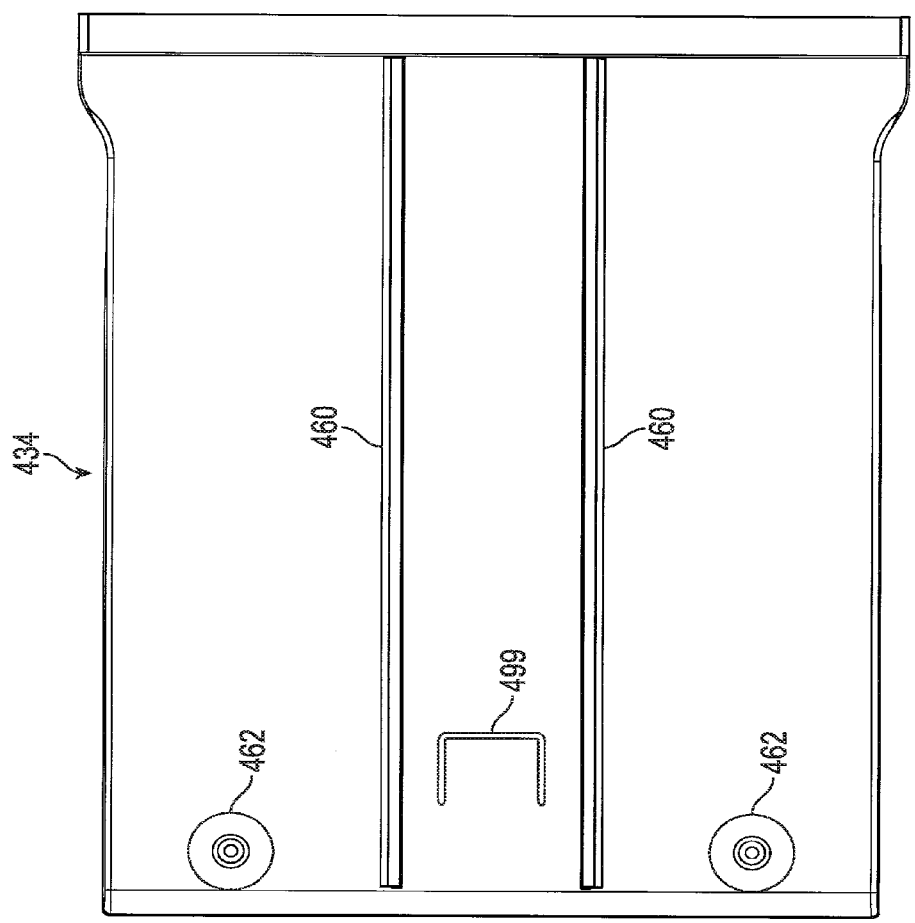

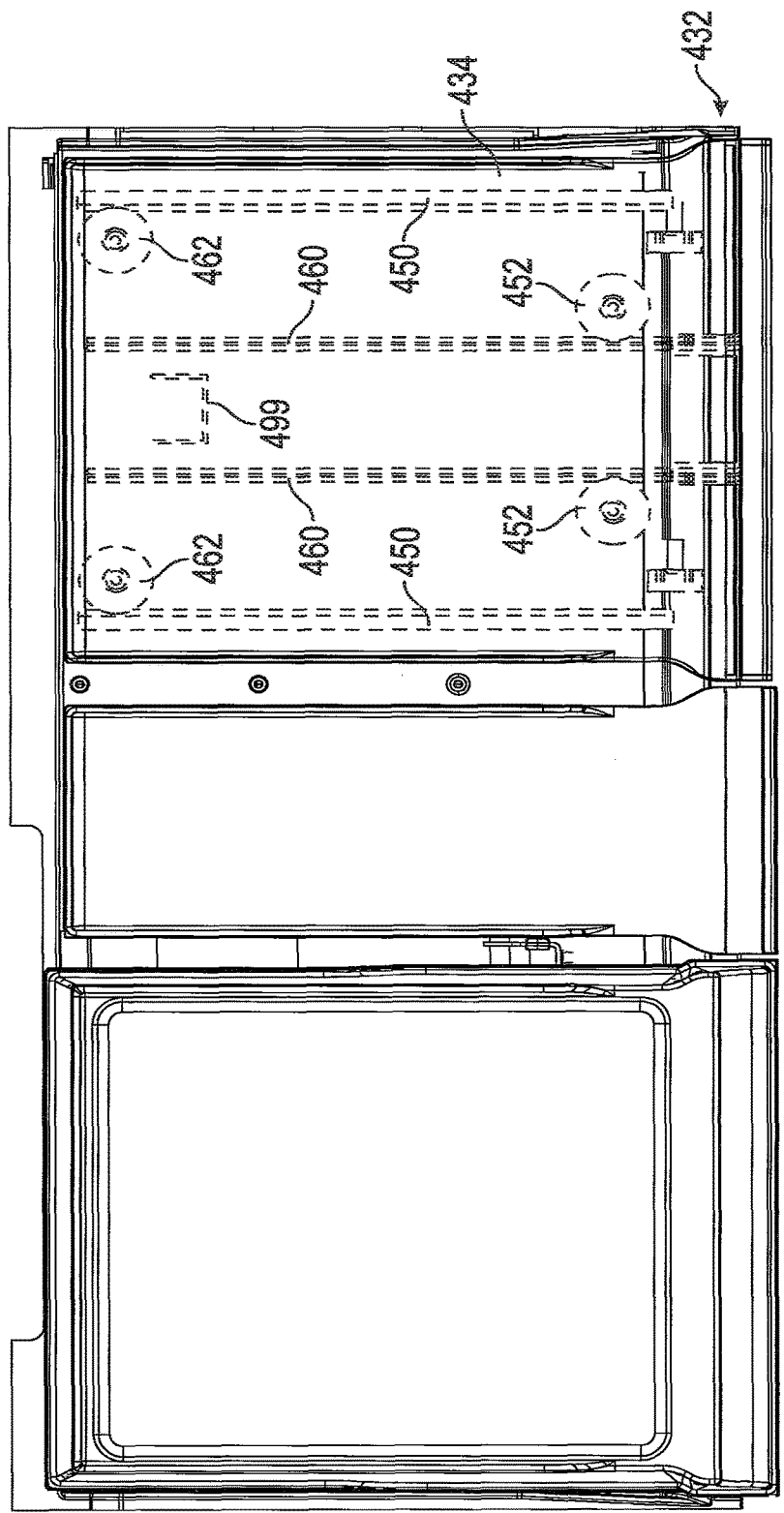

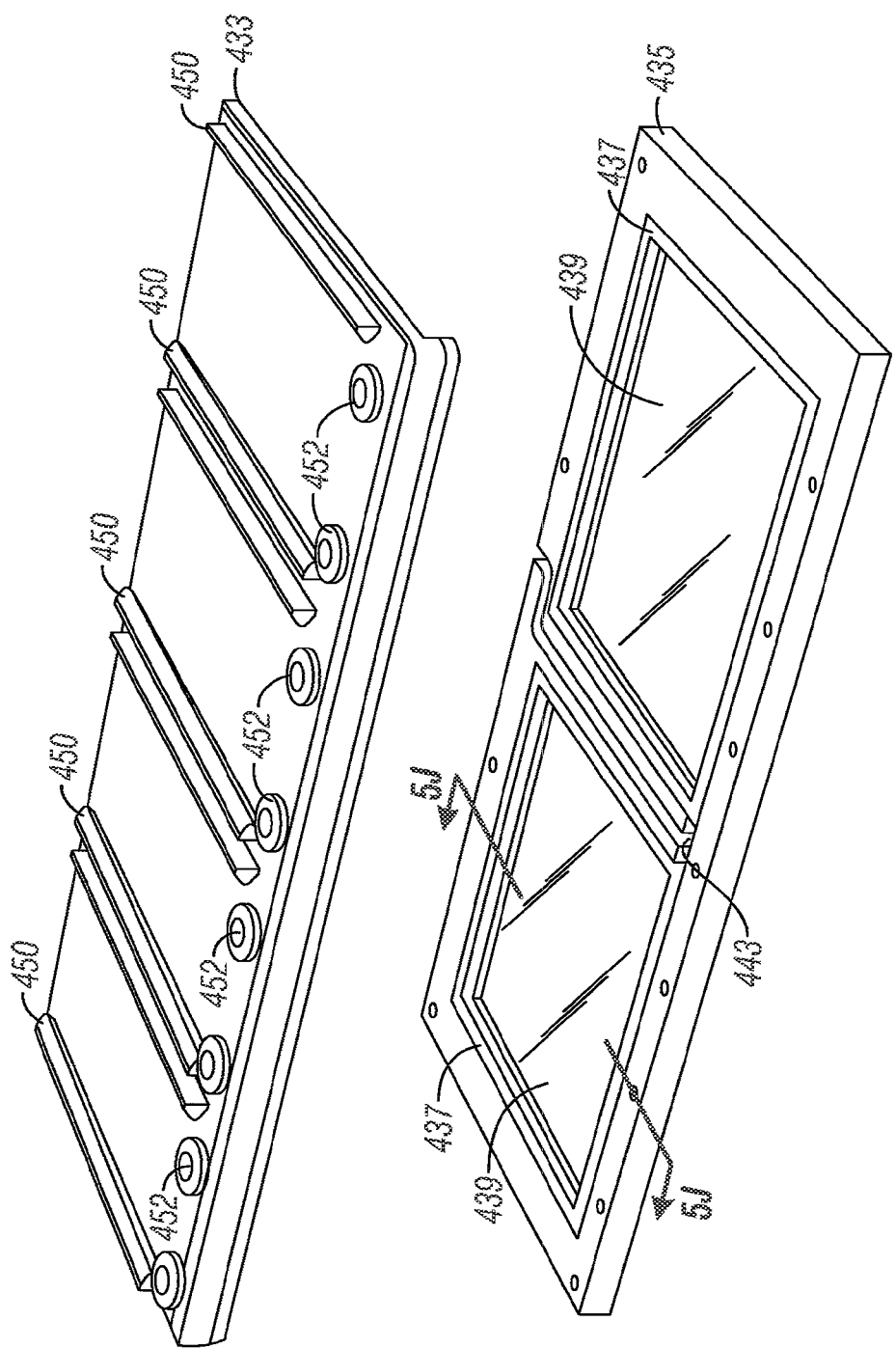

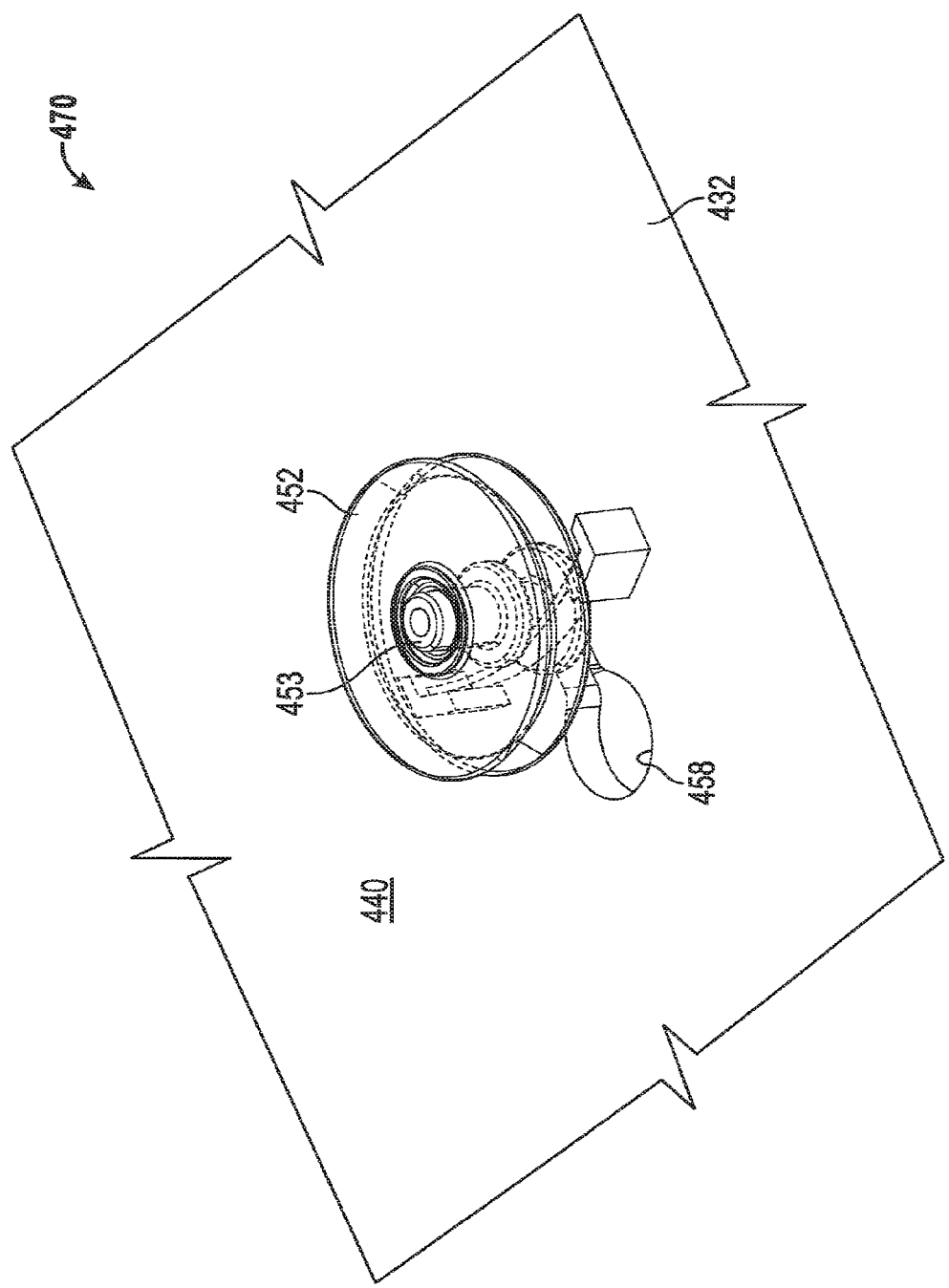

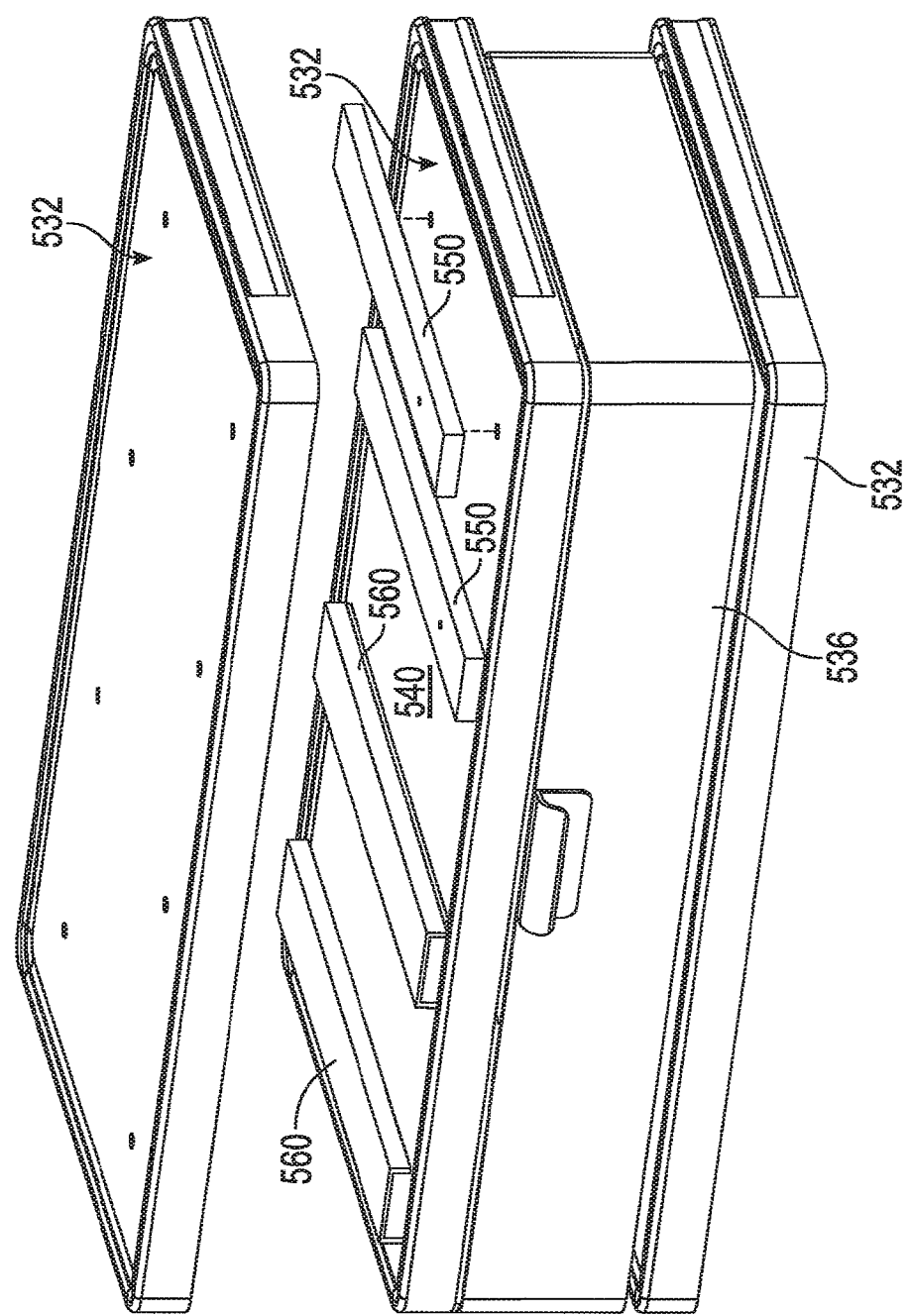

APPARATUS, SYSTEM, AND METHOD FOR STORAGE IN A REFRIGERATED APPLIANCE

CROSS-REFERENCE TO RELATED APPLICATION(S)

This application is a continuation of and claims priority to U.S. patent application Ser. No. 14/207,918, filed on Mar. 13, 2014, entitled "APPARATUS, SYSTEM, AND METHOD FOR STORAGE IN A REFRIGERATED APPLIANCE," which is a continuation-in-part of U.S. patent application Ser. No. 13/833,463, filed Mar. 15, 2013, entitled "APPARATUS, SYSTEM, AND METHOD FOR STORAGE IN A REFRIGERATED APPLIANCE," the disclosures of which are hereby incorporated herein by reference in their entirety.

BACKGROUND OF THE INVENTION

Field of the Invention

The present invention relates to refrigerated appliances and, in particular, storage of items in such appliances.

Problems in the Art

As advancements have occurred with refrigeration appliances, such as materials, temperature control, and space configuration, other advances have occurred regarding the variety and type of storage capabilities inside the appliance. Drawers, crispers, glass and wire shelves, storage bins, and plastic molded shelves are well known. But advancements in their makeup and configuration, and the combinations of such components, continue to proceed.

One issue with shelves, drawers, or bins that can be pulled out is the structure and components to allow them to be moved in that manner. Another issue is competition for space inside the appliance. A further factor is the cost of materials, manufacturing, and assembly.

These factors, as well as other considerations faced by the designer, can be competing and sometimes even antagonistic. For example, repeatability and durability of the structure/components that allows a drawer to be pulled out and pushed in over many years is important. This tends to drive the designer towards robust and thus perhaps more complex and costly components. It also tends to use up more space, which is to the detriment of storage or other usable space inside the appliance.

Another example involves function. For example, a sufficiently robust slide or glide system for a relatively large crisper bin may benefit from components and cooperation of elements to not only guide opening and closing but control or provide assistance to such movement between opposite end positions. Again, competing factors of complexity, cost, robustness and durability come into play.

Another issue in slideable storage space concerns the user experience relative to the sliding. For example, it can be beneficial for a crisper drawer to slide or glide smoothly and accurately between home (fully pushed into the cabinet) and fully extended, and without significant side-to-side play. But other dynamics of movement may be important to the user. Examples are:

a. small force and/or small variation in force required to move the slideable storage;

b. relatively small displacement from intended path of travel;

c. end positions that can be felt tactilely (the user feels when the drawer is nearing and then at fully home or extended positions);

d. minimal noise or sound when moving (e.g. clicking, scraping, or hissing);

e. no unreasonable sag (e.g. between empty and full bin).

These and other user experiences in sliding/gliding storage components in a refrigerated appliance must be considered which, again, can involve competing factors. They can include, but are not limited to, cost, aesthetics, ease of removability and re-installation into the appliance (e.g. for cleaning, repair, configuration, etc.), weight, and space consumption.

Consumers of appliances can also be concerned with and their buying decisions based on pricing and aesthetics. These can also be antagonistic. Highly developed form with desired function(s) can increase cost. A still further complication is that manufacturers can benefit from presenting the type of appliance across a range of price points. Some consumers want higher end, and usually higher price, brands; some want the opposite. Thus, the appliance designer also has to consider the ability to add attractive forms and innovative functions across price points. Sometimes it is not possible to add some features and/or aesthetics to lower end price points or, if possible to add, can represent significant challenges to the designer.

Still further, some appliance consumers demand flexibility in customizing an appliance, including its storage configurations. The consumer may have preferences regarding the placement and amount of different types of storage (e.g. bins versus shelves or racks) and their size and purpose. Present refrigerated appliances typically have refrigerated compartments and freezer compartments. Examples of some of the types of storage are shelves and racks. But fully or partially enclosed storage can include such things as crispers, pantry drawers, freezer drawers, meat bins, vegetable bins, to name a few. Many times these storage types need to be able to be pulled out at least partially from the cabinet to allow good access to their interiors. In all this, minimal disruption to the interior space within the refrigerated and freezer compartments is preferred. Lighting for the interior space, given all possible variations in storage configuration, can be problematic unless it is adaptable along with changes to the storage configuration. Still, keeping clean lines and appearance and minimizing disruption within the interior while accommodating multiple storage and lighting configurations is desirable.

There is a continuing need in the art for addressing these problems and issues.

SUMMARY OF THE PRESENT INVENTION

It is therefore a principal object, feature, aspect or advantage of the present invention to address and improve over problems and deficiencies in the state of the art.

Additional objects, aspects, features and advantages of the invention relate to an apparatus, system, or method for storage in a refrigerated appliance which:

a. balances competing interests for storage and functionality in a refrigerated appliance;

b. can be advantageously utilized to add useful storage space;

c. can provide flexibility in cost and function of slideable storage relative to design demands;

d. can be advantageously used by the designer for improved aesthetics;

e. can be advantageously used by the designer for highly flexible planning of usable space, as well as desirable functions;

f. is compatible with control and guidance features for slideable components and functions demanded by consumers.

These and other objects, features, aspects and advantages of the invention will become apparent with reference to the accompanying specification and claims.

In one aspect of the invention a system of supporting and embodying a storage component in a refrigerated appliance between a home or pushed-in position and an extended or pulled-out position includes a base, a pull-out component or carriage mounted on top of the base, the pull-out component having a bottom with opposite sides, a front and a rear defining a bottom perimeter, a first guide member attached to or integrated with the bottom of the pull-out component and within the opposite lateral side edges of the bottom of the pull-out component, and a second guide member attached or integrated with the base, the second guide member cooperating with the first guide member to guide the pull-out component relative to the base along an axis between the home and pulled-out positions. An example is a single glide or slide rail on the base and a single complementary or cooperating glide or slide rail on the pull-out component provide the primary glide or slide for the pull-out component or carrier. The carrier can be a receiver that removably receives a bin or other storage component. The bin would move with the carrier. Alternatively, the carrier can be eliminated and the pull-out member carrier can be the bin or other storage component itself.

In another aspect of the invention, a method of supporting and guiding a storage component in a refrigerated appliance comprises providing cooperating sliding or gliding surfaces between the bottom of the storage or pull-out component and a base underneath it where the cooperating components are underneath and within the side boundaries of the pull-out component.

In another aspect of the invention, instead of a single rail glide or slide configuration, a pair of rails on the base can cooperate with a complementary pair of rails on the carrier or bin, the pair of rails being underneath and within the opposite sides of the bottom of the carrier or bin.

In another aspect of the invention, additional guiding and sliding assistance can be provided. One example is one or more wheels or rollers positioned within the opposite side edges of either the carrier (or bin if no carrier) or the base and cooperating with the glides or slides on the other of the carrier (or bin) and the base. Further examples of the types of movement assistance can include one or more of the following: automatically pull the slideable storage component closed (or fully open) as it approaches fully closed (or fully opened) position(s); control of motion; control of lateral and vertical movement; and control of noise during movement. The designer can build in structure or components to address these things. The designer can balance competing factors, including cost and aesthetics.

In another aspect of the invention, a system for pull-out storage units in a refrigerated appliance is facilitated by fully under-bin glides. The glides or slides can be designed both for fixed-in-place configurations or for adjustable/customizable/changeable configurations inside the appliance.

Another aspect of the invention includes a system for pull-out storage components in a refrigerated appliance which includes under-bin slides or glides and associated components to guide and assist sliding and gliding within a range of tolerance relative an intended direction of movement, control resistance or provide assistance to manual pulling or pushing, and/or help the user find end-of-travel positions.

A further aspect of the invention is to provide a system for under-bin slides or glides across the width of one level of a refrigerated appliance whereby the size or type of storage component can be verified across that width. The system can also be implemented at plural levels in the appliance.

An additional aspect of the invention is to provide a modulated drawer system for a cabinet. The modulated drawer system includes a first pull out component having a bottom with side edges defining a perimeter and one or more guide members extending within the perimeter between an opposite pair of the side edges. The guide members may be configured to cooperate with one or more stationary guide members on a base of the cabinet. A storage component includes a bottom configured to receive the perimeter of the first pull out component. A shelf component includes a frame spaced between opposite side edges having a perimeter commensurate with the storage component. The shelf component may be configured with one or more pairs of opposing, longitudinally extending guide members extending within the shelf perimeter between an opposite pair of the side edges and one or more pairs of opposing inset guide members disposed between a pair of the opposing, longitudinally extending guide members. One exemplary aspect could include a second pull out component having a bottom with side edges defining a perimeter and one or more guide members within the perimeter having a feature cooperating with the opposing, longitudinally extending guide members and inset guide members.

A still further aspect of the invention is to provide a method for a modulated drawer system for a cabinet. A first pull out component having a bottom with side edges defining a perimeter and one or more guide members extending within the perimeter between an opposite pair of the side edges is provided. The guide members may be configured to cooperate with one or more stationary guide members on a base of the cabinet. The perimeter of the first pull out component is removably received in a bottom of a storage component and a shelf component may be removably placed over top of the storage component. The shelf component has a frame spaced between opposite side edges having a perimeter commensurate with the storage component. The shelf component may be configured with one or more pairs of opposing, longitudinally extending guide members extending within the shelf perimeter between an opposite pair of the side edges and one or more pairs of opposing inset guide members disposed between a pair of the opposing, longitudinally extending guide members.

Yet another aspect provides a refrigerator. The refrigerator includes a cabinet having one or more chilled compartments and a modulated drawer system. The modulated drawer system may be configured with a first pull out component having a bottom perimeter and one or more bottom mounted guide members extending within the perimeter between an opposite pair of the side edges, a storage component having bottom edges removably received over the first pull out component, and a shelf component having a frame spaced between opposite side edges. The shelf component may be configured with one or more longitudinally extending guide members extending within the within the frame between an opposite pair of the side edges and one or more inset guide members disposed between a pair of the one or more longitudinally extending guide members. In an exemplary aspect, a second pull out component has a bottom with side edges defining a perimeter having guide members within the perimeter that include a feature cooperating with the one or more longitudinally extending guide members and the one or more inset guide members on the shelf component.

A still further aspect provides a modulated drawer and shelf system for a cabinet. The system includes at least one conductive element on a vertical rail in a wall of the cabinet and a shelf component having a frame spaced between opposite side walls of the cabinet. The shelf component is supported in part by at least one bracket removably attached to the vertical rail. A base component is spaced between opposite side walls of the cabinet. At least one pull out component is configurably carried by the base component. The pull out component has a bottom with side edges defining a perimeter and one or more guide members extending within the perimeter between an opposite pair of the side edges. In one configuration, at least one of the components of the modulated drawer and shelf system has one or more lighting elements. The one or more lighting elements may be electrically coupled to the at least one conductive element.

Yet another aspect provides a method for a modulated drawer and shelf system for a cabinet. In one configuration, at least one conductive element is provided on a vertical rail in an interior wall of the cabinet. A frame of a shelf component is operably supported between opposite side walls of the cabinet with at least one bracket removably attached to the vertical rail. At least one pull out component is removably supported on a base component spaced between opposite side walls of the cabinet. The at least one conductive element is electrically coupled with one or more lighting elements housed in at least one of the components.

A still further aspect provides a refrigerator with a cabinet having one or more chilled compartments and a modulated drawer system. The drawer system may be configured to include at least one conductive element on a vertical rail in a wall of the cabinet and a vertically adjustable component having a frame spaced between opposite side walls of the cabinet. The vertically adjustable component may be configured to be supported in part by at least one bracket removably attached to the vertical rail. The modulated drawer system may also be configured with a base component having a frame spaced between opposite side walls of the cabinet. At least one horizontally adjustable component may be configurably carried by the base component. The horizontally adjustable component may also be configured to having a bottom with side edges defining a perimeter and one or more guide members extending within the perimeter between an opposite pair of the side edges. In one aspect, at least one of the components has one or more lighting elements that are electrically coupled to the at least one conductive element.

BRIEF DESCRIPTION OF THE DRAWINGS

General Concept of Under Bin Glides

FIG. 1D is an isolated perspective view of the storage components of FIG. 1B, showing two single-wide bins and one double-wide bin along the same horizontal level.

FIG. 1F is a still further example of an alternative storage bin configuration (one single-wide and one triple-wide bin) using the same under-bin glide system of FIGS. 1B and 1E.

FIG. 1H is an exploded view of a shelf of FIGS. 1A and 1C.

FIG. 1I is a perspective view of a left rail, center rail, right rail and an enlarged view of the center rail of FIGS. 1A and 1C.

One Rail Example

FIG. 2A is a perspective view of an exemplary embodiment according to the present invention showing two opaque storage bins on an under-bin glide system and a shelf above those opaque bins.

Figure 2B:
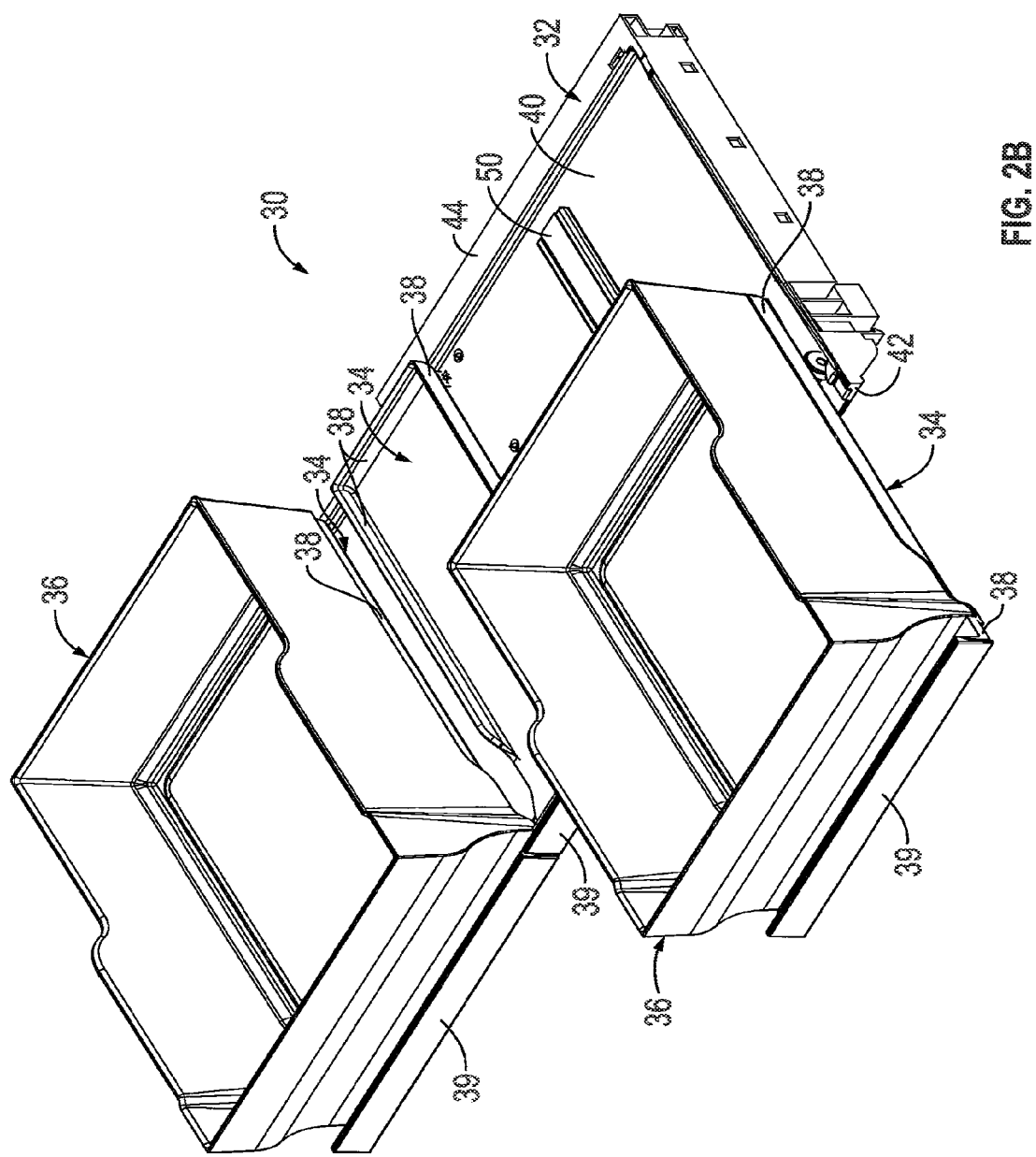

FIG. 2B is similar to FIG. 2A showing the same under-bin glide system (without the shelf above) but showing how one of the bins slides on an under-bin glide system.

Figure 2C:
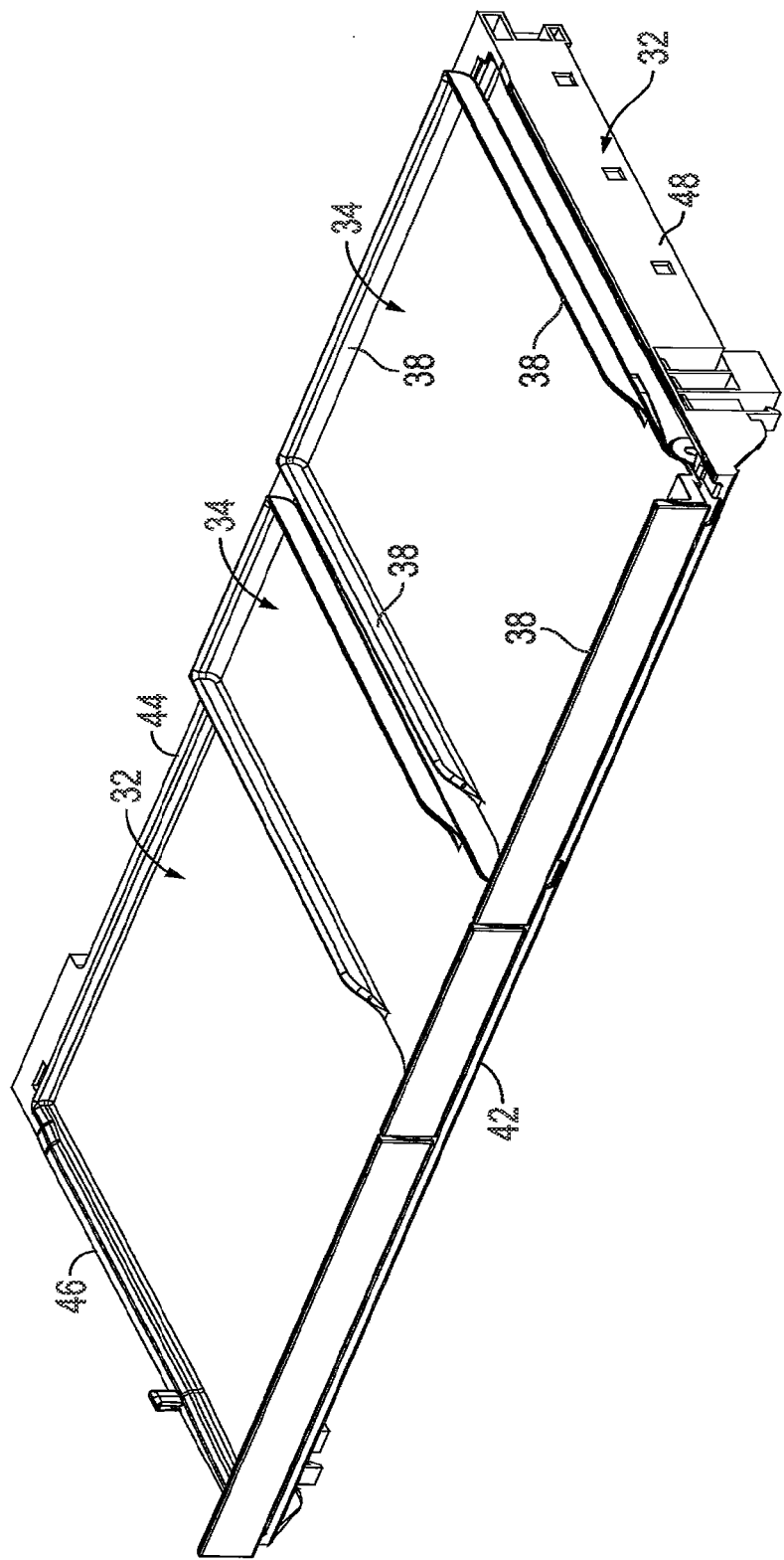

FIG. 2C is an isolated view of the under-bin glide system according to this exemplary embodiment, namely showing a base with independently glideable bin carriers (three of them) but without any bins placed on the bin carriers.

Figure 2D:
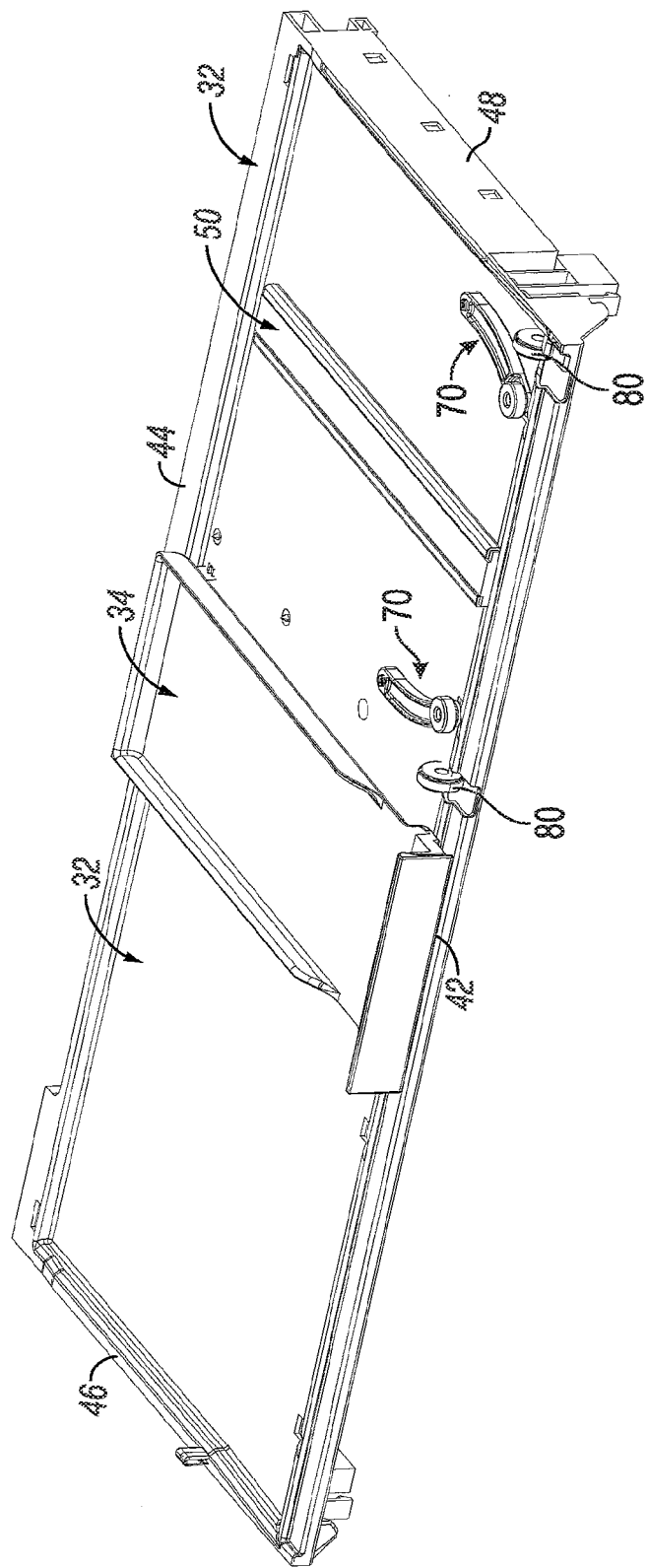

FIG. 2D is an isolated view of the base of FIG. 2C, showing under-bin glide components for the left side of the base, a smaller middle bin carrier in operating position in the middle of the base and just the base for the right side. FIG. 2D also shows an optional tolerance take-up system and anti-tip system for the right-side (it could be used for the middle and left side too) that could be used with the carrier to control its movement.

Figure 2E:
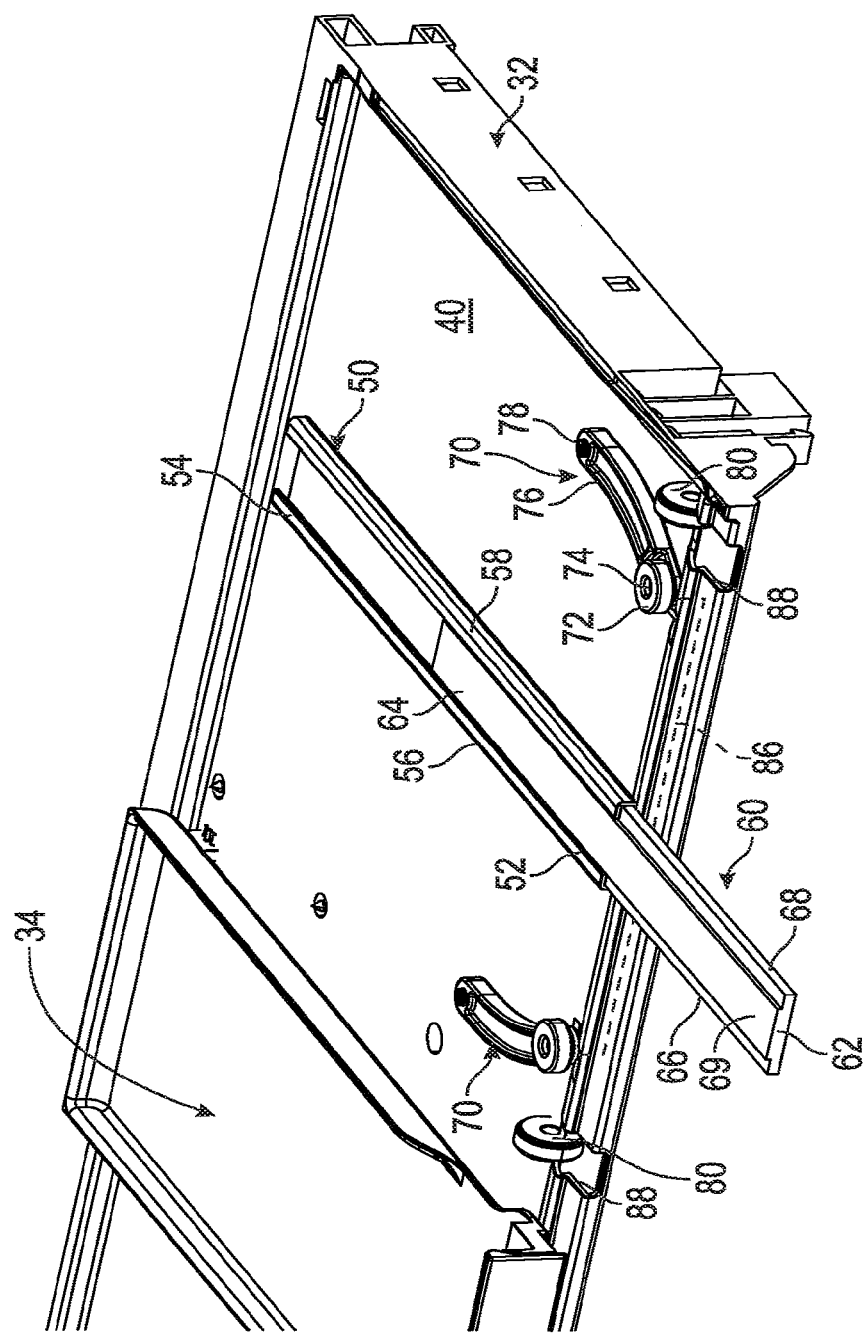

FIG. 2E is an enlarged view of the right side of FIG. 2D showing a single rail under-bin glide system including a rail mounted on the base and also a complementary rail that would be mounted to the bottom of a carrier plate (not shown) and which would slide in the base rail.

Figure 2F:
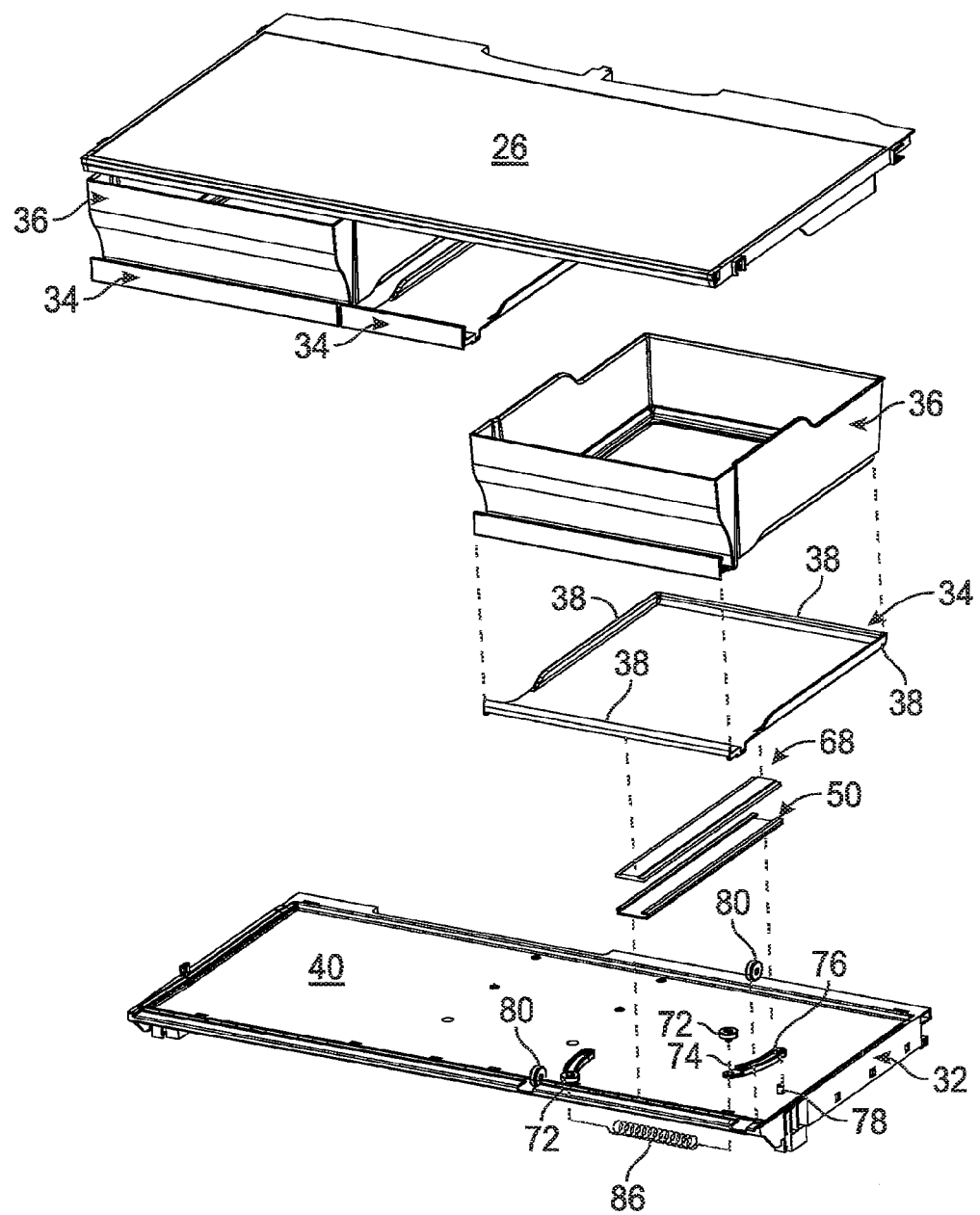

FIG. 2F is an exploded view of the right-most carrier and bin of FIG. 2A (the two left-most carriers are shown assembled).

Figure 2G:
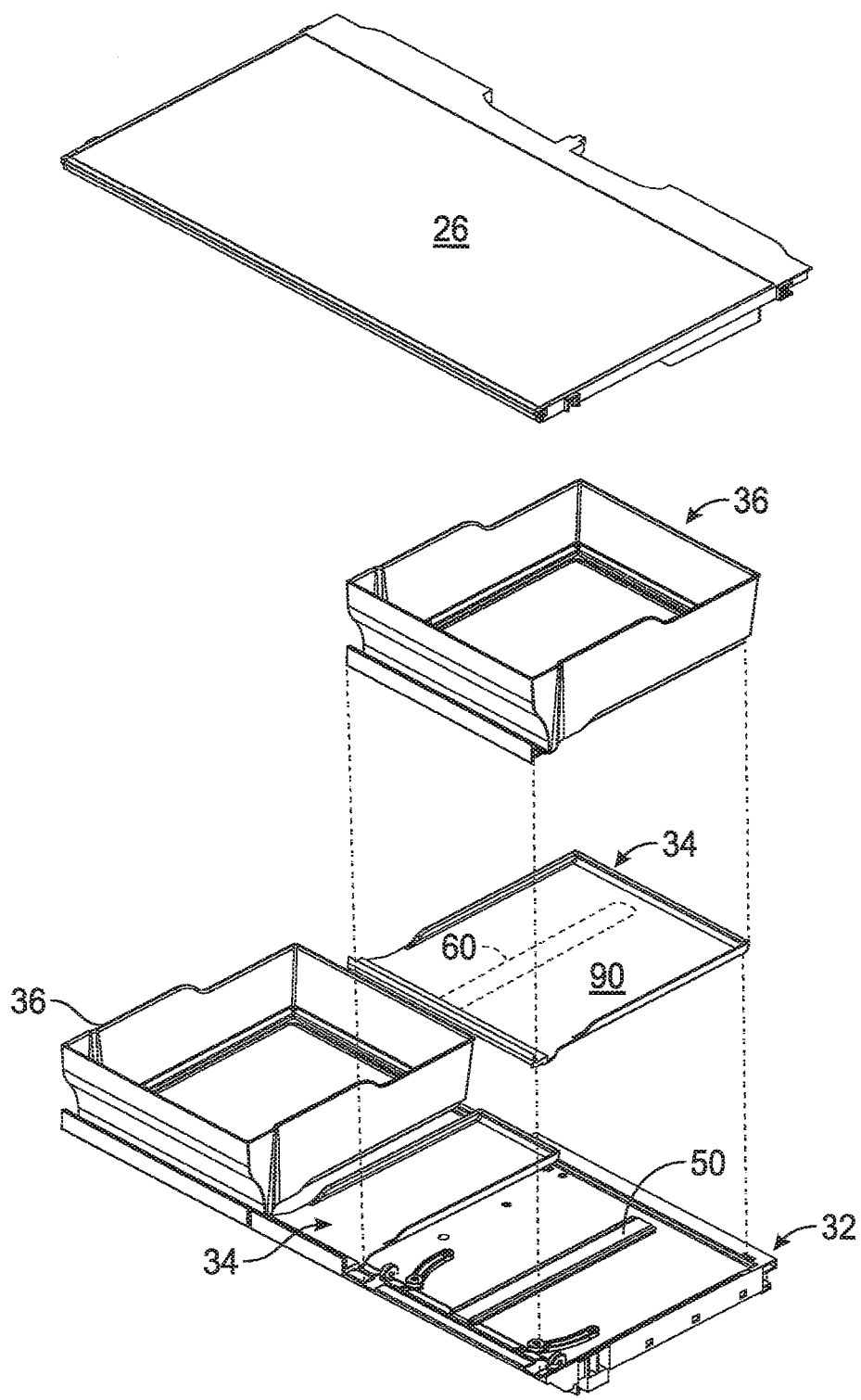

FIG. 2G is similar to FIG. 2F but shows the base single rail and tolerance/anti-tip systems assembled to the base.

Figure 2H:
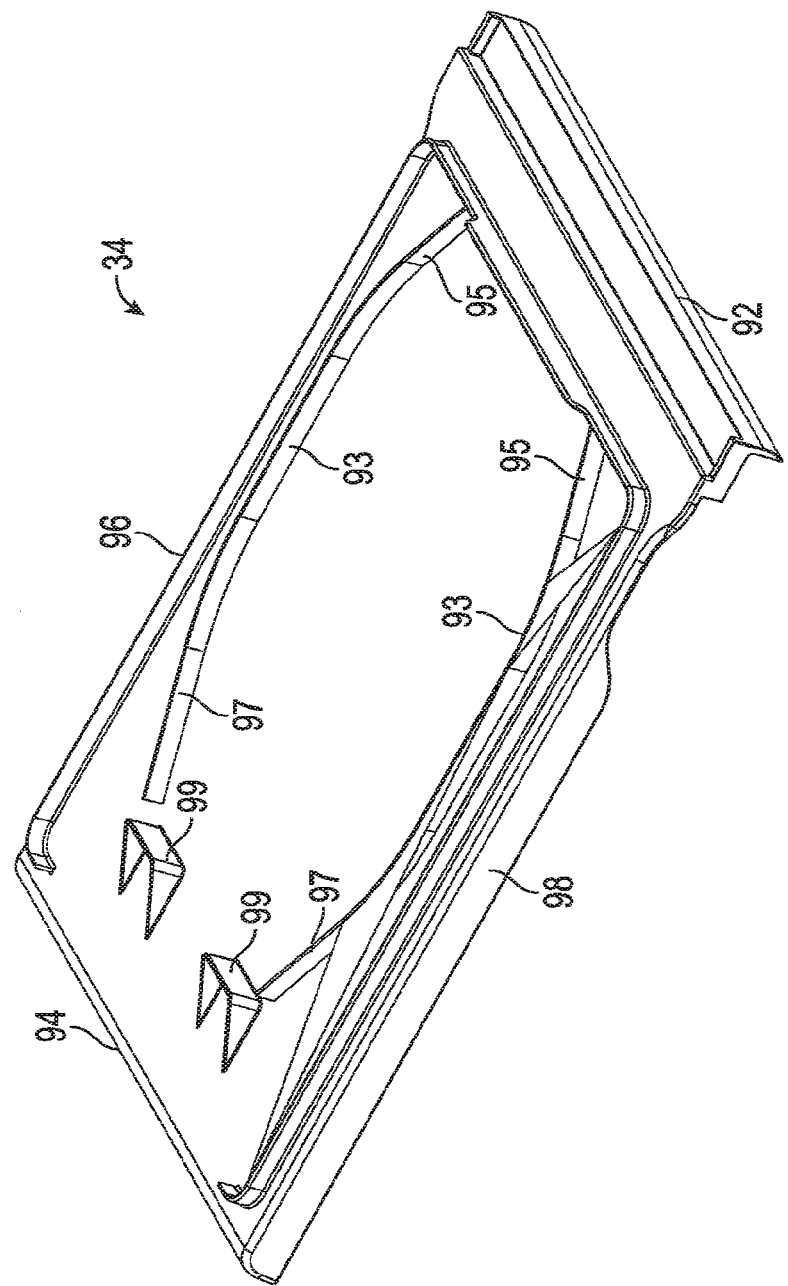

FIG. 2H is a bottom perspective view of right-most bin carrier of FIG. 2F showing tolerance take-up structure and end stops.

Figure 2I:
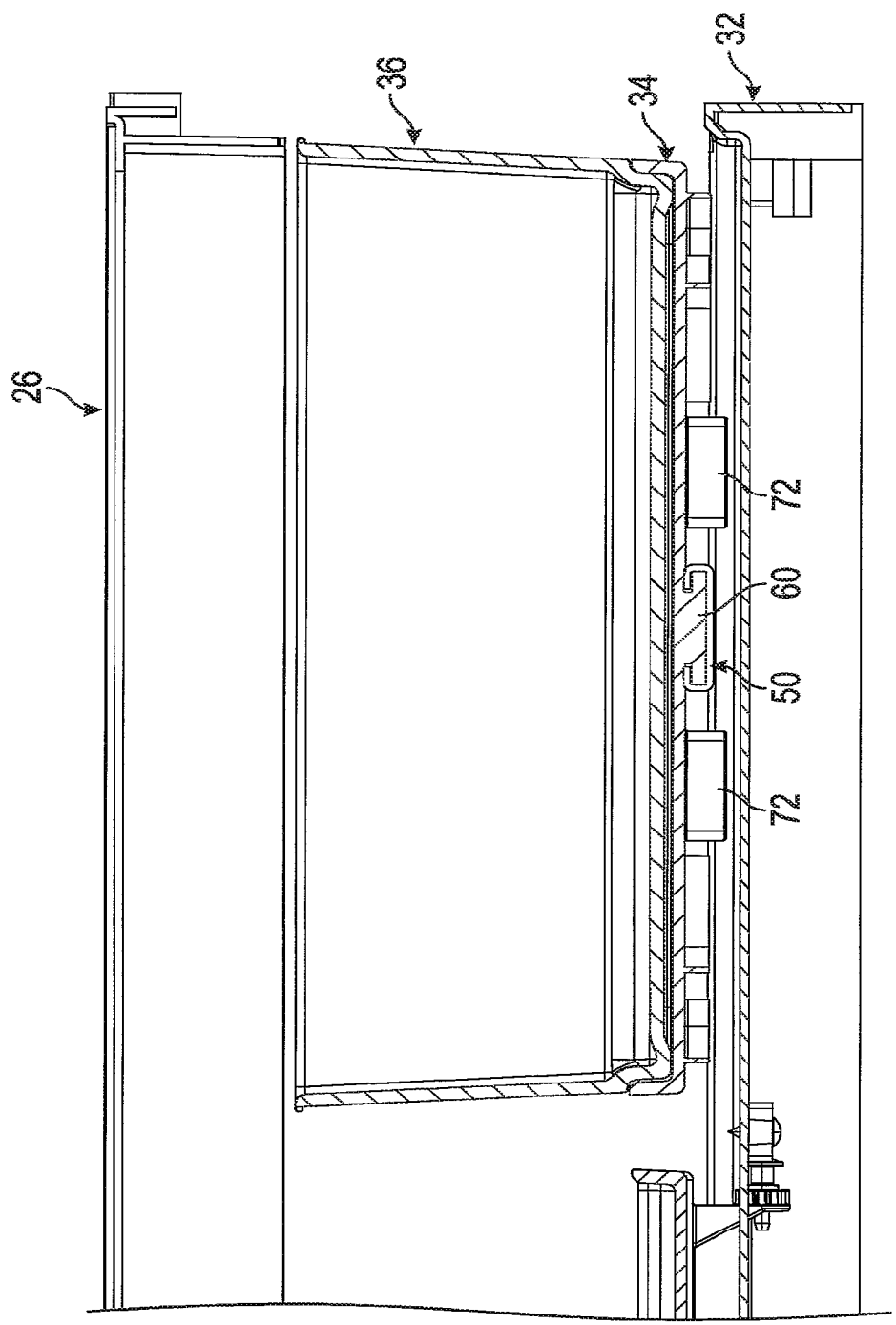

FIG. 2I is a sectional view of the assembled bin, carrier, and base of the right-most bin of FIG. 2F.

FIG. 2J is a still further enlarged close up sectional of the complementary under bin glide single rail components of the base and carrier of FIG. 2I.

FIG. 2K is a top plan diagrammatic view illustrating how the tolerance take-up system associated with the horizontal wheels on pivoting arms of the base cooperates with the oppositely bowed thin walls to control and influence speed and resistance to movement to and from opposite ends-of-travel.

FIG. 2L is similar to FIG. 2K but shows the carrier partially pulled-out to illustrate operation of the tolerance take-up system.

Two Rail Example

Figure 3A:
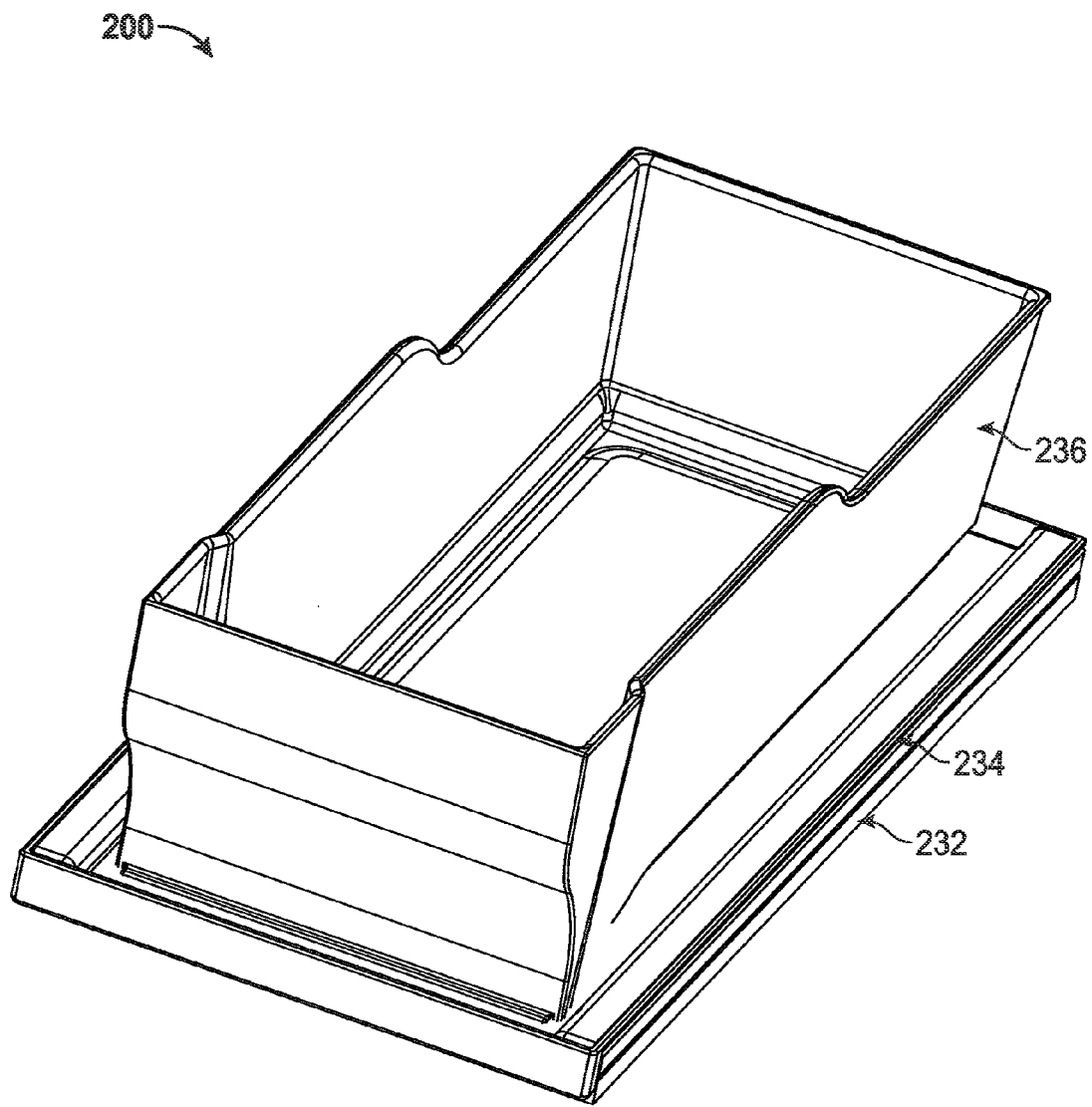

FIG. 3A is another alternative exemplary embodiment (two rail version) according to the present invention showing just one base, bin carrier and storage bin.

Figure 3B:
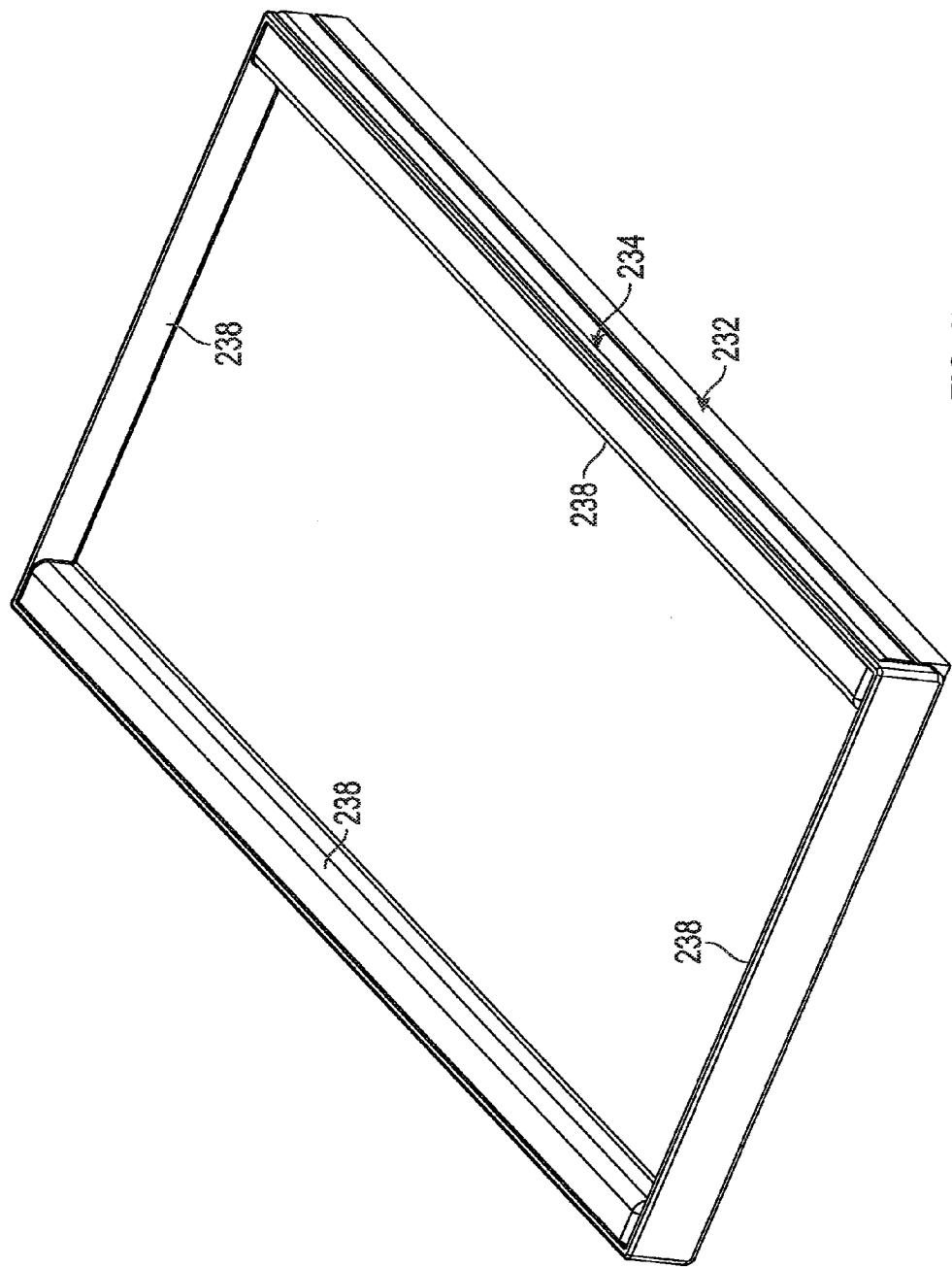

FIG. 3B is an isolated view of the bin carrier and base of FIG. 3A.

Figure 3C:
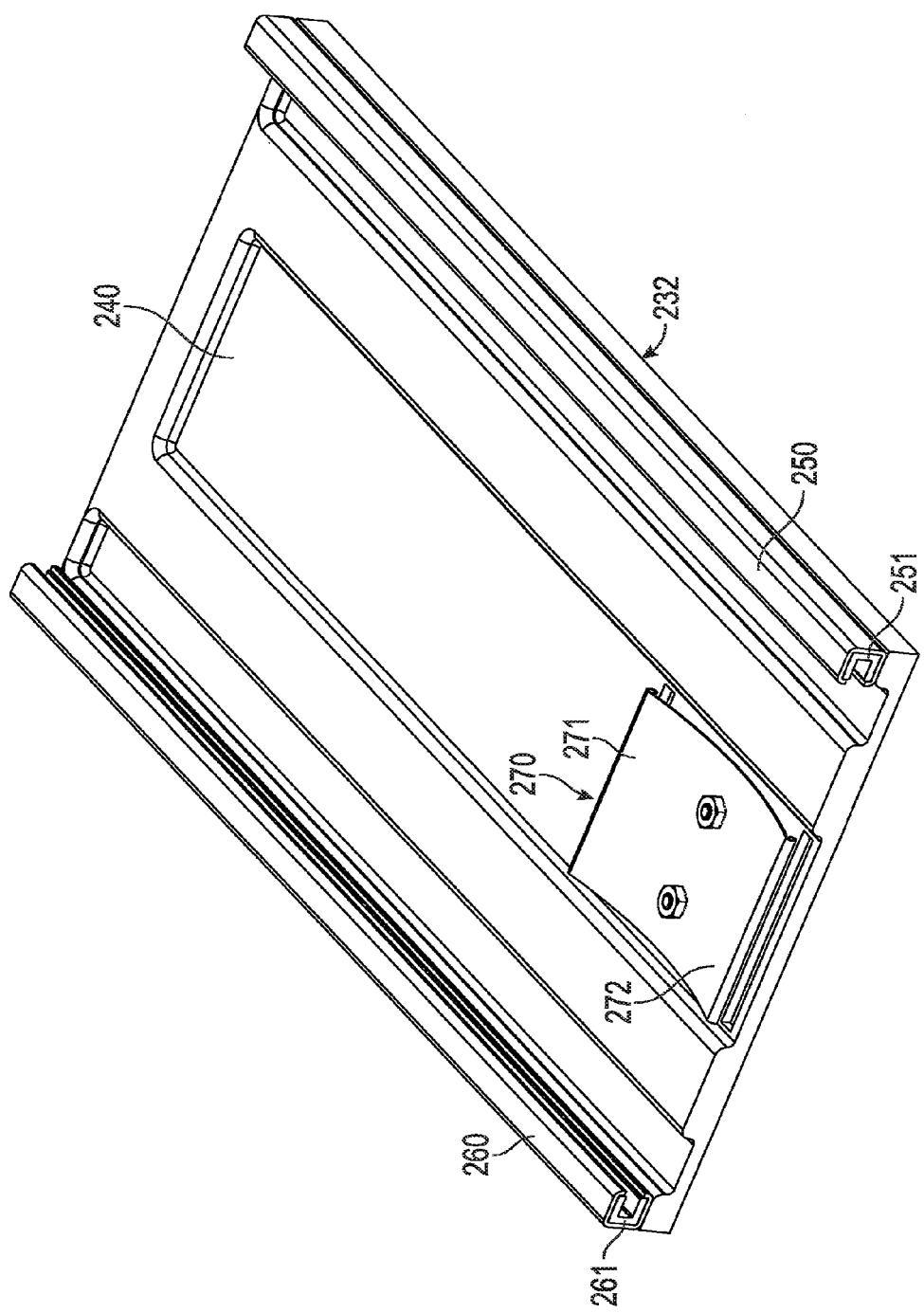

FIG. 3C is an isolated view of the base of FIG. 3B including a home-finding device.

Figure 3D:
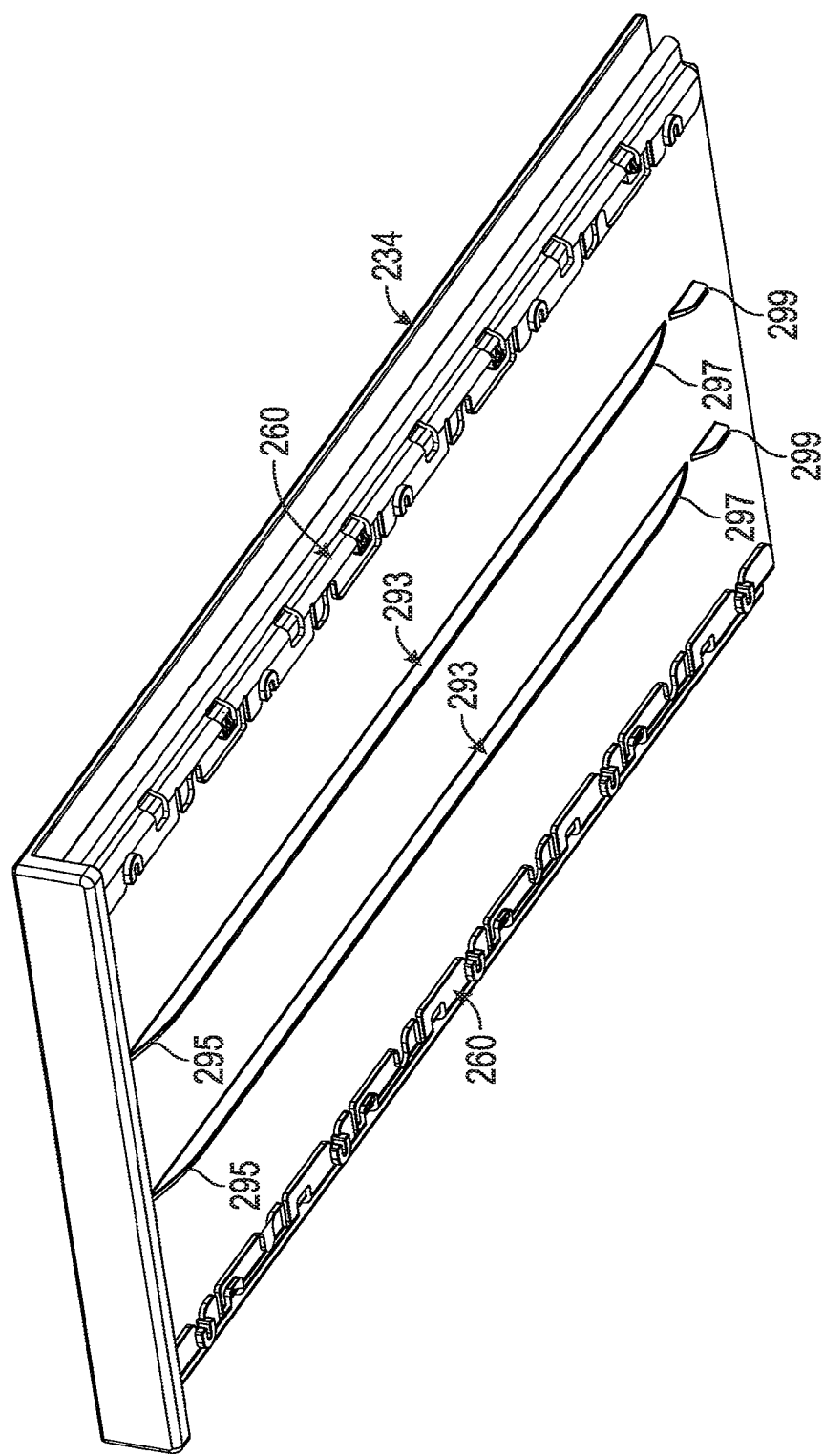

FIG. 3D is a bottom view of the bin carrier of FIG. 3B including guidance and home-finding structure.

Figure 3E:
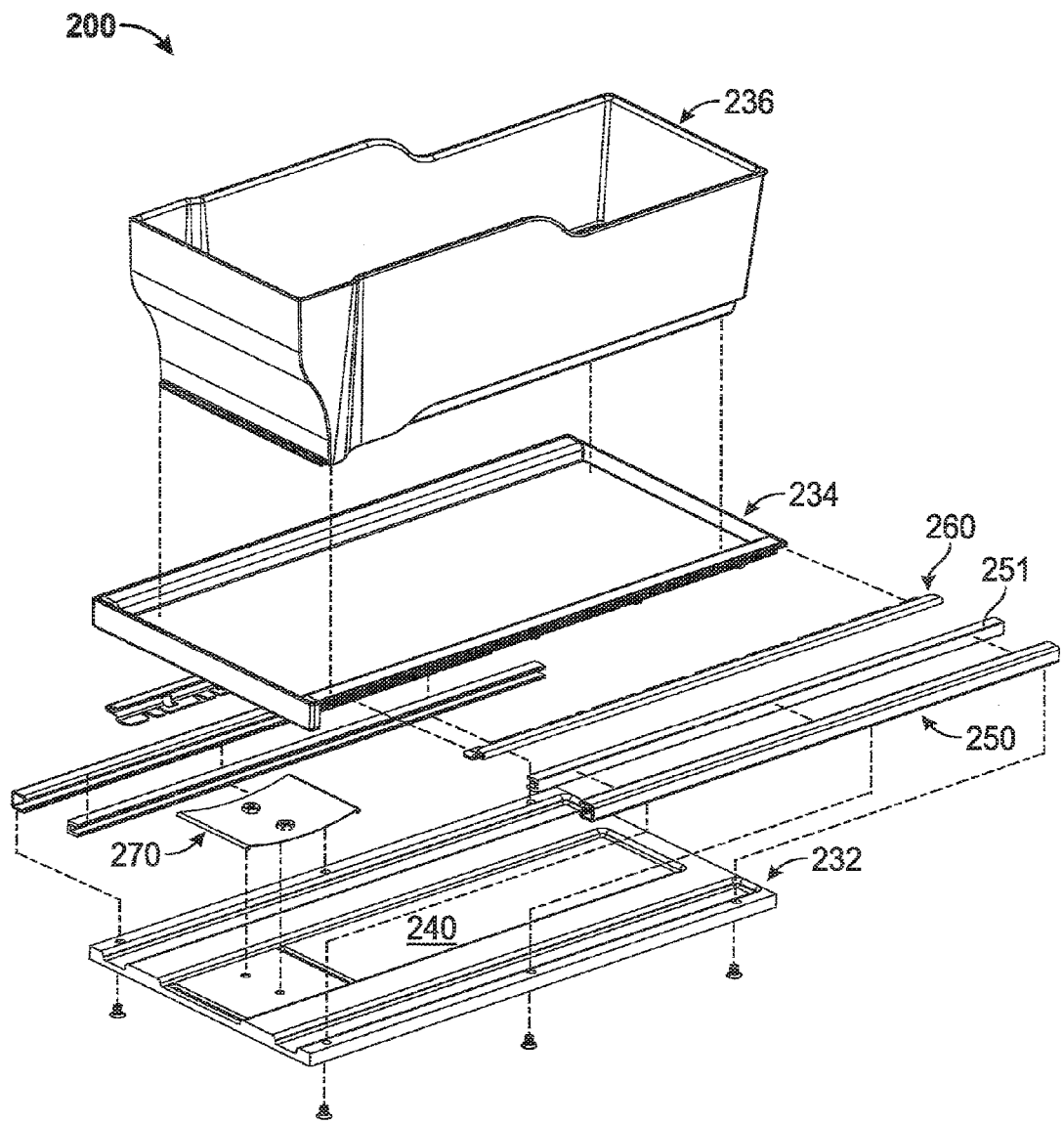

FIG. 3E is an exploded view of FIG. 3A.

FIG. 3F is an enlarged sectional view of FIG. 3A showing how the two rail under-bin glide example works.

Figure 3G:
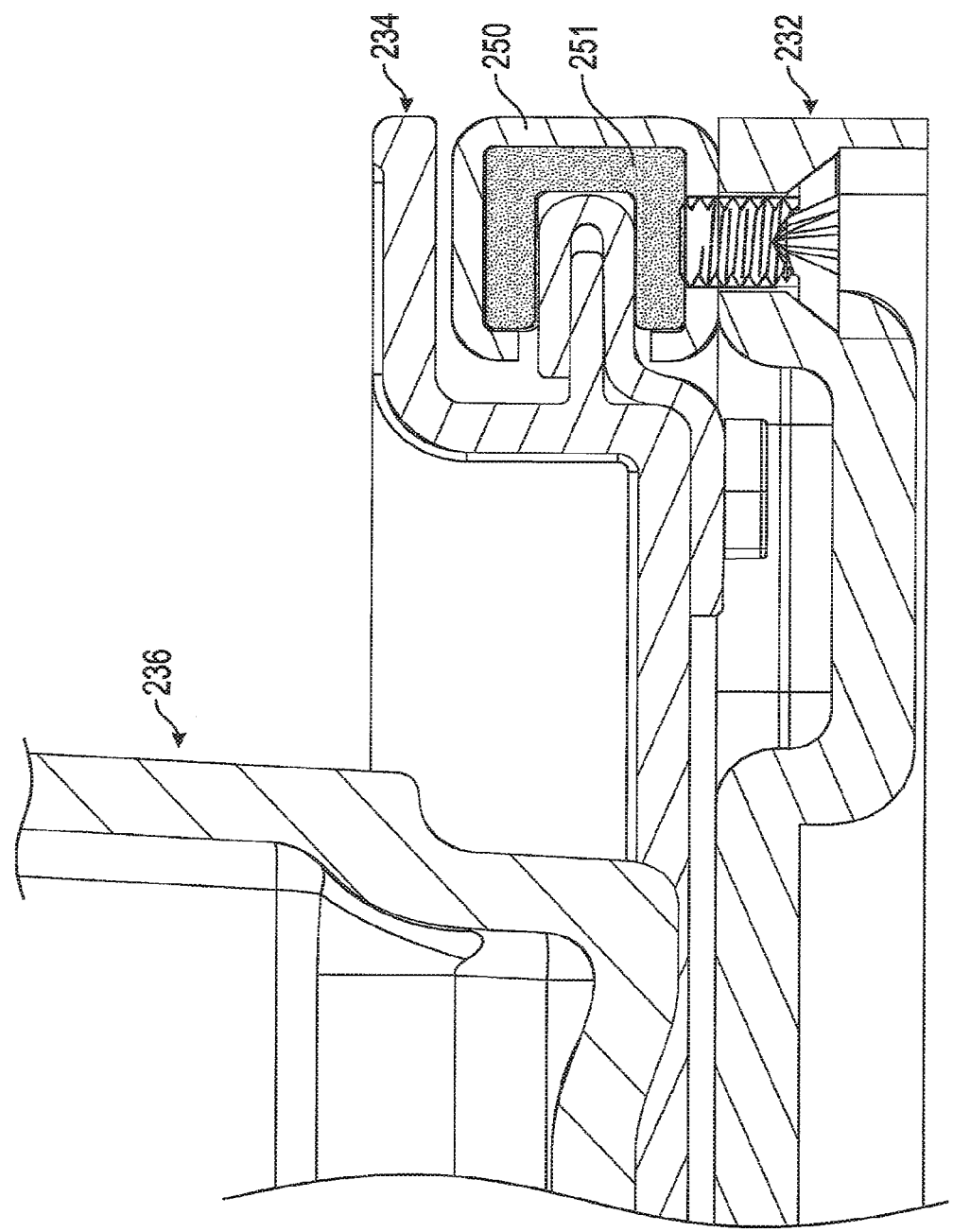

FIG. 3G is a still further enlarged isolated view of the complementary glide rails of base and bin carrier on the right side only.

Dual Rail, Low Friction Surface(s) Example

Figure 4A:
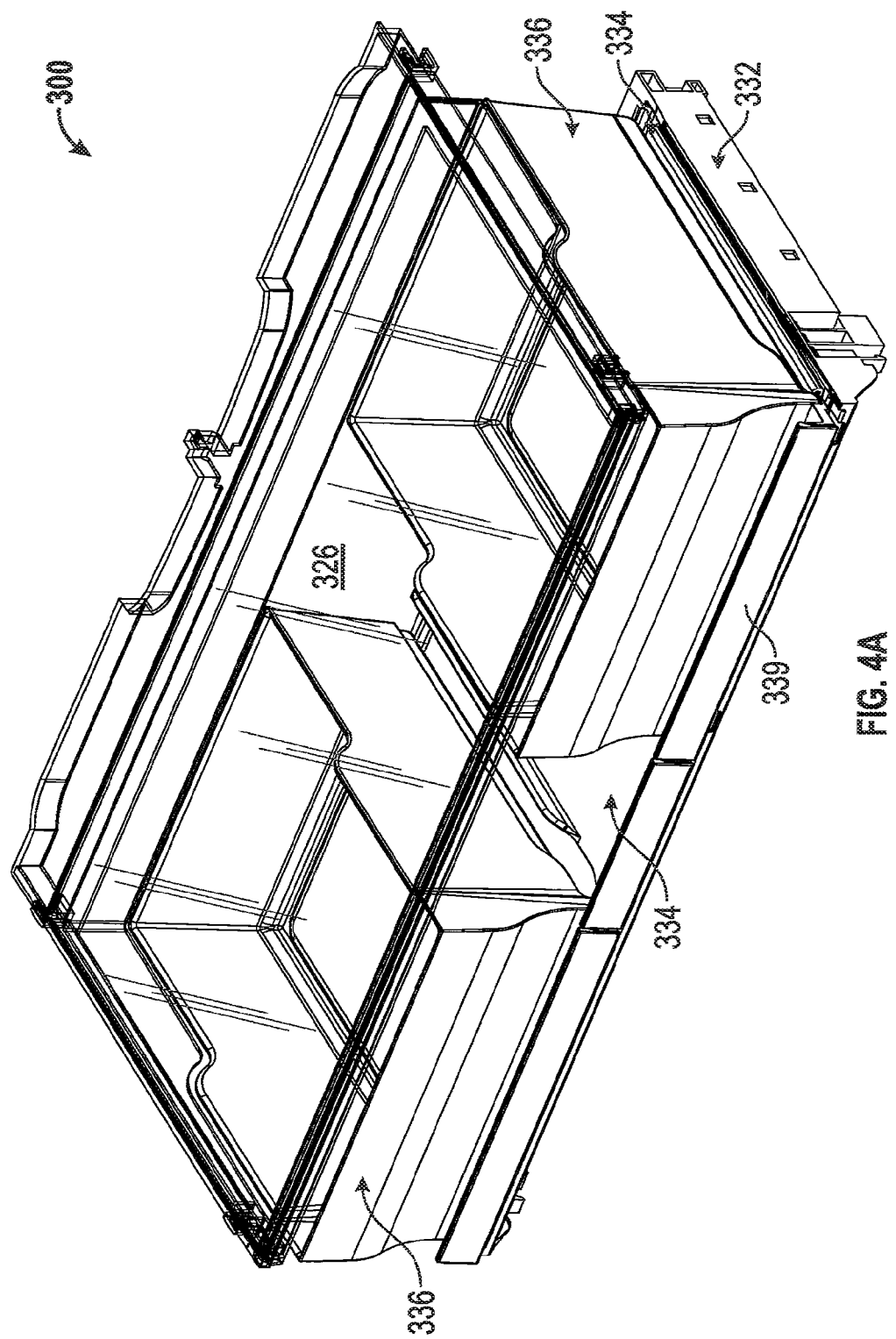

FIG. 4A is another alternative exemplary embodiment (two rail, low friction) according to the present invention in perspective view with a base, three side-by-side bin carriers, and bins set into the outer two bin carriers only. A glass shelf that could be independently mounted in the refrigerated appliance and act essentially as a cover for the bins is also shown.

Figure 4B:
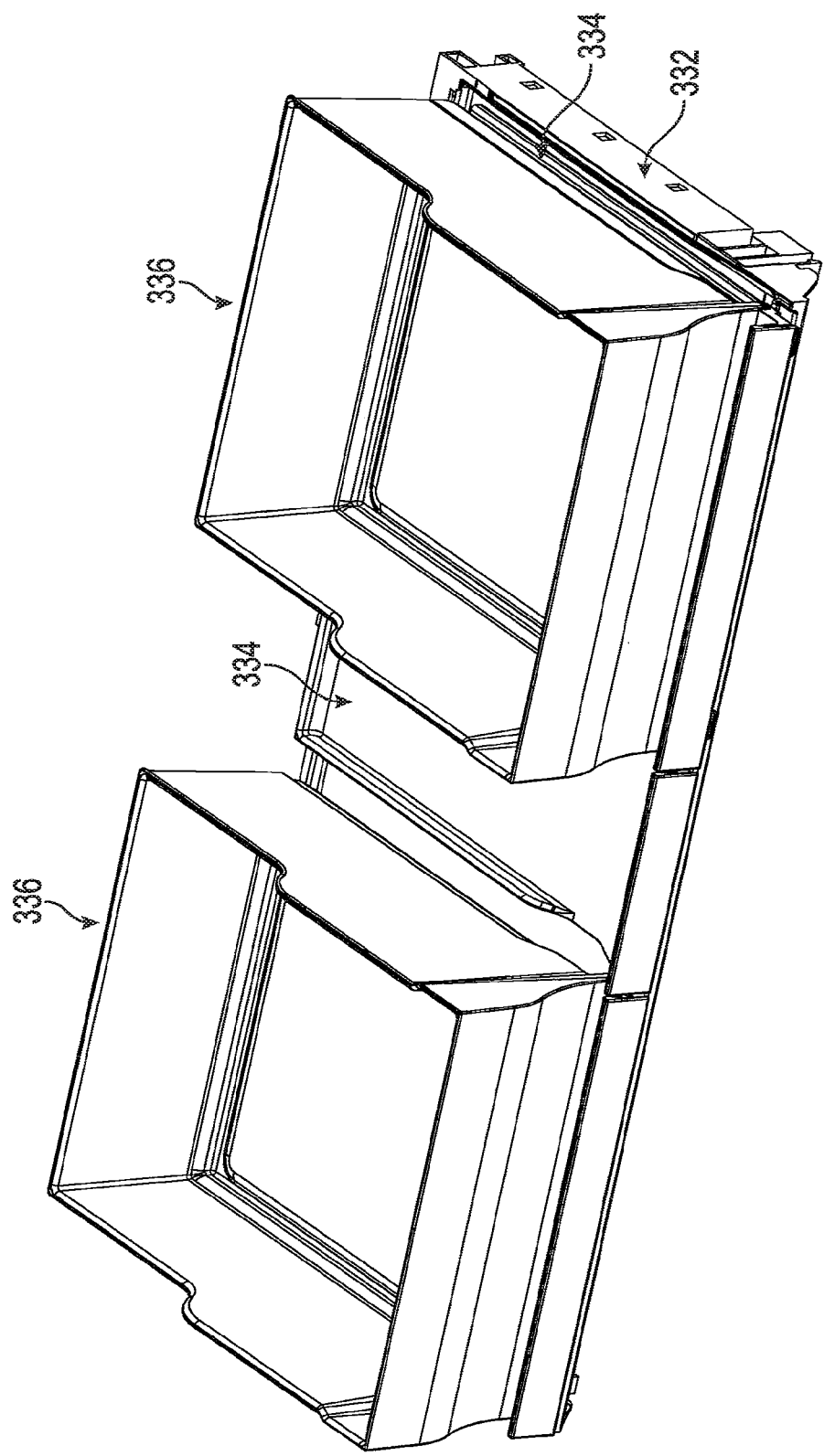

FIG. 4B is the combination of FIG. 4A without the optional and independent glass shelf.

Figure 4C:
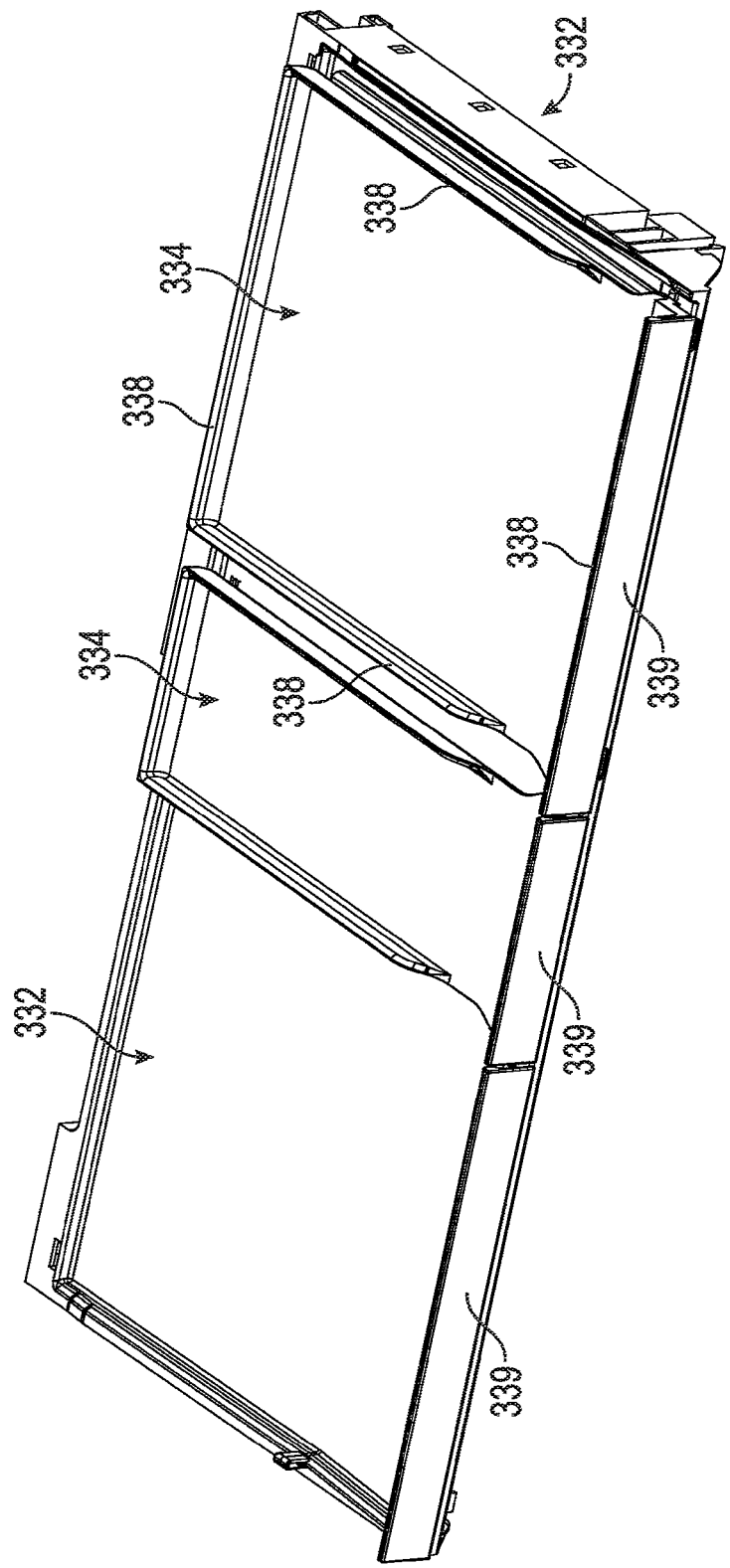
Figure 4D:
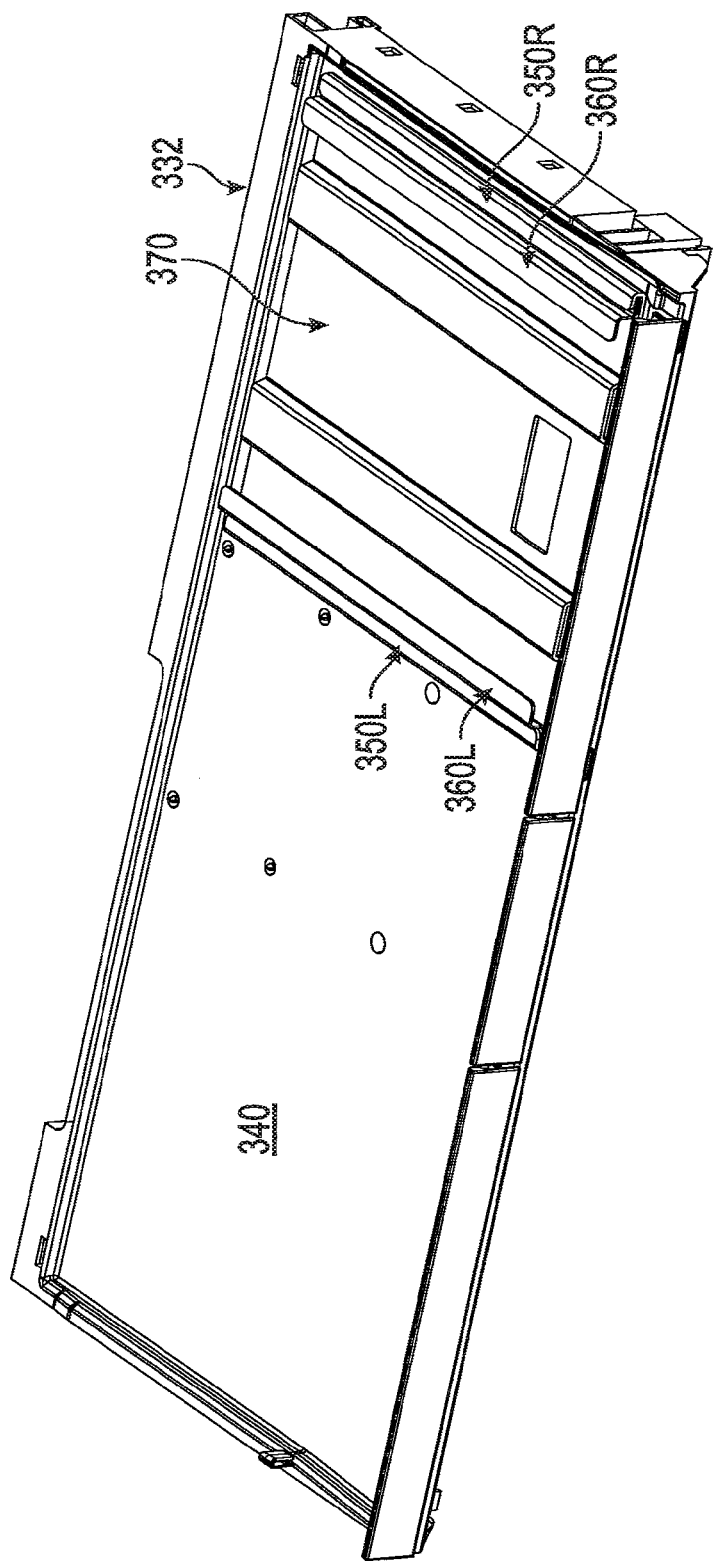

FIG. 4C is a perspective view of the bin carriers and base of FIG. 4B. FIG. 4D is a perspective view of the base of FIG. 4B showing its under-bin glides just with the right-most bin.

Figure 4E:
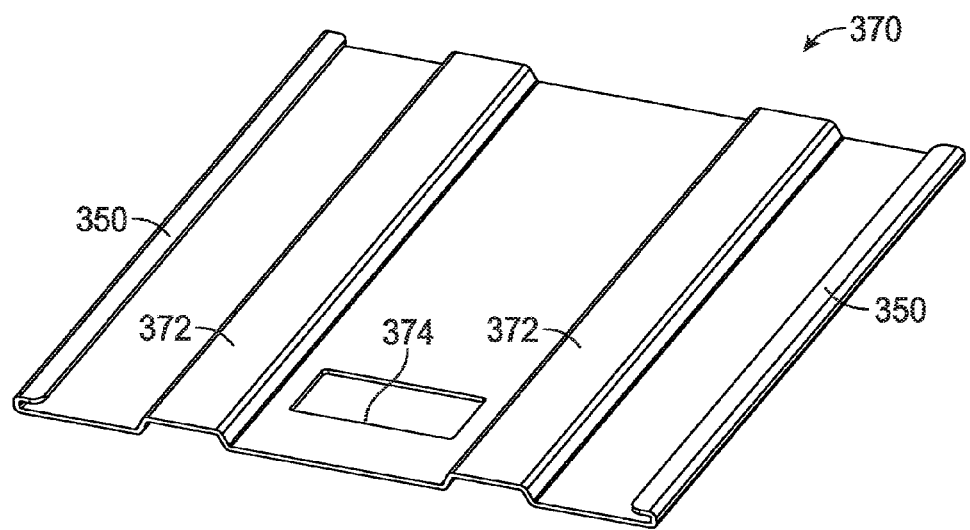

FIG. 4E is an isolated view of a tolerance control component for assisting in guided movement of the bin.

Figure 4F:
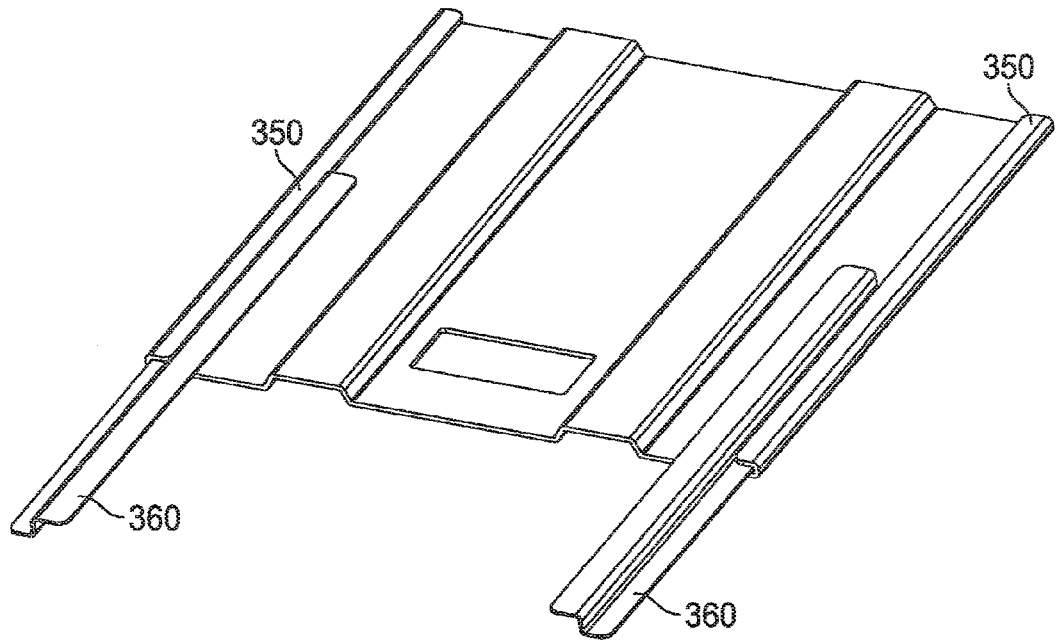

FIG. 4F is an isolated perspective view of the two rail under-bin glides in partially extended position.

Figure 4G:
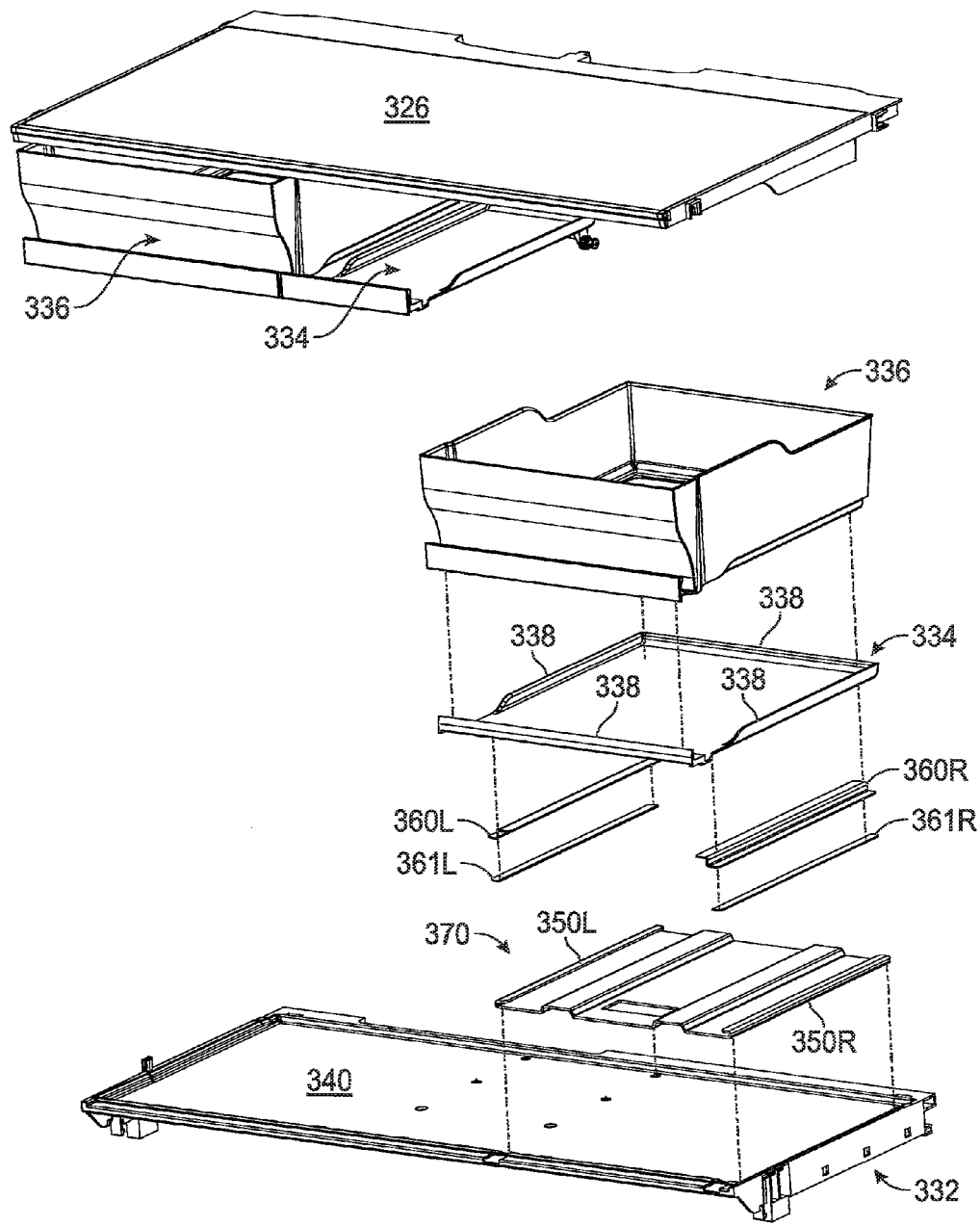

FIG. 4G is an exploded view of the right-most bin, bin carrier, and base of FIG. 4A.

Figure 4H:
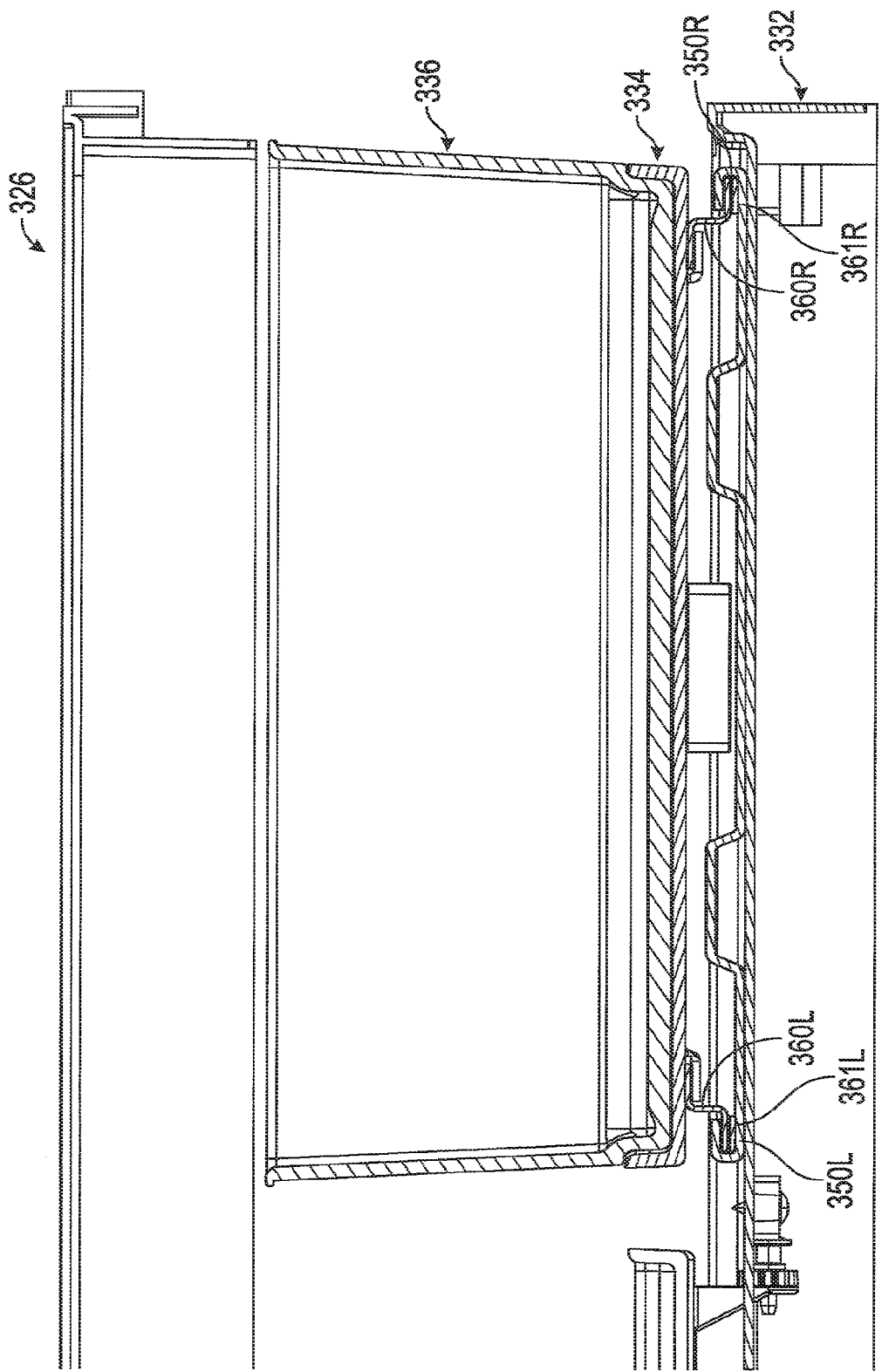
Figure 41:
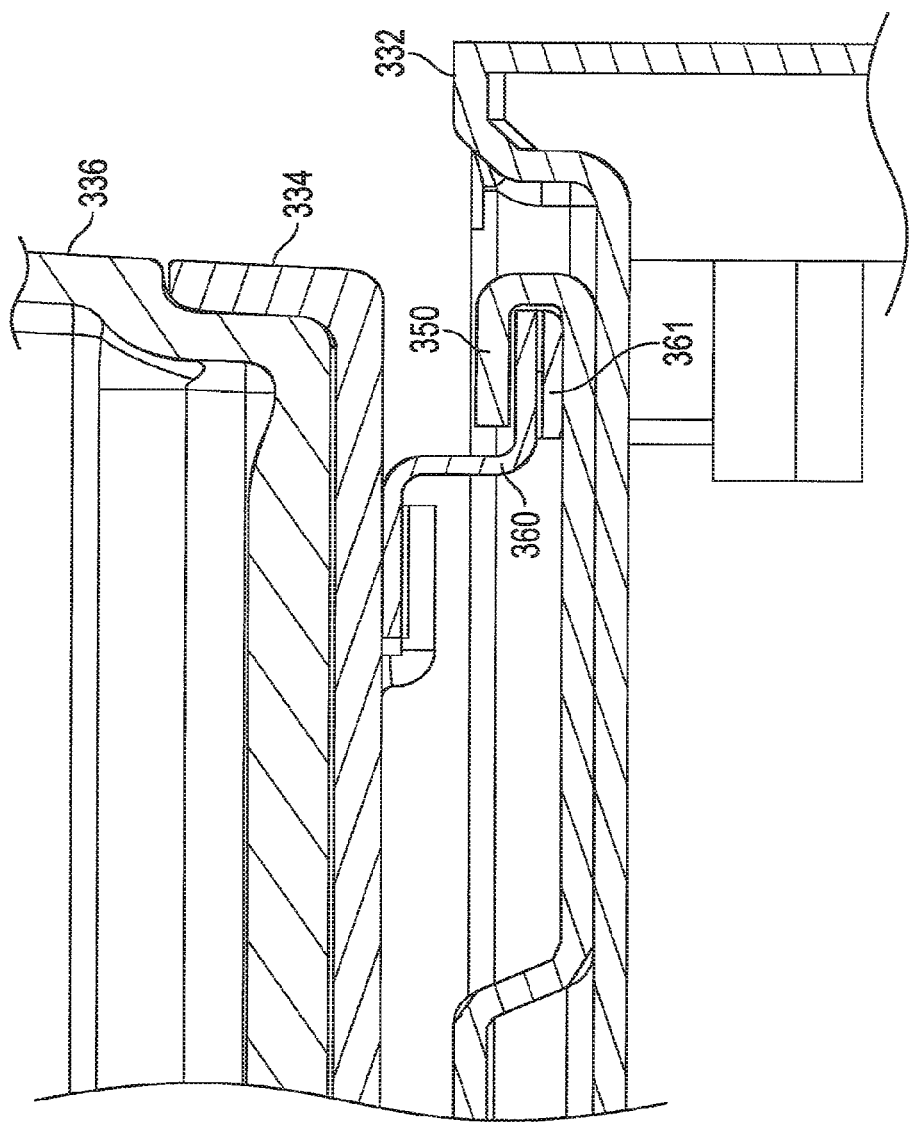

FIG. 4H is an enlarged sectional view of the assembled bin, carrier, and base of FIG. 4G.

FIG. 4I is a still further enlarged isolated view of the right side glide combination of base and carrier of FIG. 4H.

Horizontal Roller Example

Figure 5A:
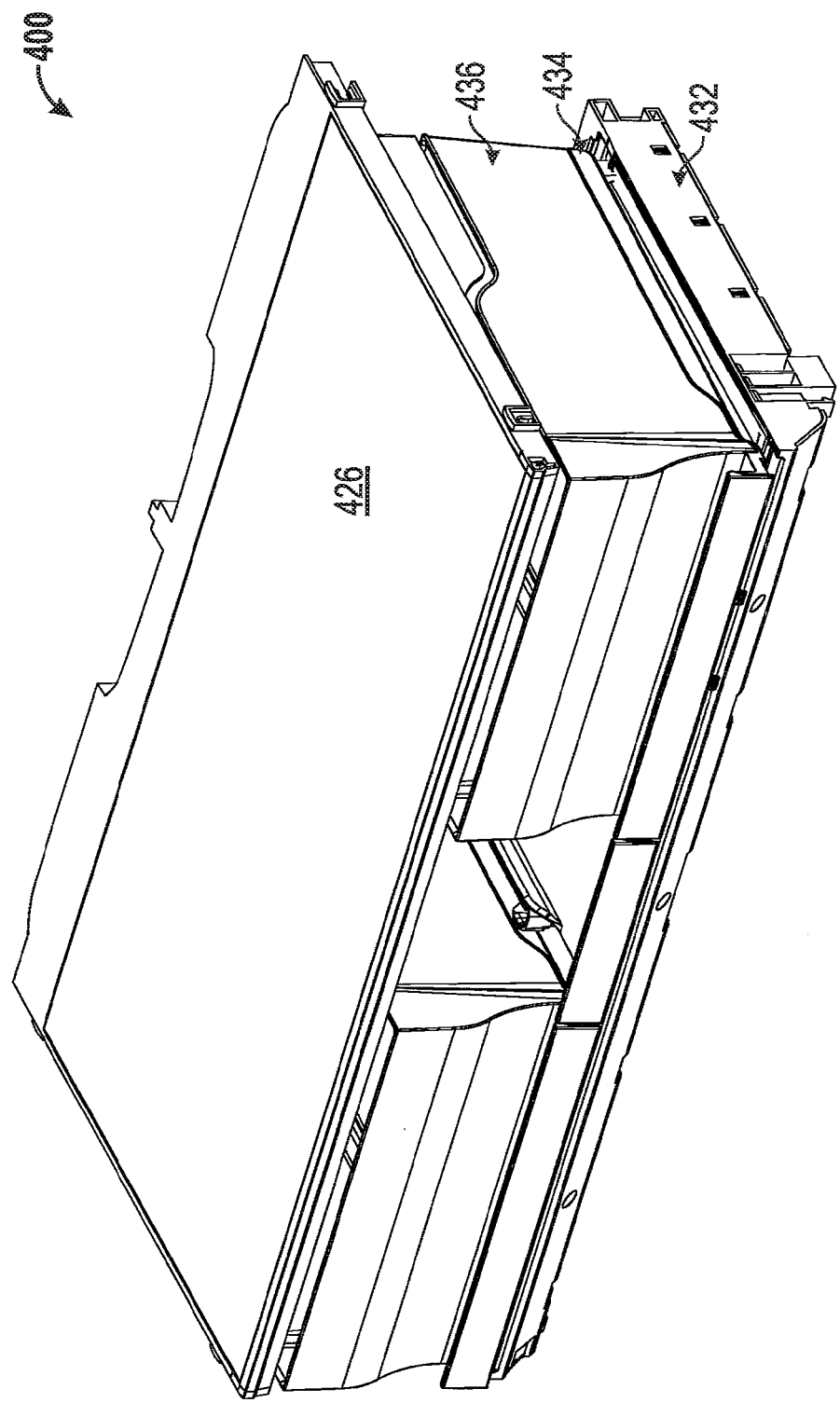

FIG. 5A is a perspective view of a still further alternative exemplary embodiment (using horizontal rollers and rails) according to the present invention.

Figure 5B:
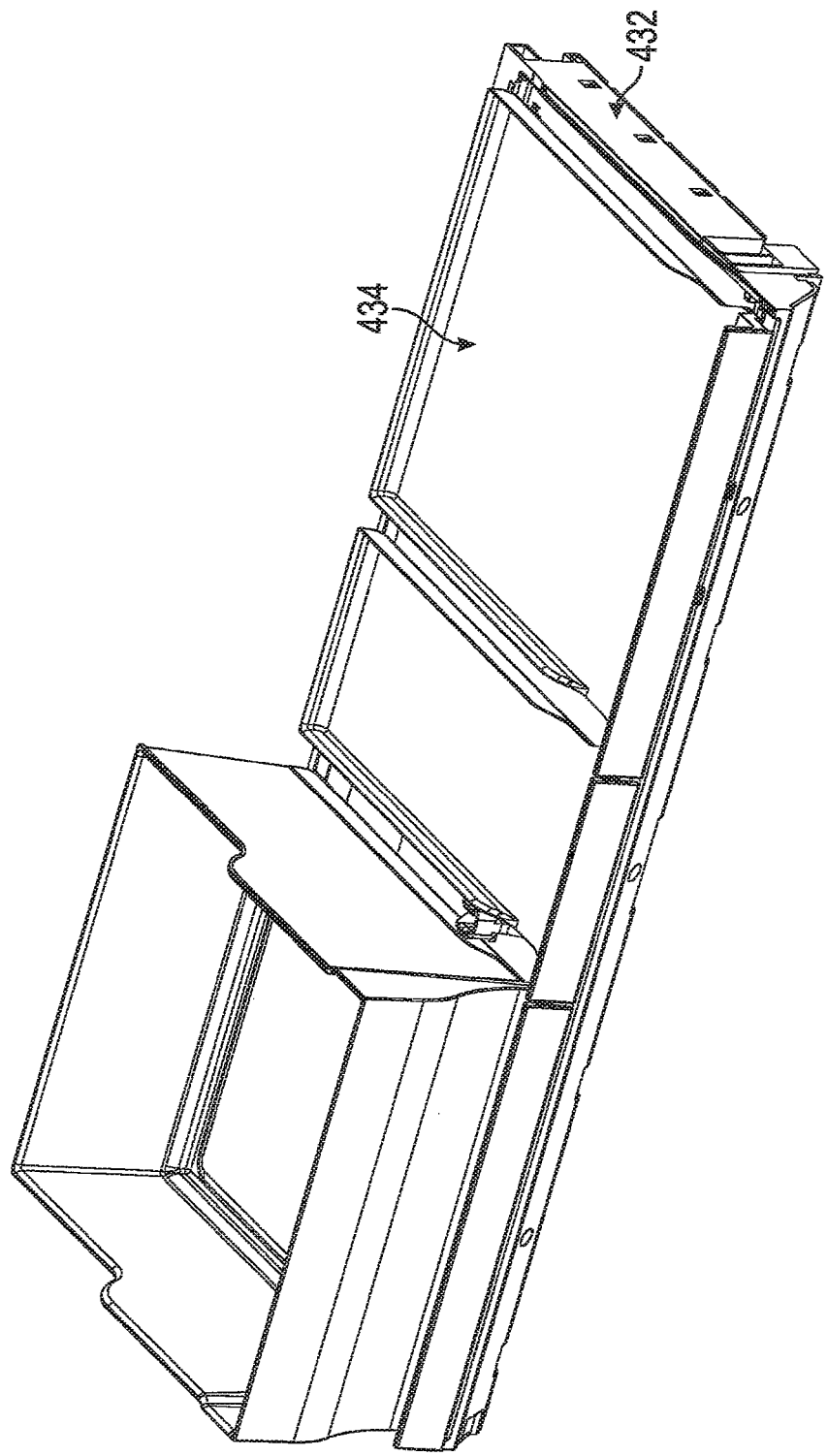

FIG. 5B is similar to Figure SA but with the over-shelf removed.

Figure 5C:
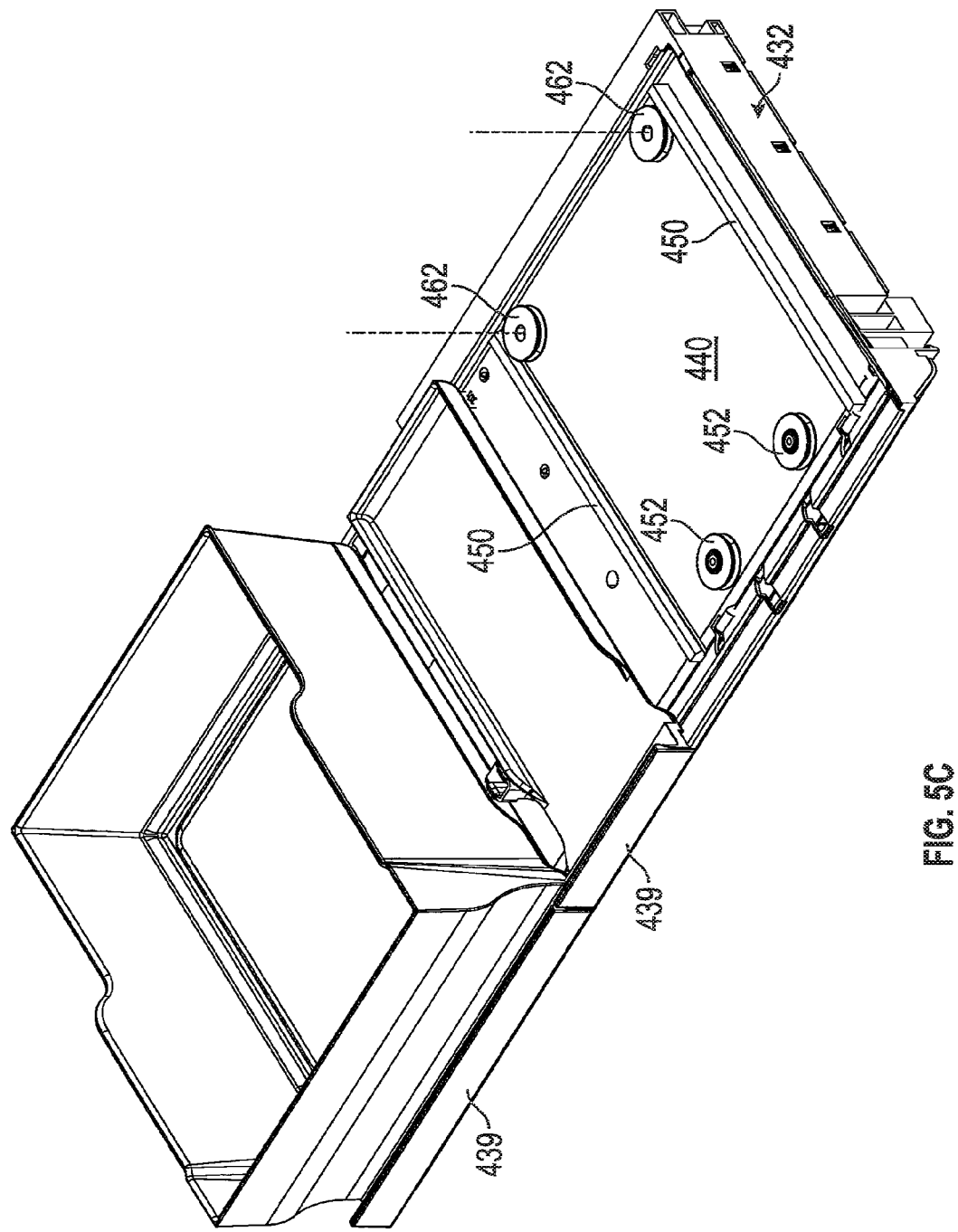

FIG. 5C is similar to FIG. 5B but shows one set of under-bin glide or slide components (horizontal wheel pairs relative to tracks or rails on carrier bottom and base top) for the right-most bin of FIG. 5A.

Figure 5D:
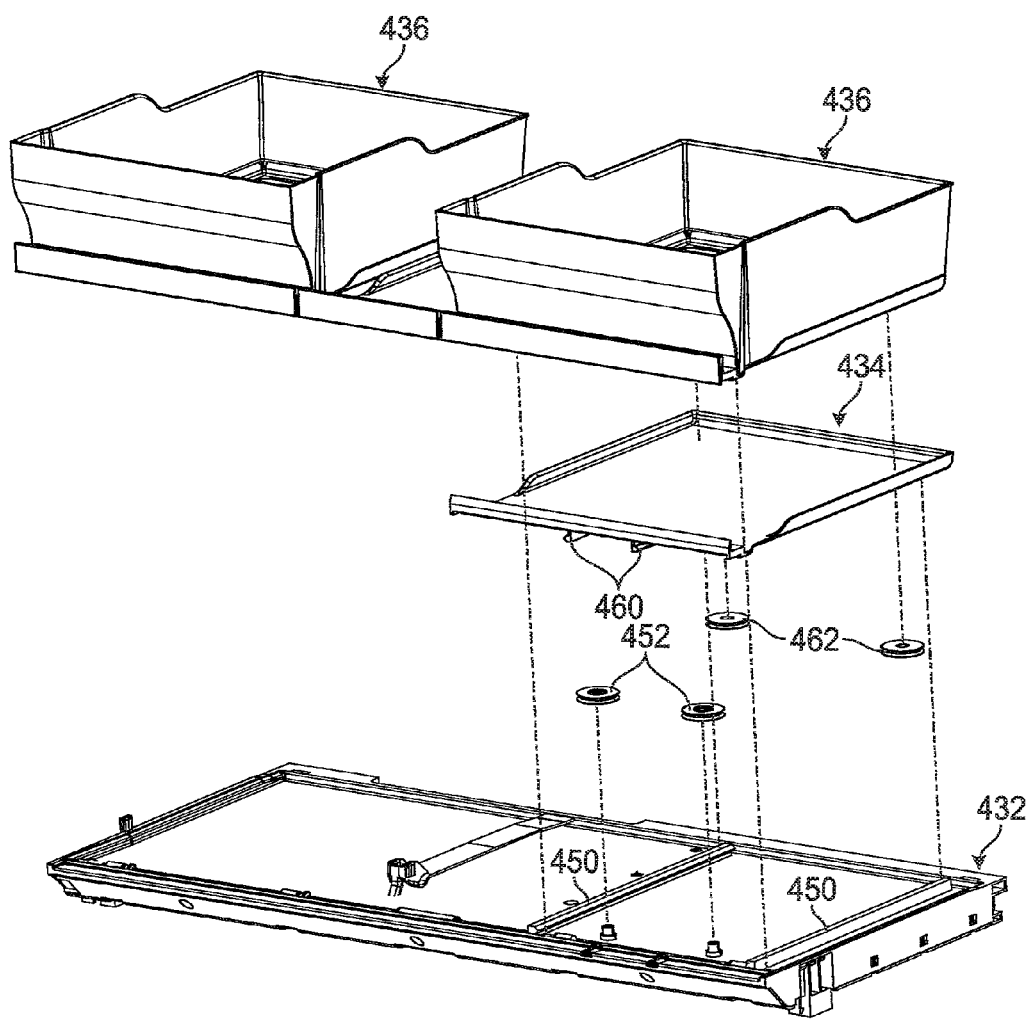

FIG. 5D is an exploded view of the right-most bin, carrier and base of Figure SA.

FIG. 5E is a bottom plan view of the carrier of FIG. 5D, illustrating horizontal wheel set that cooperate with rails on the base shown in FIG. 5D, as well as rails that cooperate with horizontal wheels on the base shown in FIG. 5D.

Figure 5F:
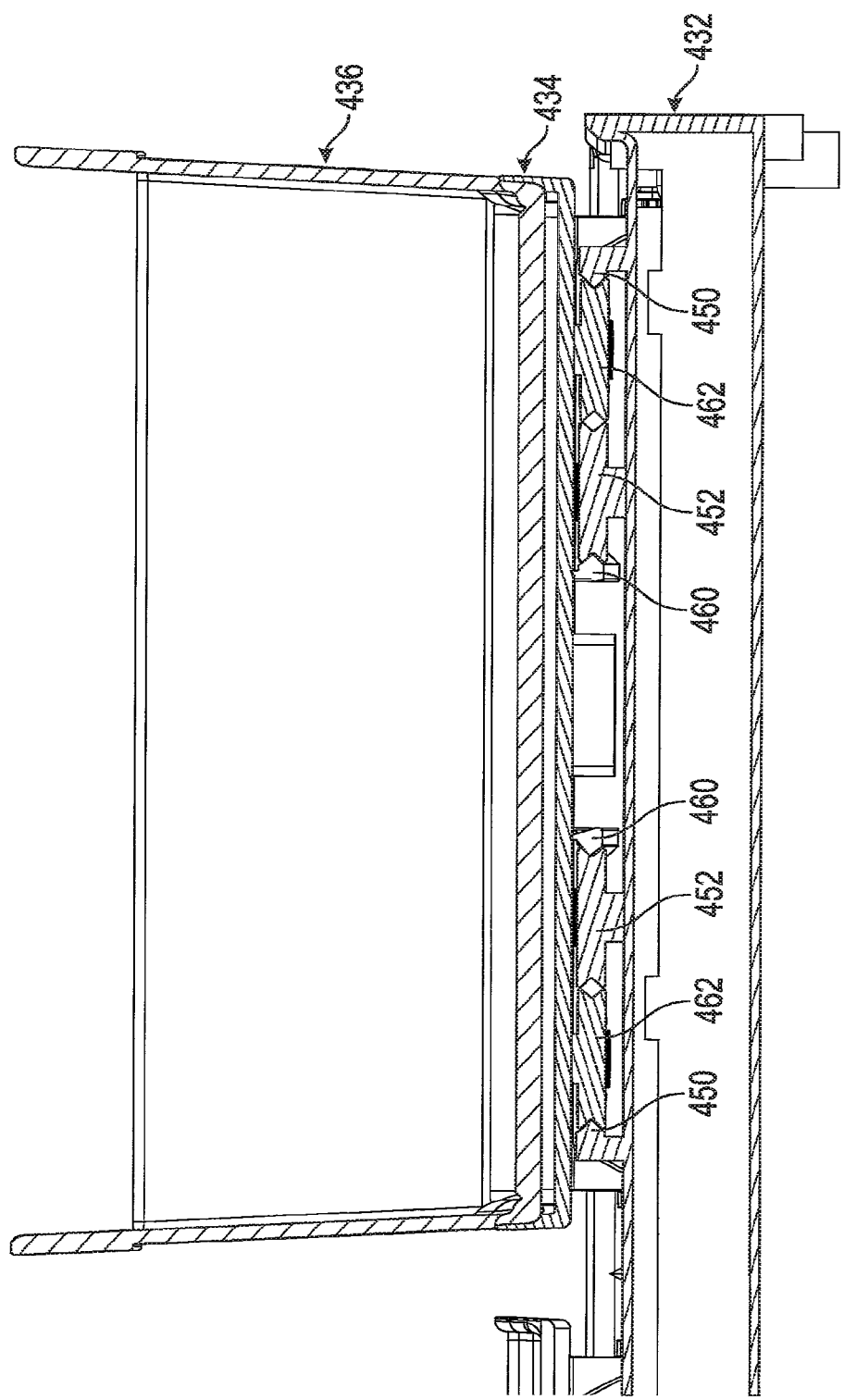

FIG. 5F is a sectional view of the assembled bin, carrier, and base of FIG. 5D.

FIG. 5G is a top plan view diagrammatical depiction of how the different horizontal wheel pairs cooperate with rail pairs between the carrier and the base, showing the carrier in the fully closed or pushed in position.

Figure 5H:
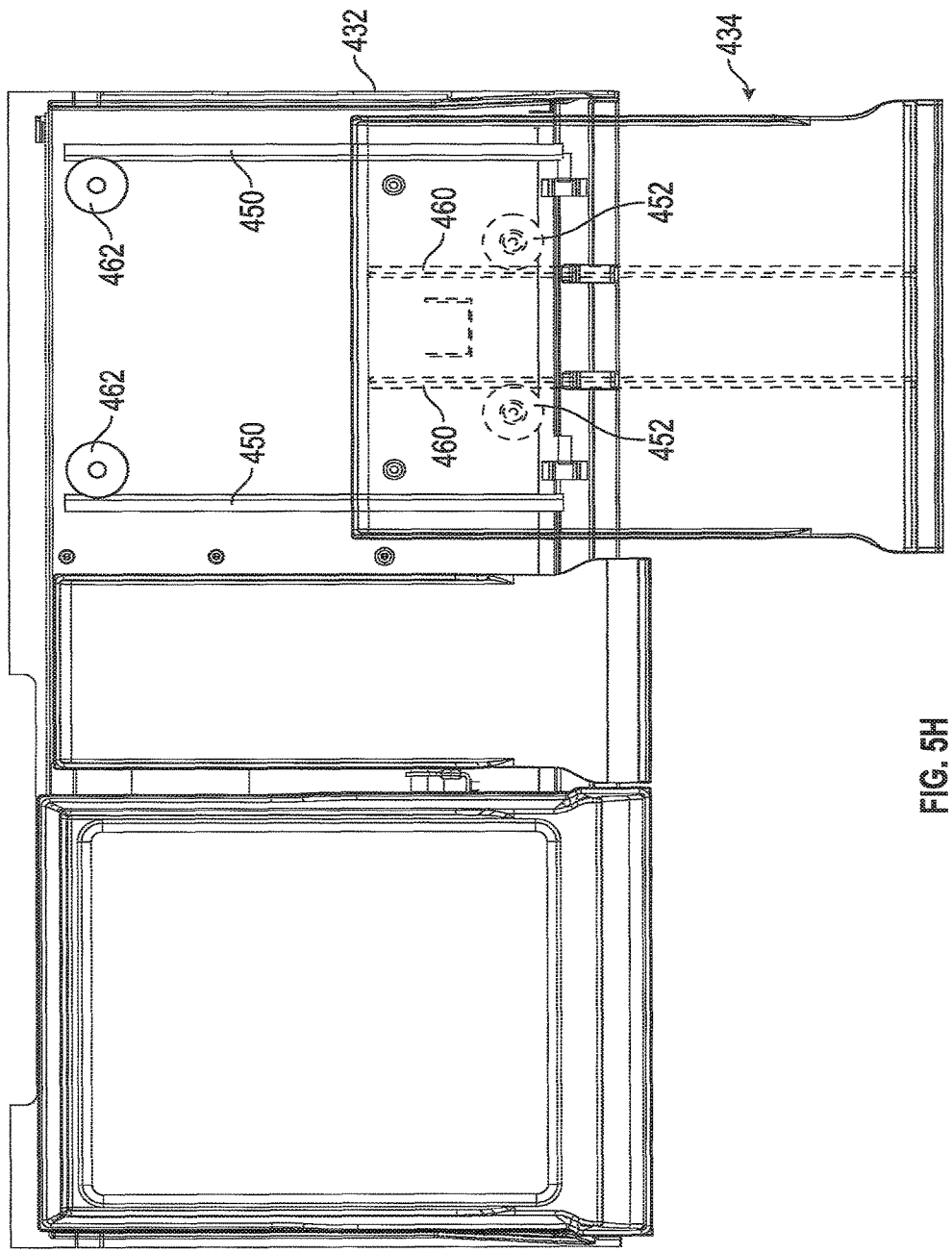

FIG. 5H is similar to FIG. 5G but shows the carrier pulled out towards fully extended position.

FIG. 5I is a partially exploded view of the base of FIG. 5A.

Figure 5J:
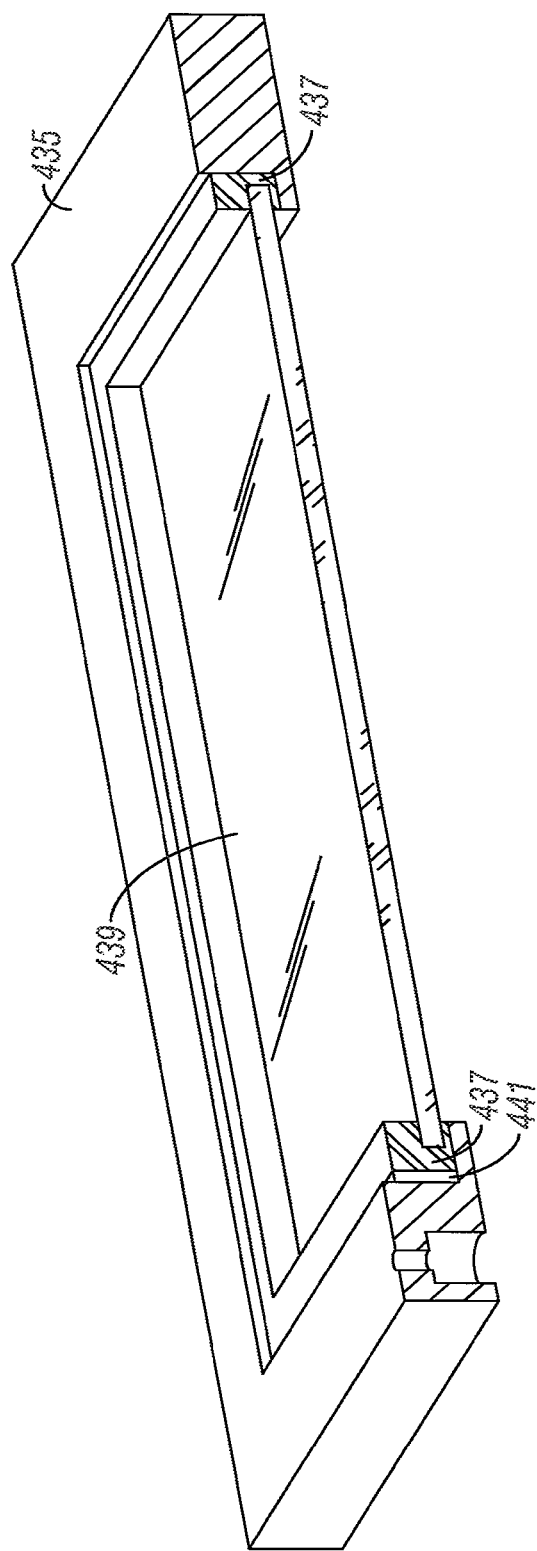

FIG. 5J is a sectional view of the base take along line 5J-5J in FIG. 5I.

Tolerance Take-Up Wheel Example

FIG. 6A is a top perspective view of a tolerance take-up wheel of the type that could be used with the embodiment of FIG. 5A-5E or other embodiments.

Figure 6B:
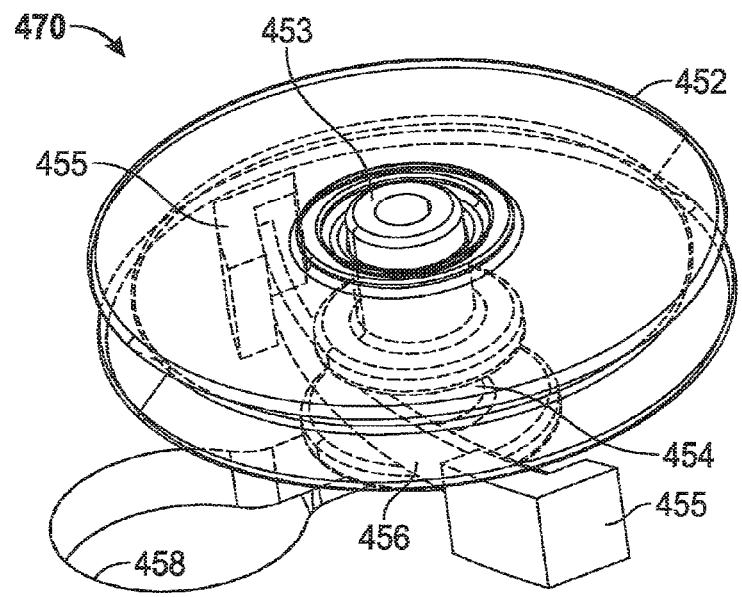

FIG. 6B is an enlarged view of the wheel of FIG. 6A.

Figure 6C:
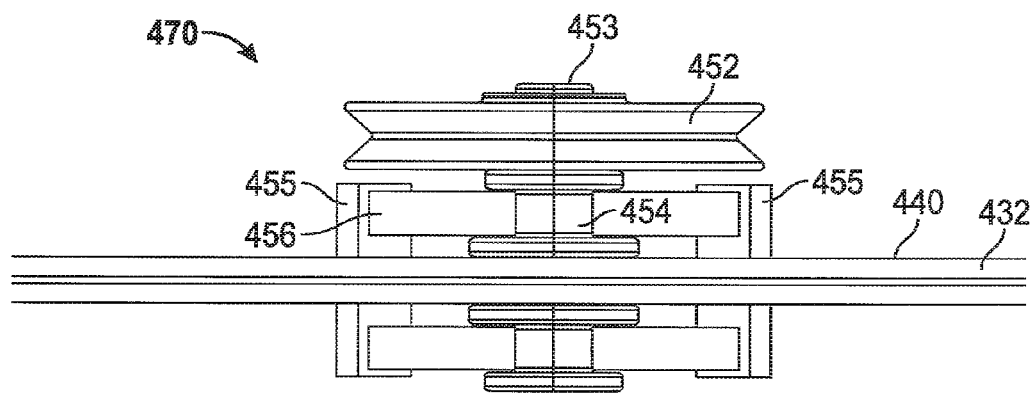

FIG. 6C is a side elevation of FIG. 6B.

Figure 6D:
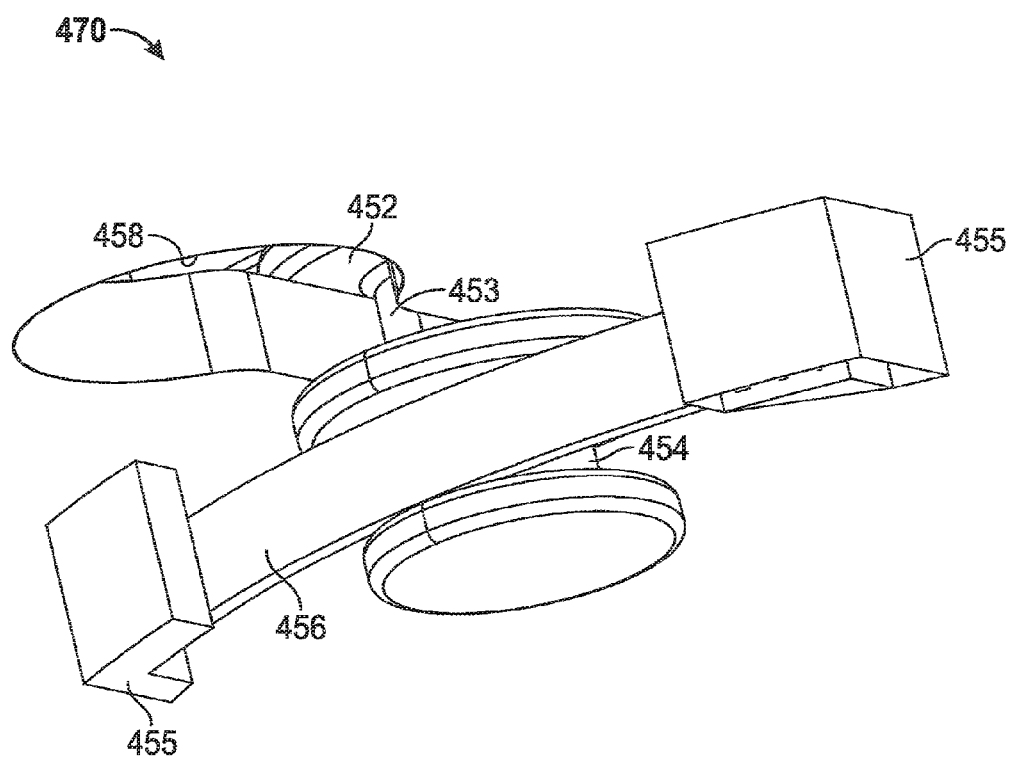

FIG. 6D is a further enlarged isolated bottom perspective view of FIG. 6A.

Injection-Molded Shelf Under Bin Glide Example

Figure 7A:
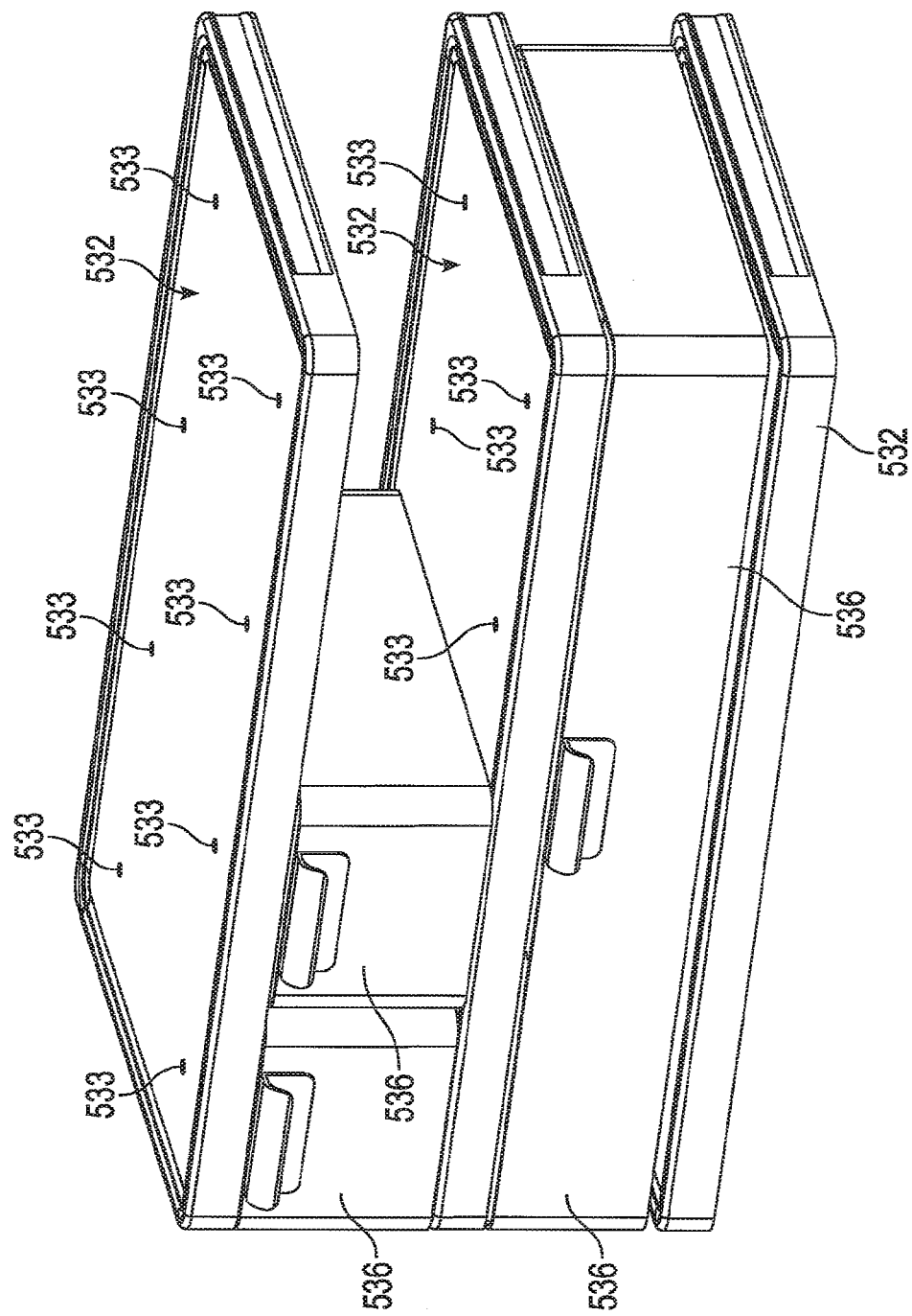

FIG. 7A is a still further exemplary embodiment (injection molded shelves with single track under bin glide) according to the present invention showing two spaced apart injection molded shelves that can be mounted in a refrigerated appliance and different bins that could be utilized with under-bin glides.

FIG. 7B is a perspective view illustrating three under-bin glides (without the bins) for the two smaller bins shown under the top shelf in FIG. 7A.

Figure 7C:
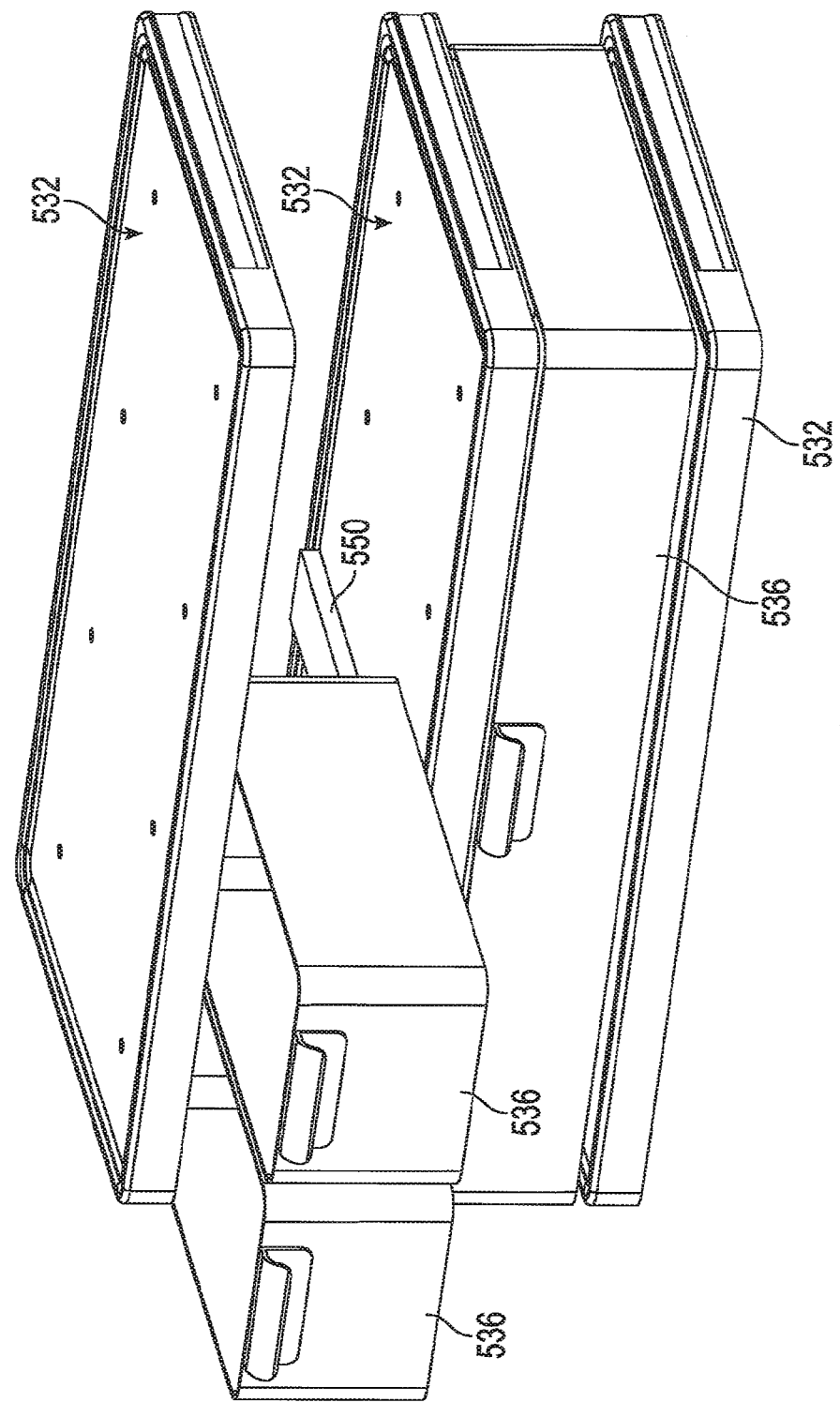

FIG. 7C is similar to FIG. 7B but includes the bins and shows them in a partially pulled-out position.

Figure 7D:
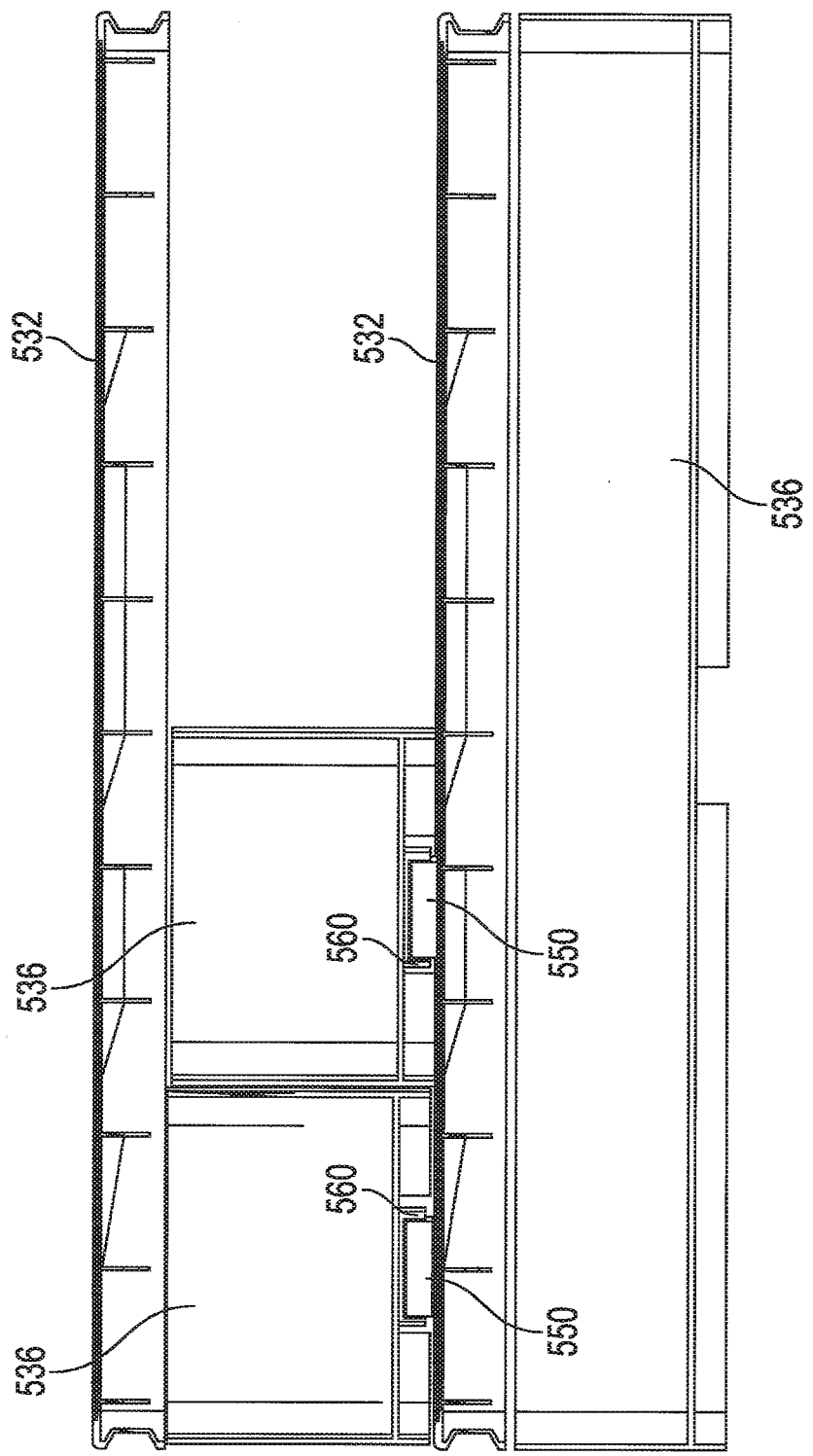

FIG. 7D is a front elevation view of FIG. 7A.

Figure 7E:
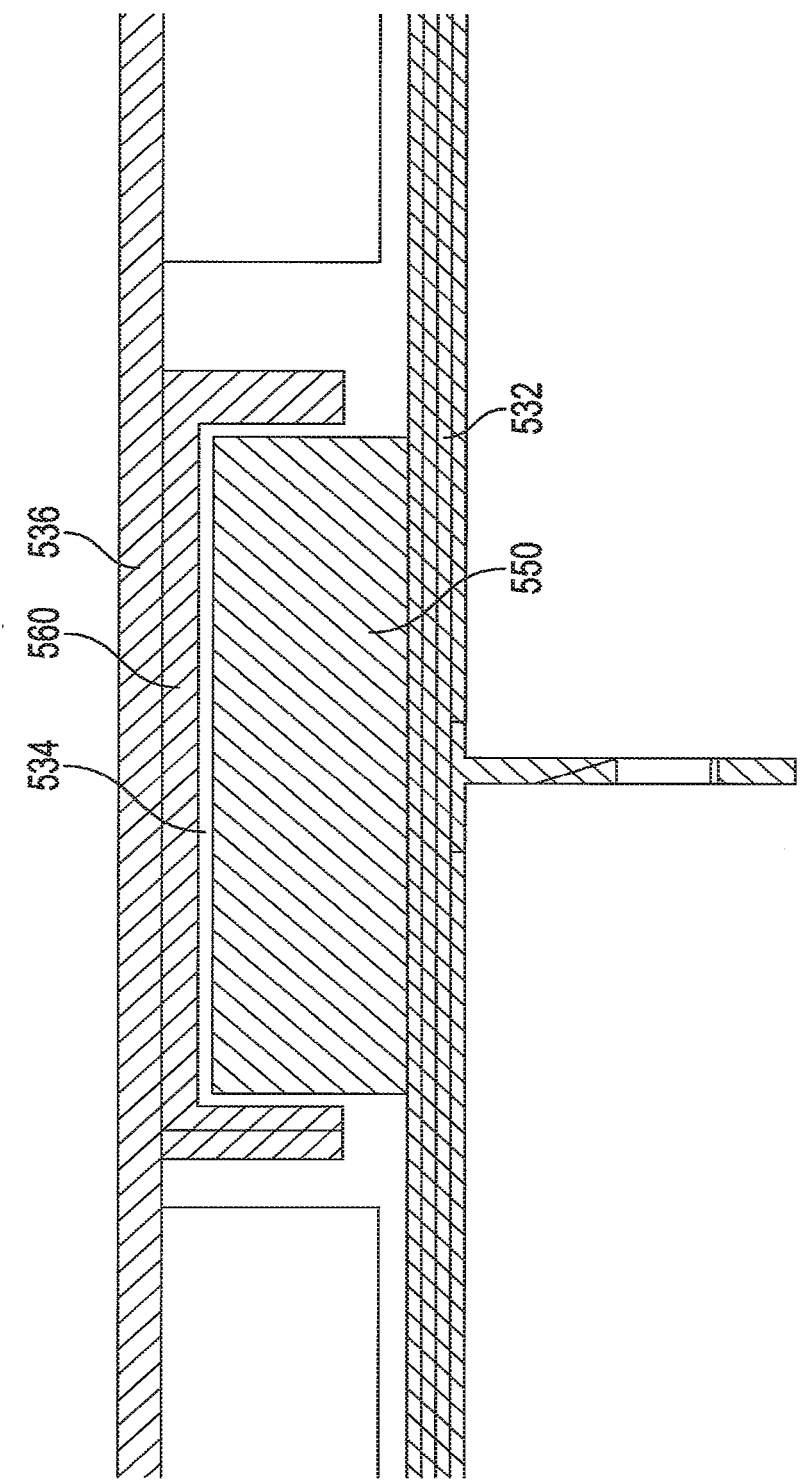

FIG. 7E is a greatly enlarged section view of one under-bin glide of FIG. 7C.

Figure 7F:
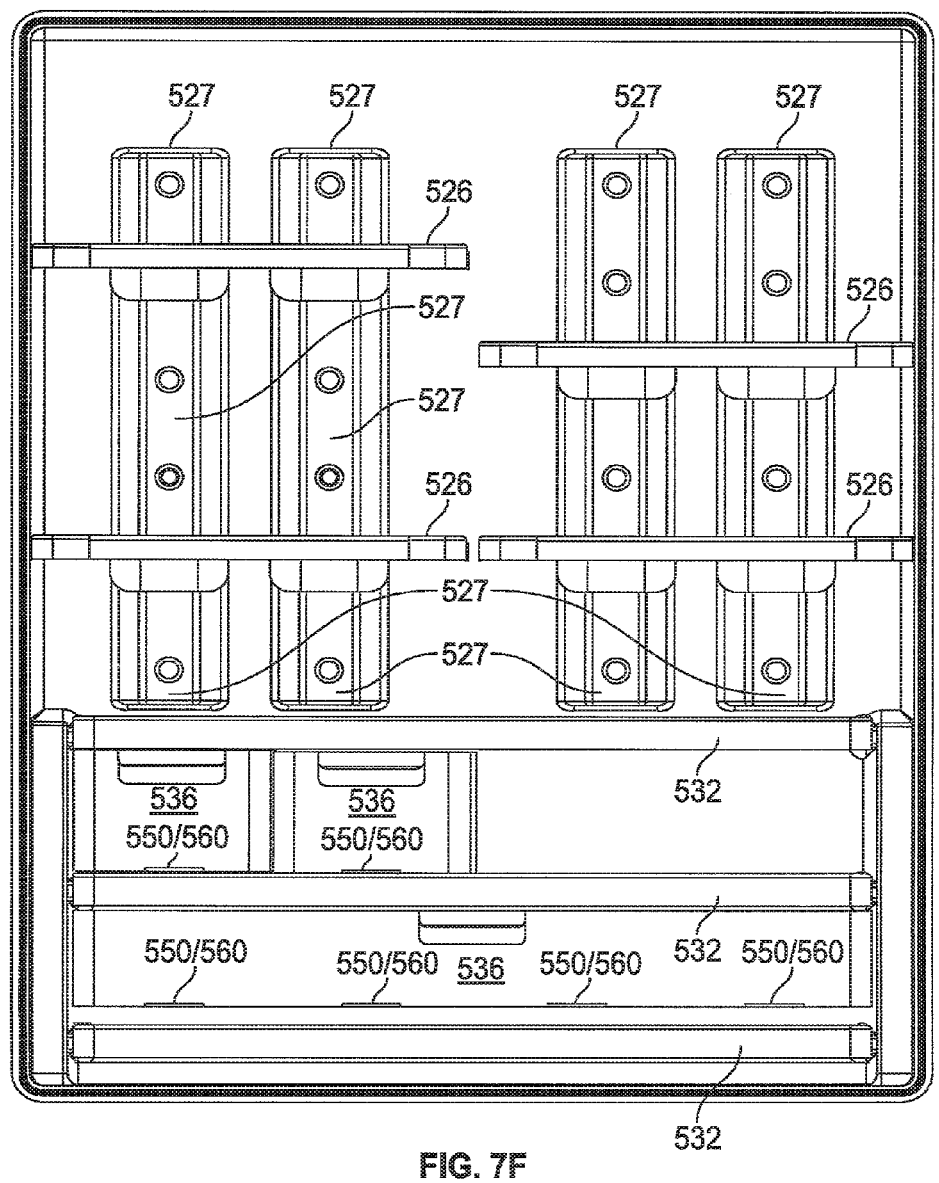

FIG. 7F is a reduced-in-scale front elevation illustrating how the under-bin glide shelves of FIG. 7A can fit into a refrigerated appliance cabinet, and also shows other types of storage bins.

DETAILED DESCRIPTION OF EMBODIMENTS

Overview

For a better understanding of the invention, several example forms the invention can take will now be described in detail. It is to be understood these are examples only and neither inclusive nor exclusive of the different forms and configurations the invention can take.

These embodiments will be described in the context of a consumer refrigeration appliance, e.g., refrigerator, refrigerator/freezer, or freezer.

Refrigerator appliance 10 has a thermally insulated cabinet 12. See FIG. 1A. The cabinet includes an interior defined by liner opposite side walls 14, 16 and top and bottom walls 18, 20 for a particular compartment (cold food, freezer, or other) of the refrigerator appliance 10.

Figure 1A:
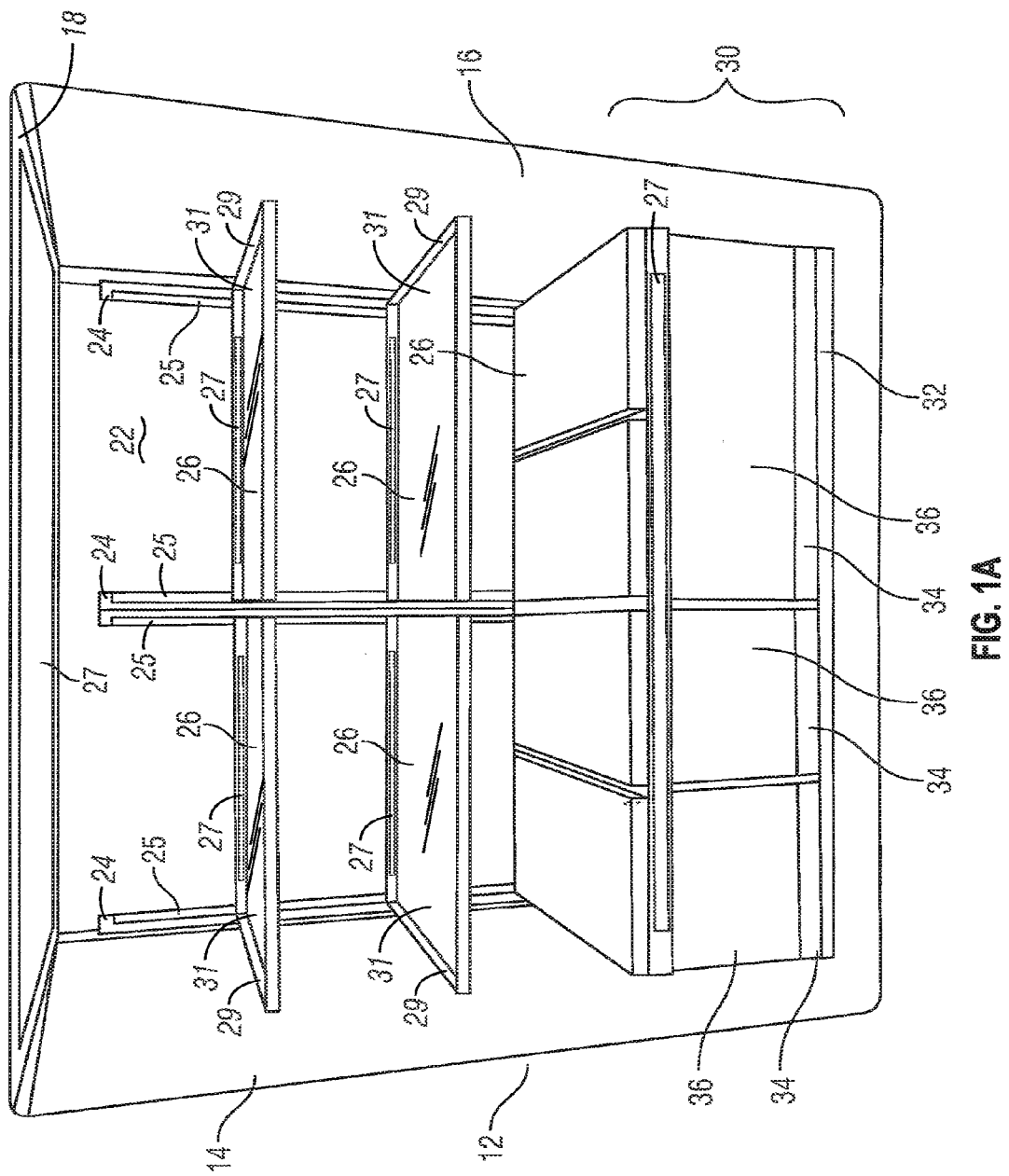
FIG. 1A is a perspective view of the interior of a refrigerated appliance showing several under-bin glide storage bins according to one exemplary embodiment of the present invention.

As can be seen in FIG. 1A (the refrigeration appliance outer door is removed for clarity) several different storage components are in place in cabinet 12. Examples are vertically moveable shelves 26 (moveable on vertical rails 24 mounted to the cabinet back wall 22 by any of a number of structures and methods such as are known in the art).

FIG. 1A also shows a bin assembly 30 comprising a horizontal level of side-by-side storage bins 36. As can be seen, storage bins are basically closely adjacent to one another and span essentially the entire width of the interior cabinet 12 between liner walls 14, 16. There are no substantial spaces between bins. This is facilitated by what will be called under-bin glides.

As can be seen by the figures, one benefit of the under-bin glides is that they promote an efficient use of storage space. A base 32 is underneath the plural bins 36. That base 32 can be essentially a plate of relative low profile or height attached to opposite liner wall sides 14 and 16. It presents basically a horizontal surface. In this exemplary embodiment what will be called bin carriers 34 are mounted on baseplate 32. As seen better in FIG. 1C, the bin carriers are essentially plates or trays that are slidable relative to base 32 so that each carrier 34 can be independently manually pulled forward or pushed back into the home position in cabinet 12 (the positions shown in FIG. 2C). Carriers 32 are also relatively low profile or small height components that do not take up a lot of vertical space in cabinet 12.

In this embodiment bins 36 are set on top of at least one carrier 34 in a manner that is mateably received by the one or more carriers and when bin 36 is pulled forward it pulls the one or more carriers 34 on which it sits. By this it is meant that a single bin 36 can be set on top of a single slideable carrier 34 and be independently pulled out or extended from home or fully retracted position in cabinet 12. But further, a single bin 36 that is laterally wider than a single carrier 34 can be configured to sit on top of plural carriers 34 and be independently pulled out and pushed in with those plural carriers. Still further, of course, plural bins 36 each narrower than a single carrier could be placed on top of that single carrier and both could be pulled out in tandem facilitated by the concurrent sliding of the single carrier.

Figure 1B:
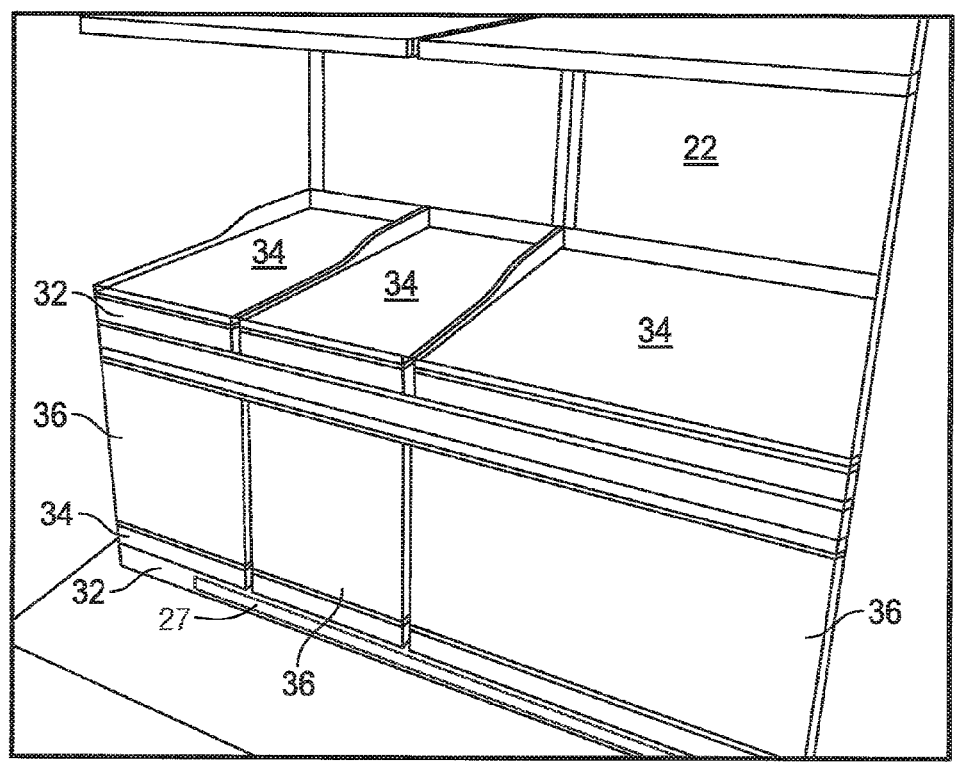
FIG. 1B is an enlarged view of a portion of FIG. 1A, particularly focused on one set of under bin glide storage bins across one horizontal plane of the appliance.
Figure 1C:
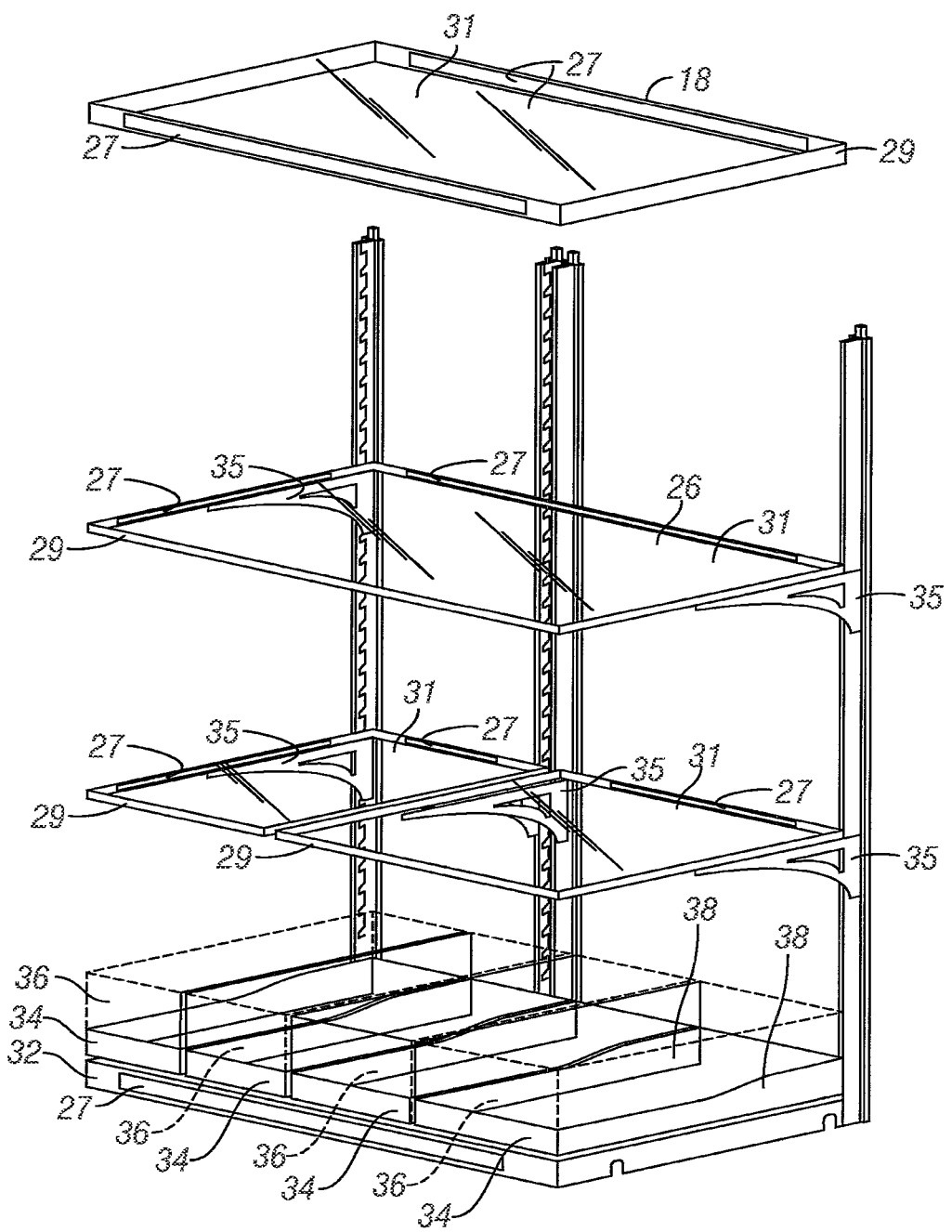
FIG. 1C is an isolated view of the storage components apart from the refrigerated appliance cabinet.
Figure 1E:
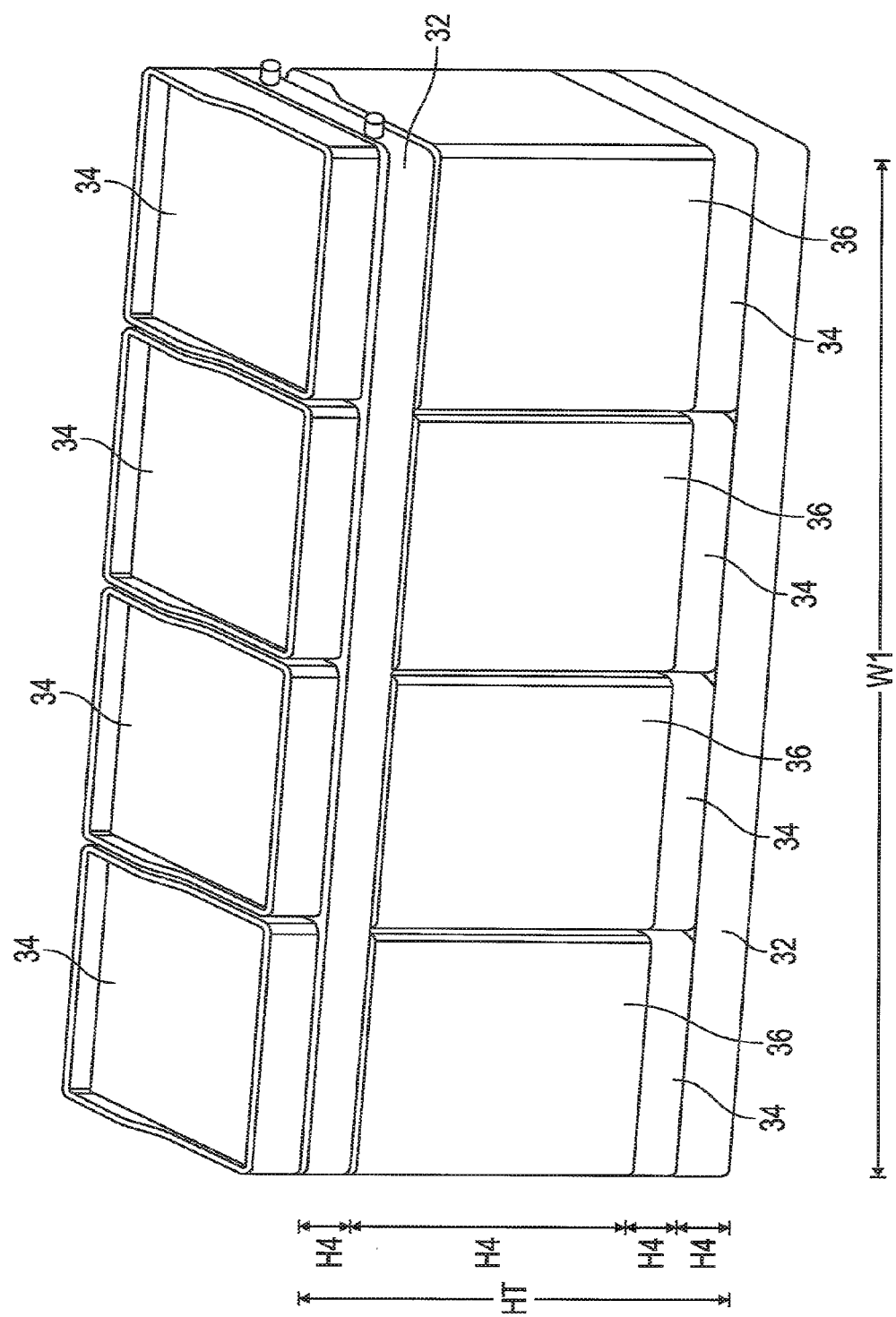
FIG. 1E is a similar view to FIG. 1D but shows an alternative arrangement of storage components (four single-wide bins) that could be utilized with the same under-bin glide system of FIG. 1D.
Figure 1G:
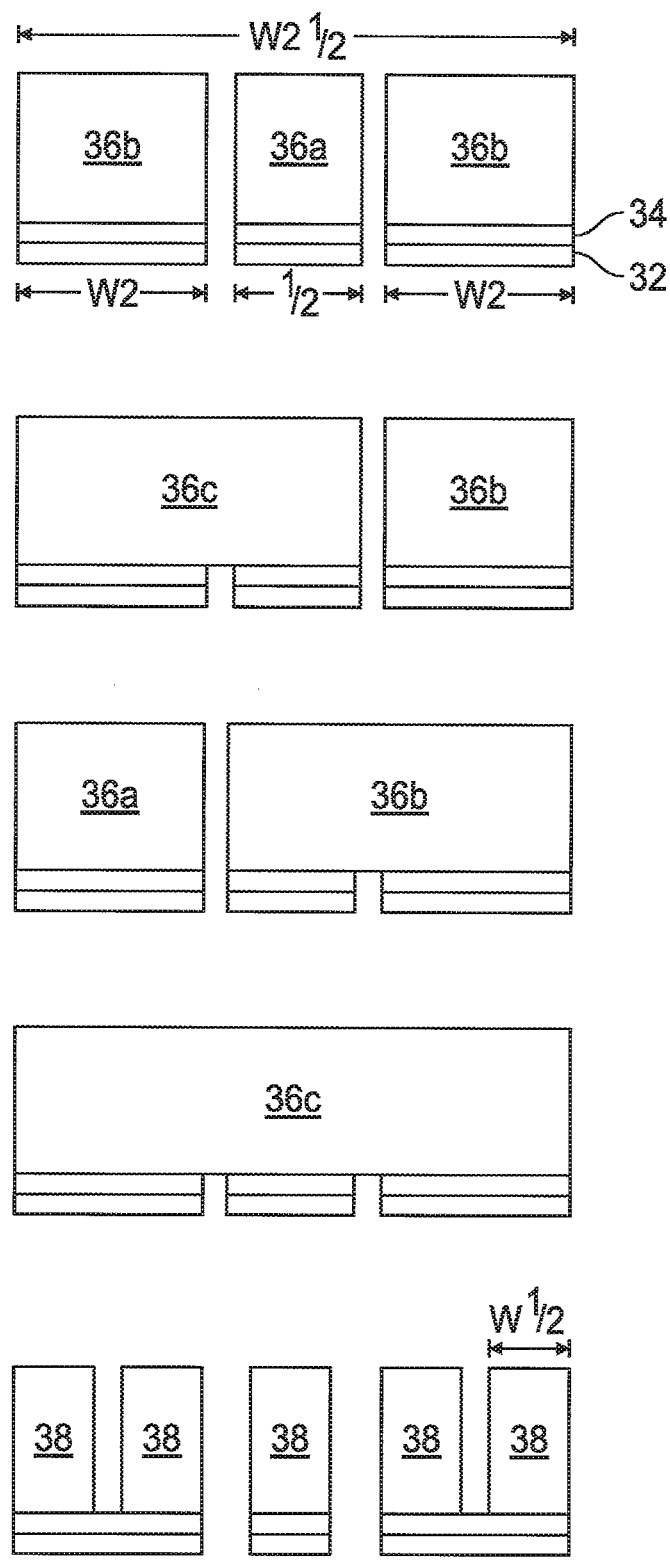
FIG. 1G is a schematic illustrating plural alternative configurations of different bins for the same under-bin glide system of FIG. 1B.
Figure 11:
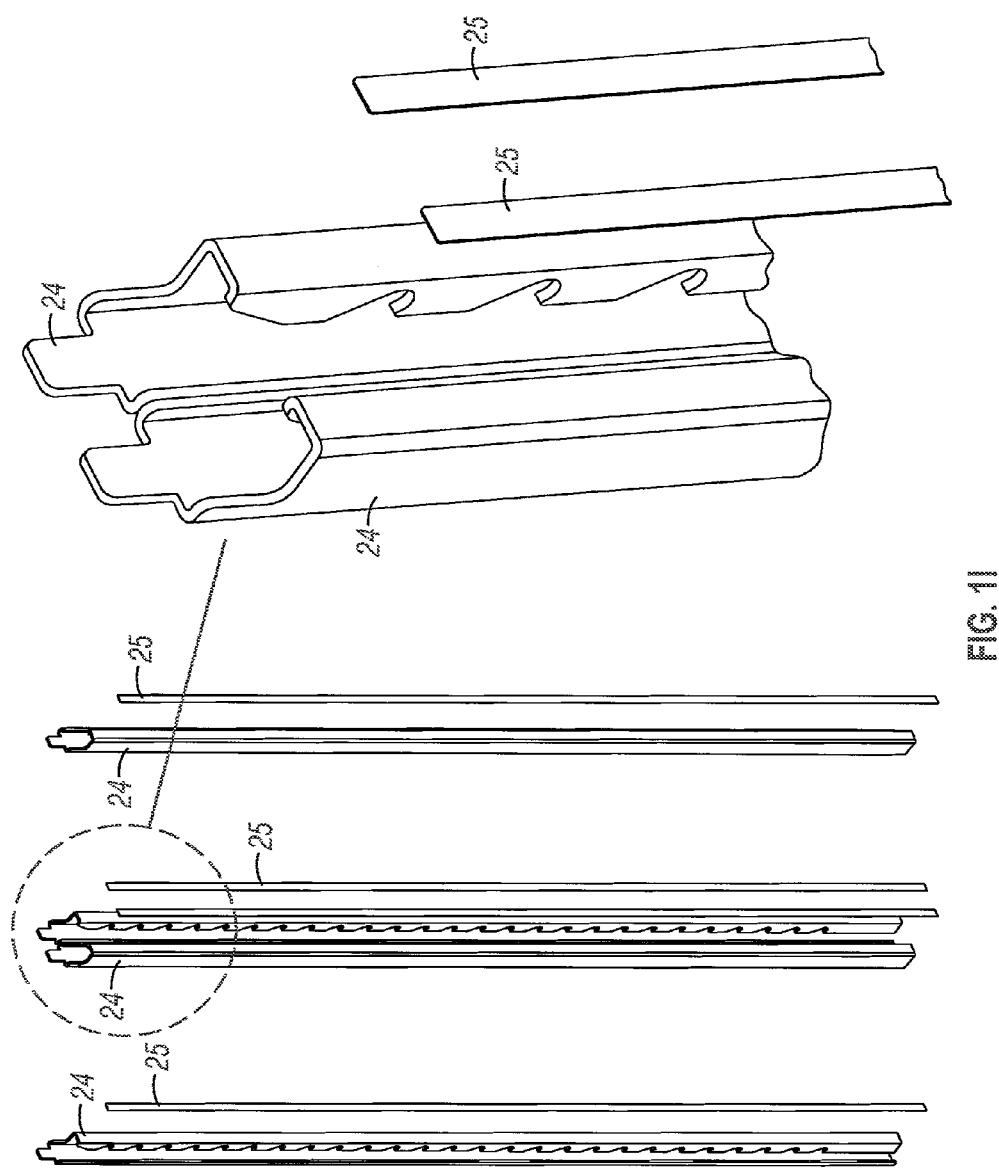

Importantly, as diagrammatically illustrated in FIG. 1G, this would allow high flexibility to the user in configuring the storage in appliance 10. If the carriers 34 are all of the same width and mounted across one horizontal base 32, there could be one-to-one correspondence of each bin 36 to a carrier 34. The bins could be the same or similar width as the carriers-presenting a row of same-width bins across cabinet 12. Or there could be a wider bin that spans and seats into two carriers. Essentially it would be a "double-wide" bin 36B. Still further, if more than two carriers, there could be a still wider bin 36C ("triple-wide" if three carriers, "four-wide" if four carriers, and so on). In FIG. 1G, single wide bins 36A can be used on one cabinet level. Wider bins can be used. Or different width bins can be intermixed. FIG. 1G even can allow (although not independently slideable) two smaller (112 wide bins 38) per carrier.

As can be seen in these Figures, a single cabinet-wide base 32 could support multiple carriers 34. A slide or glide system would be fully underneath each carrier. The slide or glide systems would be essentially hidden, especially when the carriers are in fully pushed back or home positions. And the slide or glide systems are low vertical profile. The base, slide or glide system and carriers do not take up much vertical space. A storage member or component (here a bin 36) can be seated onto one or more carriers 34. Thus, the bin 36 is slideable/glideable between home and extended positions by a user either pulling on the bin 36 or the carrier 34. In most cases it will be by pulling on the bin. There can be a handle on the bin to help facilitate this.

As shown in Figures 1-F, multiple levels of under-bin glide systems can be added to a single cabinet 12. The low vertical profile of multiple levels is indicated. There can be not only the appearance of no wasted space laterally across each level, but also by appropriate spacing each base 12 vertically in cabinet 12, plural rows of bins give the appearance of efficient use of vertical space also.

On the other hand, the carriers could be of different widths. As indicated in FIGS. 1A-F, there could be one-to-one correspondence of bins to carriers even if some of the bins are of different widths. But even in that situation, a different width bins combinations could be supported by the different sized carriers so long as the total width of all bins fits across the space between liner walls 14 and 16.

The precise configuration of carrier width to bins and bin width can vary according to design. But it allows a number of possibilities of customized or changing the storage regimen in a particular appliance 10.

In this manner, the entire bin assembly 30 presents a very efficient use of space laterally across the storage capacity of cabinet 12. Unlike conventional refrigerator bins, many of them hang then from side rails with rollers that extend outside the perimeter of the bin. This prevents the bins sidewalls from being closely adjacent and thus gives up some storage space in that layer of bin.

Of course, by putting base 32 and carriers 34 underneath bins 36, some vertical space in the cabinet is taken up. However, by selection of materials with sufficient robustness and structural strength, base 32 can be quite thin as can the carrier 34. One example is use of the approved refrigerator grade plastics that can be produced to support the weight of carriers 34 and bins 36, including when bins 36 are filled within normal ranges for the types of products they would store, and probably some additional margin of reasonable error. In short, the design places the interface between the base and the carrier which guides and promotes a low coefficient of friction movement between base and carrier in a relatively small vertical height to allow the bins to be closely adjacent across that elevation.

As indicated in FIGS. 1A through F, a glass or other material of shelf 26 could be adjustably positioned just above bins 36 and effectively form at least two functions; one being a storage shelf, the other being a de facto cover for the bins.

As can be further appreciated by FIGS. 1A through F, an advantage of using bin carriers instead of mounting bins directing on the base is that different combinations of bins can be arranged in refrigeration device 10. Consider for the examples in FIGS. 1A-P. Assume there are four bin carriers 34, each of equal width, operatively mounted across one horizontal level of a base 32. At least one glides between each carrier and base are within the outside perimeter sides of each carrier 34.

As shown in FIGS. 1C and 1E, four what will be called single-wide bins 36 could be placed side-by-side on that horizontal elevation in the cabinet 12. As is indicated in FIG. 1C, each bin carrier 34 could have essentially a lip or raised perimeter wall 50 into which the corresponding sized bin 36 could be matingly placed. Then, pulling the bin forward would cause it to glide or slide on carrier 34 forward to gain that mechanical advantage of a slider/glide mechanism between carrier 34 and base 32. Each of the four bins 36 could be independently pulled forward and pushed back. Note how the relatively thin base and carriers, essentially hiding the glide mechanisms or systems, provide a very clean aesthetic and the bins are essentially directly adjacent to one another using the space efficiently. Note how the aesthetics fits well with relatively thin glass shelving 26 in cabinet 12.

Compare the above to FIGS. 1A, 1B, and 1D. Assuming still four carriers of equal width across the cabinet 12, here two single wide bins 36 are each mounted on one carrier 34 (the two left-most bins). But a double-wide bin 36 is mounted on the two right-most carriers. In this configuration two smaller, independently slideable bins co-exist with one bigger bin.

FIG. 1F shows a still further possibility. Instead of four bins 36, there could be one single-wide bin 36 like in FIG. 1E (the left-most) spanning one carrier 34, and one triple wide bin 36 (the right-most); which would span three bin carriers 34. The underside of double-wide, triple-wide, or wider bins 36B could contain an indent, slot, or other structure to receive the lip edges 50 of adjacent carriers 34 that it spans so that it can be stable and mated into those plural carriers 34. Forward manual pulling of a double- or triple-wide bin would cause it to slide or glide forward on two or three carriers 34, respectively, relative to base 32.

FIG. 1G gives further schematic illustration of the variety of different configurations possible. This provides high flexibility regarding consumers' desires for storage capabilities and again is an efficient use of space because in each configuration, at least the side-by-side storage space is effectively used by allowing sidewalls of the bins to be closely adjacent.

Therefore, this under-bin slide system takes advantage of at least the following things.

A relatively thin base is supported in cabinet 12 at a vertical elevation. A set of relatively thin bin carriers is mounted on top of the base. A slide or glide system is basically hidden between the base and each carrier to allow independent sliding of each carrier 34 relative to base 32. The slide(s) or glide(s) are positioned inside the opposite sides of each carrier so that appropriately-sized bins 36 placed on the carriers can have their sidewalls essentially adjacent for efficient space use for storage.

Additionally, the under-bin glides or slides, even with the added layers of carriers and base, still promote efficient use of vertical interior space for cabinet 12.

Further, optionally a shelf 26 can both support another vertical layer of products or devices and function as a cover for the slideable bins. Of course, the bins could have a different or individual and more integrated covers.

As indicated in the figures, the combination also provides a clean, aesthetically-pleasing look. There is an appearance of more storage space. Thus the invention promotes both lateral and vertical effective and efficient use of space in refrigeration device 10.

The following are several specific examples of a few of the forms the invention can take. As will be seen, each of the embodiments can be implemented in the under-bin context which promotes bins which can be positioned essentially adjacent across all or part of a lateral horizontal level in the cabinet of a refrigerated appliance with the glides or slides that allow the bin to be pulled out from the cabinet to be essentially hidden from view. The under bin slides or glides are low profile in the sense the whole assembly (base, slide(s)/glide(s), and bin (or carrier and bin) is an efficient use of vertical space in the cabinet also. The designer can select a type of under bin glide or slide for all bins in the cabinet, or different glide(s)/slide(s) for different bins. The bins can be uniform in size, or differ.

FIGS. 1A-1C, 1H and 1I show still further aspects for one or more configurations of the space within cabinet 12. As illustrated, one or more of the shelves 26 may be configured to include one or more light elements 27. The light elements 27 may be configured as an LED light bar or strip as best illustrated in FIG. 1H. In one configuration, the light element 27 may be disposed between the frame 29 and glass shelf component 31 as pictorially represented in FIGS. 1A and 1C each shelf 26 is configured generally to include a frame component 29 which may be configured of an electrically conductive material. A glass shelf component 31 configured of a durable glass component and having good optical transmission properties is disposed within the frame component 29. A light element 27 such as an LED strip is disposed between the glass shelf component 31 and the frame component 29. One or more conductive frame elements 33 may be configured to support the glass shelf component 31 within the frame component 29. According to at least one configuration, the conductive frame elements 33 are configured of an electrically conductive material. The conductive frame elements 33 may be disposed within the shelf 26 so as to be connected in electrical communication with the light element 27. Together, the frame component 29, glass shelf component 31, light element 27, and conductive frame element 33 form at least one configuration of a shelf 26. One or more shelf brackets 35 may be used to adjustably support the shelf 26 at one or more positions 37 along vertical rails 24, best illustrated in FIG. 1I.

According to one configuration, shelf brackets 35 when supporting shelf 26 are electrically coupled with one or more conductive frame elements 33 which, in turn, are electrically coupled with one or more light elements 27 disposed within the shelf 26. In this manner, shelves 26 may be reconfigured at any location along vertical rails 24 within the cabinet 12 to provide for multiple shelf 26 configurations where the lighting is reconfigured with the shelves and electrically coupled to the vertical rails 24 at any of the reconfigurable positions within the cabinet 12. In at least one configuration, as best illustrated in FIG. 1I, vertical rails 24 include one or more electrically conductive strips 25. Shelf brackets 35 when mounted at one or more locations 37 along vertical rails 24 are electrically coupled with the electrically conductive strip 25. In this manner, one or more light elements 27 within a shelf 26 may be electrically coupled to the electrically conductive strips 25 by one or more shelf brackets 35 electrically coupled to one or more conductive frame elements 33. In at least one configuration, electrically conductive strips 25 are connected and configured to receive electricity from the electrical system for powering one or more operations associated with the cabinet 12. In one aspect, minimal wattage is communicated through electrically conductive strips 25, through one or more shelf brackets 35, one or more conductive frame elements 33 to power one or more light elements 27 within shelf 26. In any of the positions 37 along the vertical rail 24, one or more shelf brackets 35 associated with shelves 26 are electrically coupled with the electrically conductive strip 25 for powering one or more light elements 27 within shelves 26. As pictorially represented in FIGS. 1A-1C, the light elements 27 may be positioned or located in the shelf 26 at various locations. For example, one or more light elements 27 may be positioned on opposing sides of the glass shelf component 31. In another aspect, one or more light elements 27 may be positioned on adjoining sides of glass shelf component 31. In another configuration, a single light element 27 may be positioned along an edge of the glass shelf component 31 between the glass shelf component 31 and the frame component 29 as previously discussed. In at least one configuration, for providing illumination from the top wall 18 of the cabinet 12 a lighting element 27 may be housed within a frame component 29 configured to hold a glass component 31 through which light from the light element 27 is transmitted for illuminated at least the upper portion within the cabinet 12. The lighting elements 27 may be powered using the electrically conductive strip 25 on the vertical rails 24 or by separately coupling the lighting element 27 to the electrical system for powering one or more operations within the cabinet 12. In at least one other configuration, the base 32 may also be configured to include one or more light elements 27. FIGS. 1A-1C provide pictorial representations of base 32 configured with one or more light elements 27, which is discussed in greater detail below.

Single Center Glide Exemplary Embodiment

With reference to FIGS. 2A-L, a specific under-bin glide assembly 30 is shown. It provides the same or similar features as discussed regarding FIGS. 1A-1G. A plurality of bins 36 each sit on one or more bin carriers 34 that each have a single slide or glide underneath their perimeter relative to base 32. This allows each bin 36 to have sidewalls essentially adjacent any adjacent bin or adjacent a sidewall 14 or 16 of the refrigerator liner or cabinet 12, and at least substantially hide the slide or glide from direct view.

FIG. 2A shows a shelf 26 could be independently mounted and supported slightly above the top-most level of any bin 36 on base 12 to provide a cover to any bin 36 below it. Bins can be any of a variety of configurations. Examples would be plastic, glass, metal, or other materials. They could be opaque, clear, translucent, or a combination (for example, clear bins would allow the user to better see the contents of the bin and even perhaps other parts of the cabinet). They could present different aesthetics and different functionalities (crispers, fruit, meat, etc.).

Assembly 30 in FIGS. 2A-L differs from that in FIGS. 1A-G in that the two outside bin carriers 32 are wider than a third middle thinner bin carrier 34. This allows use of either just two bins of the size of FIG. 2A or B without a middle bin, and still provides a pleasing look because the middle bin slides or glides are hidden by the bin carrier. The middle carrier 34 can simply not be used, or it could be used as a slideable shelf to support objects in its upper surface.

Alternatively, a narrower middle bin 36 (not shown) could be used on middle carrier 34.

But further, similar to FIGS. 1A-G, different width bins 36 could be used across assembly 30 of FIGS. 2A-L. For example, a single wider bin 36, like shown in FIGS. 2A and 2B, could be placed on the left-most carrier 34. A width and a half second bin 36 could be placed on and span middle and right-most carrier 34. Alternatively, a two and a half wide single bin 36 could be placed on and span all three carriers 34. It is also possible to place two half-width bins (the width of middle carrier 34 in FIGS. 2A-L) on a single full width carrier 34 (the left and right carriers 34 in FIGS. 2A-L). This could allow five half width bins to be placed on carriers 34. Other combinations of course are possible.

FIG. 2C shows base 32 and three carriers 34 without any bins on them. Each carrier has a lip 38 that can retain the bin. It can restrain the back side of a bin. The lip goes around a substantial portion of each carrier 32, including the front. A fa<;ade 39 could be added to the front for additional finishing affect. As can be seen, lip 38 can vanish near the front of each carrier 34. This can allow for bins wider than a single carrier to be configured on their bottom surface to mateably be received in multiple carriers as previously described. Additionally note in FIG. 2C that there can be some space between carriers 34. The bins can have bottoms that fit snuggly inside the lip(s) 38 of one or more carriers 34 but expand laterally and depth-wise outside the perimeter dimensions of the carrier(s) to essentially almost abut one another when in mounted position. But the bins do not have to have that characteristic. They could be of a variety of sizes and even quite a bit smaller than the perimeter(s) of the carriers.

FIGS. 2D-2L illustrate one example of an under-bin glide system that can be used between base 32 and each carrier 34. In this example, a metal or metalized base rail 50 has a front end 52 at or near the front edge of base 32 and a rear end 54 near the back edge of base 32. Rail 50 has an essentially elongated flat bar for a backbone with opposite lateral sides 56 and 58 that are essentially two facing C-channels. Rail 50 would be secured to the top surface 40 of base 32 by any of a number of means known to those skilled within the art. This could include screws, bolts, adhesives, and other methods of securement.

The other part of the single center glide of FIGS. 2A-L is carrier rail 60. It is a metal or metalized elongated piece having a similar length and width to base rail 50. Its side edges 66 and 68 matingly fit within the C-channels at 56 and 58 of rail 50 as shown in FIGS. 2E, 2I, and 2J. It can have a slightly raised center section 69 such that when rail 60 is slidably inserted in rail 50, the sidewalls of raised section 69 help guide rail 60 as it slides relative to rail 50. The sidewalls of section 69 are just slightly narrower than facing free-edges of C-channels 56 and 58. Rail 60 is secured to the bottom of carrier 34 by any of a number of methods.

The material make-up of rails 50 and 60 can vary. One possible combination would be to use dissimilar materials which have a combined effect of reducing the coefficient of friction between them. Another example would be surface finishes on one or more of rails 50 and 60 which do the same. A benefit of the combination is that a single rail combination at or near the center of carrier 34 is used to support and guide slideable movement of the corresponding carrier 34.

An example of a coating to reduce friction could be a PTFE coating or paint. Others are possible. Also, the designer could demand close tolerances in manufacturing of the cooperating halves of the single rail to promote smaller resistance against relative movement. But, on the other hand, the designer could accept greater tolerances to reduce cost and complexity, if it would adequately function for a particular appliance or bin in an appliance. In any event, the single rail system can essentially be two relatively low profile metal pieces. In one example in a refrigerator the single rail can be only V2 inch wide. Other widths and dimensions are, of course, possible. This does not take up much room under the carrier or bin. It would essentially be hidden from view from many viewing angles. It would allow bin width that essentially could go right up to an adjacent bin, wall, or other structure. This gives not only a clean look and perception of greater storage capacity (and less wasted space), but can give actual greater lateral storage space.

FIGS. 2D-L also illustrate another optional feature of assembly 30. What will be called the tolerance take up wheels 72 can be rotatably mounted at axes 74 on distal ends of respective curved arms 76. Arms 76 pivot on axes 78. As schematically illustrated, a tension spring 86 between the distal ends of arms 76 (e.g. spring 86 could be placed along the bottom of base 12 and connect to arms 76 through apertures in base 12 at those distal ends. Spring 86 would resist horizontal separation of wheels 72. Spring 86 can be of any of a number of forms and specifications as needed.

The underside of bin carrier 34 has structure that would be followed by wheels 72 when carrier 34 is slid relative to base 32. One example is shown at FIG. 2H. Spaced apart and oppositely outwardly bowed rails or walls 93 are formed or positioned along the bottom of carrier 34. Front portions 95 (near carrier front edge 92) and rear portions 97 (near carrier rear edge 94) are closer together than the middle portion. End stops 99 can also be formed or positioned near the back underside of carrier 34. The bowed middles of guides 93 are closer to opposite lateral sides 96 and 98, respectively, of carrier 32 than ends 95 and 97 of guides 93.

As illustrated in FIGS. 2K and 2L, when carrier 34 is in a home or fully pushed-back position relative to base 12 (FIG. 2K), wheels 72 try to push carrier even further back. This helps and biases carrier 34 to its home position. Even if the user quits pushing prior to carrier reaching home, wheels 72 try to converge and exert forces on ends 95 of rails 73 to "squirt" and then hold carrier 34 to home position. The user would feel this automatic force and it would help the user and the carrier to "find" home position.

As shown in FIG. 2L, if a user manually pulls carrier 34 at or near front edge 92 (or pulls a bin 36 on carrier 34) out from home by overcoming the home-biasing force of wheels 72 and spring 86, wheels 72 would be forced by rails 93 to spread apart further. This would generate additional converging forces and thus help guide movement of carrier as its slides on single glide 50/60. The user would tactilely feel this pinching action, but it could help control speed and smoothness of sliding. If carrier is pulled far enough out that wheels 72 reach rear converging portions 97 of rails 93, a similar "squirting" force would act to push carrier 34 to its fully extended position (similar to finding home, as described above). The user would tactilely feel the assistance to find fully extended position. But it would be in a smooth and controlled way. End stops 99 could mechanically determine the fully out or fully extended position relative to some aligned and appropriately positioned structure extending from base 12.

The corresponding structure underneath bin carrier 34 (see FIG. 2H) is non-linear. Other shapes and configurations are possible to create different effects. As can be appreciated, this combination can tend to guide slideable movement of bin carrier 34 but also produce what is called a soft close and open functions. The ridges 93 underneath bin carrier 34 converge at opposite ends. Thus, when bin carrier 34 reaches towards its opposite sliding extremes, the wheels 72 are drawn by tension spring 86 towards each other to promote automatic movement of the bin to either extreme position. In other words, the manual movement of the bin away from an extreme position has to overcome that combination of ridges 93 and tension the wheels 72 but when pulled towards its opposite extreme position, the tension of the wheels 72 actually help move the bin to that opposite extreme position in a controlled ("soft") manner By "soft close" it means moving it back to its original home position; by "soft open" moving it all the way out to its fully extended position. As can be appreciated, just one of "soft open" or "soft close" could be used instead of both.

Another optional feature shown in the figures are stability wheels 80. An axle 81 mounted along the front edge of base 32 can rotatably retain wheels 80. Their elevation and rotation help smooth the gliding movement of carrier 34 and any bin 36 on it, and also resists tipping of the carrier 34 and thus the bin 36.

A similar single rail under-bin glide system and, optionally, the soft open and/or close and stability subsystems can also be mounted on base 32 for each carrier 34. Only one is shown in the drawings for simplicity. Thus each carrier 34 has its own single rail under-bin glide system.

As can be appreciated, the specific nature and characteristics of the "soft close" or "soft open" can vary according to design or need. Some of the rules or principles the designer could contemplate include but are not limited to the following:

Slope (draw) up to peak force. The shorter the time to peak (e.g. where wheels 72 are pushed the farthest apart), the better for many situations. While this varies by technology (e.g. plastic on plastic, metal on metal, wheel-based, rails, etc.), all of these have optimal or beneficial solutions to shorten the time/distance to peak. Generally, the lower the amplitude (pounds of force) the smoother the draw (displacement×pounds of force).

Peak force (pounds of force). It is frequently beneficial to have peak force very short. The amount of force felt after peak many times should decay quickly. In some situations the decay would beneficially be almost instantaneous. Additionally, one design would have no extended amount of force after peak to achieve a "sticky" feeling.

Slope (decay). Slope refers to change in elevation ($y = mx + b$). One design rule can be for slope to be instant or almost instant, and the transition into the residual (sliding/rolling) clean. This is a time/distance based metric and can be developed and selected by the designer according to desire or need.

Residual (travel). The smaller the force deltas, the better the perception of smoothness by the user in many situations. Minimal force spikes indicate smooth movement along the surface.

Removal/replacement. If and when a component becomes free from its fixed position, one design calls for it being easily replaced into the original position. This can be a time-based metric developed and selected by the designer according to desire or need.

Displacement (vertical/horizontal). It can be beneficial to limit displacement in either direction. In one design for a crisper bin for a refrigerated appliance, horizontal displacement can be less than 5-10 mm when the bin is half-extended and 10-15 mm when fully extended; and vertical displacement could be on the order of less than 10 mm but this can vary with each design. Of course, this can vary according to need or desire.

Sound. In some designs it would be beneficial to minimize foreign noises (e.g. clicking, scraping, or hissing by the movement of the carrier or carrier/bin and the glide system and the tolerance and/or anti-tip systems, or other components). On the other hand, there may be acceptable subdued extension sounds (e.g. rail transition clicks to give the user an auditory and/or tactile indication of position of the carrier/bin).

Weighted/unweighted awareness. In some designs it will be beneficial to allow some sag in the system (e.g. to give the user awareness of whether the bin is full or empty).

It can be beneficial many times for the designer to have as a goal a "quality feel" to action of the guides that allow the bin or storage component to slide or glide. This may include features like the following.

"Soft close". The bin, carrier, or other slideable/glideable component is assisted to its home or closed position (pushed all the way into the refrigerator cabinet). The bin is essentially automatically pulled close once the user pushes the bin to a position near closed. This can be accomplished in a variety of ways. Examples include cooperating ramped or otherwise specifically formed surfaces, elastomer materials, or mechanical mechanisms (e.g. springs or air cylinders). Other methods are possible. It is also possible to add a "soft open" function (a similar thing for urging the bin to a fully open position).

Controlled glide/slide motion. The bin, carrier, or other storage component can likewise be given some control of movement (speed, resistance to travel, etc.) via cooperating surfaces (e.g. ramped, variation in friction along glides or slides, springs, or elastomers). Other methods are possible.

Control of lateral movement. What might be called "rattle", "wobble", or the like can also be controlled by guides, cooperating surfaces, rollers, and the like. This can help the "quality feel" or smoothness of operation of movement of the storage component. It can also allow essentially side-by-side placement of bins to provide perceived or actual increase in storage space while minimizing or preventing adjacent bins from hitting or banging into one another or a cabinet wall during movement.

As can be appreciated by those skilled in the art, the above and other design criteria, metrics, or options can be evaluated and included or used in any combination. The foregoing are intended to give the reader some design considerations that could be important for some applications, such as in refrigerated appliances.

Dual Rail Exemplary Embodiment

With reference to FIGS. 3A-3G, another alternative embodiment (assembly 200) is illustrated. It has the benefit of under-bin glides with the carrier in between the base and the bin for efficient lateral storage space use. The carrier 234 and base 232 are relatively thin to save vertical space. The main differences from the preceding embodiments are as follows. In these drawings, the bins 36 are narrower in lateral width than a corresponding carrier. However, bins 36 can be as wide as the carrier.

Base 232 has two under-bin rails 250 at opposite sides. In this embodiment they are inwardly facing c-channels. They also include an inner c-channel insert 251 (e.g. nylon, acetal, PTFE, or the like).

Bin carrier 234 has added edge rails 260 that include a distal edge that would matingly fit in the c-channel inserts 251 of base plate 236.

As shown in FIG. 3E, the entire combination of cooperating structures to provide sliding/gliding movement between a carrier 234 relative to a base 232 are within the perimeter of the bottom of carrier 234 when the carrier is in home position. This allows side walls of bins 236 to closely adjacent to one another. The two rail or dual rail system provides surface-to-surface slide movement with low friction coatings and nylon glide c-channel inserts.

FIGS. 3A-3G also show a closing assistance subsystem 270. The curved metal plate at the front of base plate 232 cooperates with tapered rails 293 on the bottom of bin carrier 234 similar to tensioned wheels 72 and bowed rails 93 of FIGS. 2K and 2L. Plate 270 has a front edge 272 and rear or posterior edge 271. Front tapered edges 295 of rails 293 would clear the upraised posterior edge 271 of spring steel piece 270, which would bias carrier 234 towards the home position and tend to keep it there (a "soft close" and assistance to find home). When the user pulls carrier 234 out, and overcomes the resistance that is presented by rails 293 getting thicker and having to work against spring 270, there will be a controlled resistance until the posterior edge of spring 270 hits the tapering 297 at the rear of rails 293. Spring would try to "squirt" or influence carrier 234 to the fully open (but "soft open"). Mechanical ends stops 299 would prevent any further outward extension of carrier 234.

As can be appreciated, carrier rails 260 could be relatively strong metal in this embodiment, as could rails 250. They could be separate pieces that could be attached or mounted to the respective carrier or base. But other materials could be possible.

The designer could select from a variety of materials according to need or desire, including the different materials for the under-bin glide (the dual rails 250/260 and any inserts or coatings). Carrier 234 could be plastic or analogous moldable materials such that features like rails 293 and end stops 299 could be integrally molded into carrier 234.

FIGS. 3F and 3G illustrate in section how the assembled glide system is configured in this exemplary embodiment. Optional features are possible. One example is the ability to make rails 250 as a separate piece and use machine screws to attach them to base 232 (see FIG. 3G). Other methods of attachment are possible, as is molding the rails 250 and base 232 together.

Dual Rail Low Friction Exemplary Embodiment

FIGS. 4A-4I shows still further exemplary embodiment (assembly 300). It also takes advantage of at least the features of the preceding embodiments. The main differences are as follows.

This is also a dual rail system. However, FIGS. 4D-4I shows a part 370 that is secured to base 332 for each bin carrier 334. Piece 370 has built-in opposite c-channels which effectively are the left and right guide rails 350 on base 332. Those rails are within the bottom perimeter of its corresponding bin carrier 334 when carrier 334 is in home position. Complementary shaped carrier rails 360 (left and right) are attached to the bottom of carrier 334 and also within its perimeter. Those rails 360 have an edge flange that fits within a corresponding c-channel of base rails 360. Thus, dual rail glides are in place for each bin carrier 334.

It should be appreciated that rails 350 could be of a material selected to have low coefficient of friction relative to rails 360. It could also have a surface treatment of the same. Examples of such surface treatments include but are not limited to Polytetrafluoroethylene (PTFE), fluoropolymer, or analogous dry film lubricants or coatings. A few examples are 1000 series products from http://www.Whitfordww.com, specifically:

| | Product |
|---|---|
| 1010 | PA1 + PTFE |
| 1052 | PA1 + PTFE/M052 |
| 1058 | PAT + FEP |

As indicated in 4G, C shaped rails 360 could have a nylon glide pad (or similar low surface tension material) 361 inside them to promote low friction sliding.

Stamped glide plate 370 has internal raised tracks 372 which can cooperate with surface topography on the bottom of bin carrier 334 to further control side-to-side movement. By a single stamped piece of durable metal attached to base 332, much of both the under-bin glide system and a guidance system can be added to the storage system.

Soft close or home position features (not shown) could be added. For example, a device like device 270 could be positioned at location 374.

Horizontal Roller Exemplary Embodiment

FIGS. 5A-5H show a still further embodiment (assembly 400). This utilizes the same principle of base, bin carrier, and under-bin glides or slides as previous embodiments. The main differences are as follows.

System 400 includes a base 432 that has opposite C-shaped rails 450 on base 432 but within the perimeter dimensions of corresponding bin carrier 434 when it is in home position.

Both base 432 and carrier 434 have a pair of spaced-apart rails 450 and 460, respectively that are used in the under-bin glide system. Carrier rails 460 are Bandied in the bottom of bin carrier 434. Base rails 450 are formed in the top of base 432.

Two sets of rollers, one set of base plate rollers 452 are rotatable on vertical axes near the front edge of base 432. This pair of horizontal rollers 452 is spaced to frictionally engage the lateral sides of carrier rails 460. Two horizontal carrier rollers 462 are rotatably mounted and rotate about vertical axes near the back of bin carrier 434. This pair of horizontal rollers 462 is spaced to frictionally engage the lateral sides of base rails 450. As shown in FIG. 5D, rollers 452 follow rails 460 of bin carrier 432. Wheels 462 follow guides 450 on base 432. In this manner smooth control of glide or slide is promoted. Wheels 462 are shown in FIG. 5C without carrier 432, the underside of which they are rotatably attached, to show how they cooperate with base rails 450.

One example of a type of wheel 452 or 462 is disclosed in a co-pending, co-owned U.S. patent application Ser. No.

13/832,845, filed Mar. 15, 2013, now U.S. Pat. No. 9,033, 437, issued May 19, 2015, entitled "Slide Assembly for Refrigerator Storage Drawer", and incorporated by reference herein in its entirety.

Such a wheel can promote low friction and smooth gliding as well as durability.

FIGS. 5G and 5H illustrate the cooperation between rails 450 and 460 and wheels 462 and 452 as a carrier is pulled out from home position. A mechanical end stop 499 can be included on carrier 434 to work like prior embodiments (provide an absolute end-of-travel mechanical stop). Soft open and close systems could be added.

FIGS. 6A-D show one example of a tolerance take-up wheel that could be utilized with assembly 400. An axle 453 has two mirror image pulleys 454 spaced slightly apart along its length. One end of axle 453 is also exposed. Keyhole 458 in base 432 has a large portion (larger in diameter than the largest diameters of pulleys 454) and a small keyhole portion smaller than the largest diameter of pulleys 454 but just larger than the diameter of axle 453. This allows insertion of the axle and pulleys into position as shown. Pulleys 454 have a larger diameter than the larger part of keyhole 458 and thus act as a mechanical stop against further movement upward or downward relative to keyhole 458. A wheel 452 is then rotatably mounted on the exposed end of axle 453. A set of support blocks 455 on the top and another mirror image set on the bottom of base 432 each hold a resilient band or spring 456 against a corresponding pulley 454. This constantly urges axle 453 to stay in extreme far end of the narrow part of key hole 458 (as shown in FIGS. 6B and 6D.

As can be appreciated, by forming keyhole 458 appropriately in the base (such as base 432 for example) so that the larger part of keyhole is lateral or away from whatever track or rail wheel 452 is following when carrier 434 is slide relative to base 432, some play or tolerance will be resiliently allowed if the forces exceed the spring force of component 456. This tolerance take-up wheel assembly can be used by any one, all, or a subset of wheels used in any under-bin glide system between a carrier and base. There could also be a separate take-up wheel assembly on one of the carrier or the base and some structure on the other of the carrier or the base which that wheel follows, apart from the glide system, to provide tolerance take-up or assisted guidance.

FIGS. 5I and 5J provide pictorial representations for at least one configuration of the base 432 best illustrated in FIGS. 5C and 5D. In at least one configuration, base 432 may include a shelf component 433 and a frame component 435. The shelf component 433 and frame component 435 may be configured as separate pieces or modulated components. The shelf component 433 may be configured with one or more of the wheels 452 and guides 450 as discussed above. The frame component 435 may include one or more pin locations for locating the shelf component 433 on top of and relative to the frame component 435 when the two are assembled. In at least one configuration, the frame component 435 is configured with one or more light modules 437. Like the shelf illustrated in FIG. 1H, the light modules 437 include a frame circumscribing a glass component 439. FIG. 5J, which is a sectional view taken along line 5J-5J in FIG. 5I, provides a pictorial representation of the light module 437. The light module 437 includes a light element 441 such as an LED strip or bar. The light module 437 is configured as a wave guide for directing light from the light element 441 across the glass component 439 for emitting light from the glass component 439. The light element 441 may be configured so as to be electrically coupled to the electrically conductive strip 25 illustrated in FIGS. 1C and H. Alternatively, the one or more light elements 441 may be electrically coupled with the electrical system used to power one or more functions or operations of the cabinet 12. For example, one or more light elements 441 may be wired to the electrical system of the cabinet 12 through wire routing 441 shown in FIG. 5I. According to at least one configuration, one or more lighting elements 441 are used to provide illumination of one or more drawers, bins, shelves, or racks, or carriers of a drawer, bin, shelf, or rack spaced or disposed about the base 432. According to at least one other configuration, shelf 426 illustrated in Figure SA may be configured with one or more light elements 441 similar to those shown and described in FIGS. 1A-1C, and 1H. Alternatively, shelf 426 illustrated in Figure SA may be configured with one or more lighting elements 441 as pictorially represented in FIGS. 5I and 5J. Figure SA illustrates a pair of light modules 437 disposed within frame component 435. Other configurations include a single light module disposed within frame component 435 or multiple light modules 437 housed within frame 435. In at least one other configuration, shelf module 433 may also be configured to include one or more light modules 437 having one or more light elements 441 for illuminating shelf component 433. In this manner, one or more drawers, bins, shelves, racks, carriers of a drawer, bin, shelf or rack may be illuminated by shelf component 433 when operably disposed at top shelf component 433 as described and pictorially represented herein.

Injection Molded Shelf and Glides

FIGS. 7A-7F show as still further exemplary embodiment (several levels of assemblies 500). It takes advantage of at least most, if not all, of the features of preceding embodiments with the following specific differences.

Instead of a base plate that does not have a separate function other than supporting bins or bin carriers, one or more shelves 532 could be distributed in refrigeration cabinet 12 and installed at a desired elevation across the width of cabinet 12. Each shelf 532 could function just as that—a shelf. But it could have mounting holes 533 or the like to receive one or more glide assemblies on its top surface. An example would be the center rail glide combination 50/60 of FIGS. 2A-2H.

As shown in FIGS. 7A-B, a shelf 532 could have screwed, bolted, or pinned thereto anywhere for one to four single rail glide halves 550. A single-wide bin 536 could have a corresponding single rail guide half 560 attached to its bottom. In FIGS. 7A-F just two of the single-wide bins 536 are shown. Another shelf 532 could be mounted in cabinet 12 directly above, but slightly spaced from, the upper plane of bins 536 to function also as a cover to bins 536.

A difference of this embodiment is that the lower shelf 532 with under-bin glide halves 550 serves as the analog of the base of prior embodiments. But there is no bin carrier. The other half of the glide combination is connected directly to the bin 536. This could be the arrangement in any of the embodiments.

Note how this combination has a single piece injection-molded or otherwise produced shelf, two complementary glide rail halves and a bin. This combination has few parts, is economical, and yet retains the under-bin slide concept.

Furthermore, as can be appreciated, as many as four glide halves 550 can be mounted in mounting holes 533 on any shelf 532. A "single-wide" bin 536 can be mounted on each glide half 550 to mount four single-wide bins across the width of a shelf 532. Or two single-wides and one double-wide can by mounted (see FIG. 7F). But as indicated earlier, one single-wide and one triple-wide is possible. As is just one four-wide (see bottom bin 536 in FIG. 7F).

FIG. 7F can also be used to understand certain advantages of the under-bin glides according to the present exemplary embodiments. Other bins 527 (or other storage components) that do not have under-bin glides (here hanging from glides above them) tend to have structure outside the perimeter of the bin and thus prevents the sides of adjacent bins from being positioned as closely as with under-bin glides. They could be mounted to mounting holes 533 on shelf 532 or two differently configured shelves 526. The efficient use of lateral space (and vertical space) is illustrated with the under-bin glide assemblies of bins 536.

OPTIONS AND ALTERNATIVES

As can be appreciated, the foregoing examples are for illustrative purposes only. The invention can take many forms and embodiments. Variations obvious to those skilled in the art would be included within the invention.

What is claimed is:

1. A refrigerator comprising:
a cabinet having one or more chilled compartments with opposite side walls;
a modular drawer system having:
a. at least one rectilinear conductive element having a length greater than a width, wherein the length of the at least one rectilinear conductive element is disposed along the exterior of a vertical rail in a wall of the cabinet;
b. a base component having a frame spaced between the side walls;
c. at least one horizontally adjustable component carried by the base component, the horizontally adjustable component having a bottom with side edges defining a perimeter and one or more guide members extending within the perimeter between an opposite pair of the side edges; and
d. at least one of the base component and the at least one horizontally adjustable component having one or more lighting elements, the one or more lighting elements electrically coupled to the at least one rectilinear conductive element.

2. The refrigerator of claim 1, further comprising a vertically adjustable component having a frame spaced between the side walls, the vertically adjustable component supported in part by at least one bracket removably attached to the vertical rail.

3. The refrigerator of claim 2 wherein the frame of the vertically adjustable component or the frame of the base component further comprises the one or more lighting elements electrically coupled to the at least one rectilinear conductive element.

4. The refrigerator of claim 2 wherein the at least one bracket is electrically coupled between the one or more lighting elements and the at least one rectilinear conductive element.

5. The refrigerator of claim 2 wherein the at least one bracket is electrically coupled to the at least one rectilinear conductive element in a plurality of positions along the vertical rail.

6. The refrigerator of claim 2 wherein the one or more lighting elements are spaced between a glass component housed within at least one of the frame of the vertically adjustable component and the frame of the base component.

7. A refrigerator shelf system comprising:
an interior comprising opposite side walls and a rear wall;
an electrically conductive strip originating at an electrical source and terminating in one or more lighting elements, the electrically conductive strip comprising two or more connectable components;
at least one elongated conductive element disposed exterior to a surface of a vertical rail at the interior; and
a first connectable component supported between the side walls of the interior with at least one bracket removably attached to the vertical rail;
wherein the first connectable component and the vertical rail comprise an electrically conductive pathway; and
wherein the first or second connectable component comprises a connectable drawer component having a bottom with side edges defining a perimeter and one or more guide members within the perimeter cooperating with one or more opposing longitudinally extending guide members.

8. The refrigerator shelf system of claim 7, further comprising a second connectable component removably supported between the side walls of the interior;
wherein the one or more lighting elements and the at least one elongated conductive element are electrically coupled with a frame housing the first or second connectable component.

9. The refrigerator shelf system of claim 7, wherein the first or second connectable component comprises two or more positions on the vertical rail to electrically couple the first or second connectable component and the at least one elongated conductive element at the two or more positions along the vertical rail.

10. A modular storage system for a refrigerator, comprising:
a refrigerator cabinet having an interior;
at least one elongated, conductive strip disposed along the exterior of a vertical rail in a wall;
a shelf comprising a frame, wherein the frame further comprises a bracket removably coupled with the vertical rail; and one or more lighting elements, the one or more lighting elements electrically coupled to the at least one elongated, conductive strip,
a base component spaced between opposite side walls of the cabinet interior; and
a pull out component disposed on the base component, the pull out component having a bottom with side edges defining a perimeter and one or more guide members extending within the perimeter between an opposite pair of the side edges.

11. The modular storage system for a refrigerator of claim 10 wherein the frame comprises a lighting frame having the one or more lighting elements.

12. The modular storage system for a refrigerator of claim 11, wherein the frame conductively couples the one or more lighting elements to the at least one elongated, conductive strip.

13. The modular storage system for a refrigerator of claim 12, wherein the bracket is electrically coupled between the one or more lighting elements and the at least one elongated, conductive strip.

14. The modular storage system of claim 11, wherein the pull out component has a first position and a reconfigured position, wherein the at least one bracket is electrically coupled to the at least one elongated, conductive strip in both the first and reconfigured positions.

15. The modular storage system for a refrigerator of claim 11, wherein the one or more lighting elements are contained within a perimeter of the frame.

16. The modular storage system for a refrigerator of claim 10, further comprising a drawer component having a bottom with side edges defining a perimeter and one or more guide members within the perimeter cooperating with one or more opposing longitudinally extending guide members.

17. The modular storage system for a refrigerator of claim 16, wherein the frame comprises a lighting frame having the one or more lighting elements.

18. The modular storage system for a refrigerator of claim 17, wherein the one or more guide members are secured to and extend downwardly from the bottom of the pull out component and configured to slidably engage one or more rails associated with the base component.

\* \* \* \* \*